(12) United States Patent
Raths et al.

(10) Patent No.: US 11,440,852 B2
(45) Date of Patent: Sep. 13, 2022

(54) SEED, SOIL, AND PLANT TREATMENT COMPOSITIONS

(71) Applicant: Ralco Nutrition, Inc., Marshall, MN (US)

(72) Inventors: Rachel Ann Raths, Marshall, MN (US); Richard Dale Lamb, Balaton, MN (US); Michael David Johnson, Balaton, MN (US); Evan Everette Johnson, Balaton, MN (US)

(73) Assignee: RALCO NUTRITION, INC., Marshall, MN (US)

( * ) Notice: Subject to any disclaimer, the term of this patent is extended or adjusted under 35 U.S.C. 154(b) by 0 days.

(21) Appl. No.: 16/944,881

(22) Filed: Jul. 31, 2020

(65) Prior Publication Data
US 2021/0032174 A1 Feb. 4, 2021

Related U.S. Application Data

(60) Provisional application No. 62/882,154, filed on Aug. 2, 2019.

(51) Int. Cl.
| | |
|---|---|
| *C05D 9/02* | (2006.01) |
| *C05G 3/80* | (2020.01) |
| *A01C 21/00* | (2006.01) |
| *C05G 5/23* | (2020.01) |
| *C05G 3/60* | (2020.01) |
| *A01C 1/06* | (2006.01) |

(52) U.S. Cl.
CPC .............. *C05D 9/02* (2013.01); *A01C 21/00* (2013.01); *C05G 3/60* (2020.02); *C05G 3/80* (2020.02); *C05G 5/23* (2020.02)

(58) Field of Classification Search
None
See application file for complete search history.

(56) References Cited

U.S. PATENT DOCUMENTS

| | | | | | |
|---|---|---|---|---|---|
| 2,927,851 | A | * | 3/1960 | Wilson ...................... | C05D 3/04 71/62 |
| 3,794,478 | A | * | 2/1974 | Dirksen ................... | C05D 9/02 71/1 |

(Continued)

FOREIGN PATENT DOCUMENTS

| | | | | |
|---|---|---|---|---|
| CN | 101112200 A | | 1/2008 | |
| CN | 106478271 A | * | 3/2017 | ............... C05G 3/00 |

(Continued)

OTHER PUBLICATIONS

International Search Report and the Written Opinion of the International Searching authority for PCT/US20/44481 dated Oct. 14, 2020, 10 pages.

*Primary Examiner* — Wayne A Langel
(74) *Attorney, Agent, or Firm* — Billion & Armitage

(57) ABSTRACT

Various seed, soil, and plant treatment compositions, methods of applying such compositions, and the like are described herein. The treatment compositions can comprise one or more zinc compounds, one or more iron compounds, and/or one or more molybdenum compounds. Applications of the treatment compositions can include being placed in-furrow, side-dressed in fields, used as foliar treatments, broadcast in soil, tilled in soil, or otherwise applied to seeds, soils, or plants.

8 Claims, 95 Drawing Sheets

(56) References Cited

U.S. PATENT DOCUMENTS

| | | | | |
|---|---|---|---|---|
| 4,328,025 A * | 5/1982 | Whitcomb | ............... | C05D 9/02 |
| | | | | 71/23 |
| 5,698,001 A * | 12/1997 | Keenportz | ............... | C05D 9/00 |
| | | | | 71/24 |
| 9,902,658 B2 * | 2/2018 | Cappelle | .................... | B01F 3/18 |
| 10,047,016 B2 * | 8/2018 | Bradley | .................. | C05B 17/00 |
| 10,633,299 B2 * | 4/2020 | Martin | ....................... | C05C 5/04 |
| 2015/0251963 A1 * | 9/2015 | Capelle | ................... | C05B 13/00 |
| | | | | 435/243 |
| 2015/0299058 A1 | 10/2015 | Lamb et al. | | |
| 2018/0208517 A1 * | 7/2018 | Krolikowski | .......... | A01N 59/20 |
| 2020/0404927 A1 * | 12/2020 | Lamb | ....................... | C05D 9/02 |

FOREIGN PATENT DOCUMENTS

| | | | |
|---|---|---|---|
| MX | 2008014315 A | 10/2009 | |
| WO | 200221930 A1 | 3/2002 | |
| WO | 2018213289 A1 | 11/2018 | |

\* cited by examiner

SEED, SOIL, AND PLANT TREATMENT COMPOSITIONS

BACKGROUND

Trace minerals have been found to facilitate the growth, yield, and health of agricultural crops. Such trace minerals may include chlorine, iron, boron, manganese, zinc, copper, molybdenum, sodium, silicon, nickel, and cobalt. Iron, for example, is used in chlorophyll production and therefore plays an essential role in photosynthesis, among other things. Zinc is important to many metabolic plant reactions and plays a role in protein synthesis, growth regulation, and other processes. Molybdenum is a cofactor to enzymes that build amino acids for nitrogen metabolism. Formulating compositions with trace minerals, however, has proven challenging and the subject of extensive research. One challenge is providing compositions that do not reduce the bioavailability of either the trace minerals naturally existing in the soil or those minerals provided via the composition. For instance, these trace minerals may compete with other cations and thus give rise to artificial deficiencies, which may be detrimental to plant health and performance. Another challenge is ensuring the trace minerals remain readily soluble and available for plant uptake, while at the same time ensuring the concentration of those minerals also do not pose risks for human and animal consumption.

It is therefore desirable to balance these competing interests in formulating a plant treatment composition that improves plant performance.

SUMMARY

In general, the present invention is directed to seed, soil, and plant treatment compositions, methods of applying said compositions, biostimulants including said compositions, and the like.

In a first aspect, the present invention is directed to seed, soil, and plant treatment compositions comprising one or more zinc compounds, one or more iron compounds, and/or one or more molybdenum compounds. In some embodiments, the compositions further comprise one or more manganese compounds. In some embodiments, the compositions further comprise one or more of carriers, fibers, enzymes, pesticides, and other compounds described herein.

In a further aspect, the present invention is directed to methods of applying the treatment compositions in proximity to or in contact with one or more seeds in-furrow. The treatment compositions can include or be selected from any of the treatment compositions of the present disclosure.

In another aspect, the present invention is directed to methods of applying treatment compositions to the foliage of plants or crops. The treatment compositions can include or be selected from any of the treatment compositions of the present disclosure.

In other aspects, the present invention is directed to methods of applying treatment compositions, wherein the applying includes being placed in-furrow, side-dressed in fields, used as foliar treatments, broadcasted in soil, tilled in soil, or otherwise applied to seeds, soils, or plants.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1:
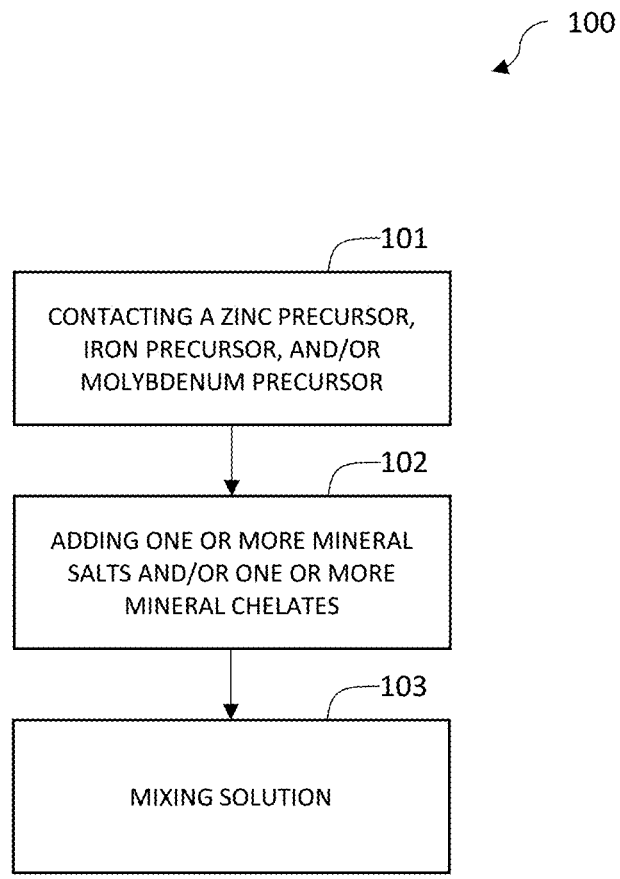
FIG. 1 is a flowchart of a method of preparing a treatment composition, according to one or more embodiments of the present disclosure.

The invention of the present disclosure relates to seed, soil, and plant treatment compositions. In particular, the invention of the present disclosure relates to seed, soil, and plant treatment compositions that may be prepared from and/or include one or more of zinc compound(s), iron compound(s), molybdenum compound(s), and manganese compound(s). The seed, soil, and plant treatment compositions may further be prepared from and/or include additional components, including, but not limited to, one or more of carriers, fibers, enzymes, pesticides, insecticides, fungicides, herbicides, biological fertilizers, additional nutrients and nutrient supplements, other mineral compounds, and the like. The seed, soil, and plant treatment compositions can be applied alone or in combination with other components. For example, the seed, soil, and plant treatment compositions of the present disclosure may be placed in-furrow, side-dressed in a field, used as a foliar treatment, broadcast on soil, and/or tilled in soil to improve one or more of plant emergence, crop yield, stand count, leaf area, root size, plant height, plant health, and plant resistance to disease and drought.

The seed, soil, and plant treatment compositions of the present disclosure provide concentration ranges of micronutrients that are readily available for uptake and that do not suffer from any significant reduction in the bioavailability of the micronutrients. In addition, the seed, soil, and plant treatment compositions include zinc, iron, and molybdenum compounds that are present at non-toxic concentrations. Manganese compounds can also be added in combination. Zinc, iron, molybdenum, and manganese complete the micronutrient package that provides the best nodule formation, nitrogen fixation, and metabolism benefits. In this way, the seed, soil, and plant treatment compositions of the present disclosure facilitate the bioavailability of micronutrients to maximize plant performance and minimize deleterious effects, such as toxicity. These benefits are non-exhaustive, as other benefits of the present invention are understood by persons of skill in the art.

In some embodiments, the seed, soil, and plant treatment compositions of the present disclosure stimulate natural plant processes to improve one or more of nutrient uptake, nutrient efficiency tolerance to stress (e.g., abiotic stress), and crop quality, among other things. For example, in some embodiments, the seed, soil, and plant treatment compositions may be utilized (and/or referred to) as biostimulants. For example, embodiments of the present disclosure provide biostimulant compositions that include the seed, soil, and plant treatment compositions disclosed herein. In certain embodiments, the seed, soil, and plant treatment compositions improve one or more of plant efficiency, plant metabolism, tolerance to certain stresses (e.g., abiotic stress), recovery from certain stresses (e.g., abiotic stress), hydration, soil fertility, nutrient assimilation, nutrient translocation, nutrient utilization, and other attributes, such as for example, color, content, etc. In some embodiments, the seed, soil, and plant treatment compositions selectively stimulate the growth of beneficial microbes in and/or around the soil to, for example, improve soil properties. In this way, application of the seed, soil, and plant treatment compositions improve yields, biomass, and/or overall quality of plants, crops, and the like.

Definitions

The terms recited below have been defined as described below. All other terms and phrases in this disclosure shall be construed according to their ordinary meaning as understood by one of skill in the art.

As used herein, the term "zinc compound" refers to any chemical species comprising zinc. The zinc can be elemental zinc having any oxidation state. Non-limiting examples of zinc compounds include zinc salts, zinc chelates or zinc chelate complexes, zinc coordination complexes, and the like.

As used herein, the term "iron compound" refers to any chemical species comprising iron. The iron can be elemental iron having any oxidation state. Non-limiting examples of iron compounds include iron salts, iron chelates or iron chelate complexes, iron coordination complexes, and the like.

As used herein, the term "molybdenum compound" refers to any chemical species comprising molybdenum. The molybdenum can be elemental molybdenum having any oxidation state. Non-limiting examples of molybdenum compounds include molybdenum salts, molybdenum chelates or molybdenum chelate complexes, molybdenum coordination complexes, and the like.

As used herein, the term "manganese compound" refers to any chemical species comprising manganese. The manganese can be elemental manganese having any oxidation state. Non-limiting examples of manganese compounds include manganese salts, manganese chelates or manganese chelate complexes, manganese coordination complexes, and the like.

As used herein, "treatment compositions" refers to a seed, soil, and/or plant treatment composition as described herein.

As used herein, "zinc-iron-molybdenum treatment composition" refers to a treatment composition including, but not limited to, one or more zinc compounds, one or more iron compounds, and one or more molybdenum compounds. In many embodiments, additional components and/or compounds may be further included in the zinc-iron-molybdenum treatment compositions.

The term "chelation" refers to the formation of two or more separate coordinate bonds between a polydentate (multiple bonded) ligand and a single central atom, such as a metal ion, or cluster of metal ions. The ligands are typically organic compounds, often in anionic form, and are known in the art as chelants, chelators, or sequestering agents. A ligand forms a chelate complex with a substrate such as a metal ion. While chelate complexes typically form from polydentate ligands, as used herein the term chelate also refers to coordination complexes formed from monodentate ligands and a central atom.

A "carboxylic acid" refers to organic compounds comprising a carboxyl group. The term "carboxylic acid" includes compounds of the general formula: R—C(=O)OH, where R is generic and thus not particularly limited. Non-limiting examples of carboxylic acids include mono-, di-, and tri-carboxylic acids, any one or all of which can be saturated or unsaturated, amino acids, keto acids, alpha hydroxy acids, fatty acids, organic acids, and the like. Specific examples of carboxylic acids include, but are not limited to, lactic acid, acetic acid, ethylenediaminetetraacetic acid, propionic acid, and butyric acid.

A "fatty acid" refers to a carboxylic acid, often with a long unbranched aliphatic tail (chain), which may be either saturated or unsaturated. Short chain fatty acids typically have aliphatic tails of six or fewer carbon atoms. Examples of short chain fatty acids include propionic acid and butyric acid. Medium chain fatty acids typically have aliphatic tails of 6-12 carbon atoms. Examples of medium chain fatty acids include caprylic acid, capric acid and lauric acid. Long chain fatty acids typically have aliphatic tails of greater than 12 carbon atoms. Examples of long chain fatty acids include myristic acid, palmitic acid and stearic acid. A fatty acid having only one carboxylic acid group can be a ligand of a mineral.

The term "lactic acid" refers to a carboxylic acid having the chemical structural formula of $CH_3CH(OH)CO_2H$. Lactic acids form highly soluble salts and/or chelates with the minerals disclosed in the present disclosure.

As used herein, an "inorganic mineral compound" or "mineral" refers to an elemental or compound composition including one or more inorganic species. For example, an inorganic mineral compound may be cobalt, cobalt carbonate, manganese oxide or a combination thereof. Inorganic mineral compounds may also include scandium, selenium, titanium, vanadium, chromium, manganese, iron, nickel, for example. Transition metals can also be included and salts, oxides, hydroxides and carbonates of the above mentioned compounds can be suitable inorganic mineral compounds.

As used herein, "mineral chelated compound" refers to chemical compound or mixture including at least one inorganic substance and a derivative of a carboxylic acid, or reaction product of a carboxylic acid and an inorganic mineral compound. Examples of mineral chelated compounds include but are not limited to cobalt, scandium, selenium, titanium, vanadium, chromium, manganese, iron, nickel, or a combination thereof chelated to one or more ligands to form a chelate (a chelate complex or coordinate complex). Examples of suitable ligands include lactate, acetate, propionate, butyrate, ethylene diamine, and EDTA.

As used herein, an "inorganic fertilizer" refers to a composition intended to enhance the growth of plants by providing macronutrients such as one or more of nitrogen, potassium, phosphorus, calcium, magnesium, and sulfur. The inorganic fertilizer typically does not include significant amounts of living organisms. Inorganic fertilizers often include micronutrients, such as boron, chlorine, iron, manganese, molybdenum. Inorganic fertilizers can also include optional ingredients such as greensand or rock phosphate. The inorganic fertilizer can be, for example, an NPK fertilizer, a known commercial fertilizer, or the like.

As used herein, "biological fertilizer", "natural fertilizer" or "organic fertilizer" refers to a fertilizer that includes living organisms, or plant or animal matter. A biological fertilizer can include components such as manure, blood meal, alfalfa meal, seaweed, or compost. The fertilizers can be provided in a variety of granular or liquid forms.

As used herein, "pesticide" refers to a composition or product that kills or repels plant or seed pests, and may be broken into a number of particular sub-groups including, but not limited to, acaricides, avicides, bactericides, fungicides, herbicides, insecticides, miticides, molluscicides, nematicides, piscicides, predacides, rodenticides, and silvicides. Pesticides may also include chemicals which are not normally used as pest control agents, such as plant growth regulators, defoliants, and desiccants, or which are not directly toxic to pests, such as attractants and repellants. Some microbial pesticides may be bacteria, viruses, and fungi that cause disease in given species of pests. Pesticides may be organic or inorganic. Pesticides applied to plant seeds may remain on the surface of the seed coat following application, or may absorb into the seed and translocate throughout the plant.

As used herein, "herbicide" refers to a composition or product that kills or deters weed growth. One example of an herbicide includes glyphosate (i.e., RoundUp® herbicide).

As used herein, "insecticide" refers to a composition or product that kills or repels insects. Examples of insecticides include Sevin (carbaryl), permethrin, and *Bacillus thruingiensis*.

As used herein, "foliar" refers to the foliage of a plant or crop, or applying to the foliage of a plant or crop.

As used herein, "in-furrow" refers to applying a substance within a planting furrow in contact with or in near proximity to a seed. In-furrow application can occur before a seed is planted, simultaneous with seed planting, or after seed planting.

As used herein, "genetically modified plant" or "genetically modified organism" refers to an organism whose genetic material has been altered using genetic engineering techniques such as recombinant DNA technology.

As used herein, "rapidly soluble mineral chelated product" refers to a mineral chelated compound that has been altered to increase solubility in a solvent. Altering may include reducing in size, filtering, screening or chemically reacting. An inorganic mineral compound may be organically chelated such that its solubility changes from insoluble to soluble in a chosen solvent.

As used herein, "solution" refers to a homogeneous or substantially homogeneous mixture of two or more substances, which may be solids, liquids, gases or a combination thereof.

As used herein, "mixture" refers to a combination of two or more substances in physical or chemical contact with one another.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo. Accordingly, treating, tumbling, vibrating, shaking, mixing, and applying are forms of contacting to bring two or more components together.

As used herein, "adding" refers to bringing into contact two or more components. In many embodiments, "adding" refers to "contacting," as that term is defined above.

As used herein, "mixing" refers to one or more of mixing, stirring, agitating, vibrating, shaking, turning, spinning, and/or other conventional techniques known in the art to facilitate and/or achieve contacting, as that term is defined above.

As used herein, "applying" refers to bringing one or more components into nearness or contact with another component. Applying can refer to contacting or administering.

As used herein, "pre-treatment" or "seed treatment" refers to chemically and/or physically contacting seeds with a composition prior to planting.

As used herein, "reacting" refers to undergoing a chemical change. Reacting may include a change or transformation in which a substance oxidizes, reduces, decomposes, combines with other substances, or interchanges constituents with other substances.

As used herein, "transferring" refers to moving a component or substance from one place or location to another.

As used herein, "mold" refers to a hollow form or matrix for shaping a fluid, gel, semi-solid or plastic substance.

As used herein, "filtering" or "filtration" refers to a mechanical method to separate solids from liquids, or separate components by size or shape. This can be accomplished by gravity, pressure or vacuum (suction).

As used herein, "carrier" refers to a substance that physically or chemically binds or combines with a target or active substance to facilitate the use, storage or application of the target or active substance. Carriers are often inert materials, but can also include non-inert materials when compatible with the target or active substances. Examples of carriers include, but are not limited to, water for compositions that benefit from a liquid carrier, or diatomaceous earth for compositions that benefit from a solid carrier.

As used herein, "substrate" refers to a base layer or material on which an active or target material interacts with, is applied to, or acts upon.

As used herein, "stoichiometric" or "stoichiometric amounts" refer to starting materials of a reaction having molar amounts or substantially molar amounts such that the reaction product is formed with little to no unused starting material or waste. A stoichiometric reaction is one in which all starting materials are consumed (or substantially consumed) and converted to a reaction product or products.

As used herein, "adherent" refers to a material, such as a polymer, that facilitates contact or binding of one or more chemicals with a seed during a seed-pre-treatment process.

As used herein, "enzymes" refers to one or more biological molecules capable of breaking down cellulosic material.

As used herein, "Generate" or "Gen" refers to a seed, soil, or plant treatment composition including one or more minerals, wherein one or more of the minerals may be present as a mineral chelated compound or inorganic mineral compound. The minerals may include, among others, one or more of cobalt, scandium, selenium, titanium, vanadium, chromium, manganese, iron, nickel, copper, and zinc. The chelate may include, among others, one or more of lactate, acetate, propionate, butyrate, ethylene diamine, and EDTA. The inorganic mineral compound may include, among others, one or more of carbonate, gluconate, sulfate, oxide, and hydroxide. The seed, soil, or plant treatment composition may optionally further include one or more of emulsifiers and fibers, such as soluble fibers.

Embodiments of the present disclosure describe a seed, soil, or plant treatment composition comprising one or more zinc compounds, one or more iron compounds, and/or one or more molybdenum compounds. One or more manganese compounds can also optionally be included in the treatment compositions. In some embodiments, the seed, soil, and/or plant treatment composition is utilized as a biostimulant. For example, in some embodiments, the seed, soil, and/or plant treatment composition includes a biostimulant composition, the biostimulant composition including one or more of the following: one or more zinc compounds, one or more iron compounds, one or more molybdenum compounds, and one or more manganese compounds, among other things.

The zinc compound may include a zinc source that can supply a plant with zinc in any form and/or oxidation state. In some embodiments, the zinc compound includes one or more of zinc chelates and zinc salts. To form one or more zinc compounds, a compound containing zinc may be contacted with a carboxylic acid. The compound containing zinc may include zinc hydroxyl-carbonate paste or any other compound containing zinc capable of providing zinc to form a zinc compound. The carboxylic acid may include one or more of lactic acid, sulfuric acid, EDTA, propionic acid, butyric acid, and acetic acid. The zinc compound may include one or more of a zinc lactate compound, a zinc sulfate compound, a zinc ethyelenediamine tetraacetate compound, a zinc propionate compound, a zinc butyrate compound, a zinc acetate compound, and variations thereof. In other embodiments, the zinc compound may include one or more of zinc lignosulfonate, zinc gluconate, zinc sulfamate tetrahydrate, zinc acetate tetrahydrate, anhydrous zinc salts, hydrated zinc sulfate, hydrated zinc nitrate, and hydrated zinc chloride.

In some embodiments, the zinc compound is zinc lactate, zinc sulfate, or combinations thereof. In some embodiments, zinc lactate and zinc sulfate are both included in the treatment composition. At least one reason for providing both zinc lactate and zinc sulfate in the treatment composition is to provide the plant with a source of zinc once uptake of zinc lactate and/or zinc sulfate is about exhausted or exhausted. For example, plant uptake of zinc lactate may occur first, with limited or no uptake of zinc sulfate. Once zinc lactate is depleted or nearly depleted, plant uptake of zinc sulfate may then occur. Alternatively, plant uptake of zinc sulfate may occur first, with limited or no uptake of zinc lactate. Once zinc sulfate is depleted or nearly depleted, plant uptake of zinc lactate may then occur. Other zinc compounds disclosed herein may be used in place of zinc lactate and/or zinc sulfate to achieve the same "time releasing" effect. In other embodiments, the zinc compound of the plant treatment composition may include only zinc lactate or only zinc sulfate.

The iron compound may include an iron source that can supply a plant with iron in any form and/or oxidation state. In some embodiments, the iron compound includes one or more of iron chelates and iron salts. In some embodiments, the iron compound is iron ammonium sulfate, iron sulfate, iron diethylenetriamine pentaacetic acid, or ferric ammonium citrate, or combinations thereof. In some embodiments, the iron compound may include one or more of an iron lactate compound, an iron sulfate compound, an iron ethylenediamine tetraacetate compound, an iron propionate compound, an iron butyrate compound, an iron acetate compound, and variations thereof. In some embodiments, the iron compound may include one or more of ferric citrate, ferric chloride, ferrous sulfate, and ferrous sulfate heptahydrate.

As provided above, in many embodiments, the iron compound is one or more of iron ammonium sulfate, iron sulfate, iron diethylenetriamine pentaacetic acid, and ferric ammonium citrate. One or more of these iron compounds, when compared to other iron compounds, such as the iron chelated compounds and/or iron salts, is preferably included in the plant treatment composition. For example, in some instances, the chelate portion (e.g., EDTA) of the iron chelated compound may form a strong bond to iron that reduces iron's bioavailability. In other instances, iron from a strongly chelated iron compound may be bioavailable (e.g., once solubilized), but the chelate portion may then strongly bind to other nutrients that reduces those nutrients' bioavailability. In one non-limiting example, ferric ammonium citrate, among other iron compounds, is a highly stable and highly soluble form of iron that increases iron's bioavailability to a plant.

The molybdenum compound may include a molybdenum source that can supply a plant with molybdenum. In some embodiments, the molybdenum compound is one or more of ammonium molybdate (e.g., ammonium molybdate (IV) tetrahydrate) and molybdic acid. In some embodiments, the molybdenum compound may include one or more of molybdenum chelates (or molybdenum chelated compounds) and molybdenum salts. The one or more molybdenum compounds may include one or more of a molybdenum lactate compound, a molybdenum sulfate compound, a molybdenum ethyelenediamine tetraacetate compound, a molybdenum propionate compound, a molybdenum butyrate compound, a molybdenum acetate compound, and variations thereof. In some embodiments, the molybdenum compound may include one or more of sodium molybdate, molybdenum trioxide, calcium molybdate, potassium molybdate, and combinations thereof.

The manganese source compound may include a manganese source that can supply a plant with manganese. In other embodiments, the manganese compound may include one or more manganese chelated compounds. The one or more manganese chelated compounds may include one or more of a manganese lactate compound, a manganese sulfate compound, a manganese ethyelenediamine tetraacetate compound, a manganese propionate compound, a manganese butyrate compound, a manganese acetate compound, and variations thereof. The chelated portion of the manganese chelated compound may include one or more of lactate, sulfate, ethylenediamine tetraacetate (EDTA), propionate, butyrate, and acetate. Manganese can also be provided as oxides or as salts. When in tank with glyphosate, manganese lactate is the preferred form to reduce any risk of chemical interaction.

A plant may be provided with zinc, iron, and/or molybdenum below a threshold level. For instance, high concentrations of zinc may be toxic to plants. In addition, high concentrations of molybdenum may be harmful to animals feeding on the plants. Moreover, each of zinc, iron, and/or molybdenum and manganese present in the treatment composition may not be soluble above threshold levels (e.g., concentrations, volume, mass, etc.), thereby reducing each of zinc, iron, and/or molybdenum's bioavailability to a plant. For example, at least one challenge with iron is that it is not always present in a soluble form and/or available (e.g., bioavailable) for plant uptake. At least one feature of the present invention is that the plant treatment compositions include novel concentration ranges of zinc, iron, and/or molybdenum that balance these competing considerations.

The compositions can comprise anywhere between 0 wt. % and 100 wt. % zinc compounds, or any increment or range thereof. In some embodiments, the compositions comprise one or more zinc compounds at a concentration of up to about 0.1 wt %, up to about 0.2 wt %, up to about 0.3 wt %, up to about 0.4 wt %, up to about 0.5 wt %, up to about 0.6 wt %, up to about 0.7 wt %, up to about 0.8 wt %, up to about 0.9 wt %, up to about 1.0 wt %, up to about 1.1 wt %, up to about 1.2 wt %, up to about 1.3 wt %, up to about 1.4 wt %, up to about 1.5 wt %, up to about 1.6 wt %, up to about 1.7 wt %, up to about 1.8 wt %, up to about 1.8 wt %, up to about 1.9 wt %, up to about 2.0 wt %, up to about 2.1 wt %, up to about 2.2 wt %, up to about 2.3 wt %, up to about 2.4 wt %, up to about 2.5 wt %, up to about 2.6 wt %, up to about 2.7 wt %, up to about 2.8 wt %, up to about 2.9 wt %, up to about 3.0 wt %, up to about 4.0 wt %, up to about 5.0 wt %, or any increment or range thereof.

In some embodiments, the concentration of the zinc compound may range from about 0.001 wt. % to about 10 wt. %, or preferably from about 0.5 wt. % to about 8 wt. %. In some embodiments, where the concentration of the zinc compound is above about 10 wt. %, the zinc compound is not soluble. Accordingly, in some embodiments, the concentration of the zinc compound is less than about 10 wt. %, less than about 6 wt. %, less than about 4 wt. %, or less than about 2 wt. %. In some embodiments in which the zinc compound includes zinc lactate and zinc sulfate, the concentration of zinc lactate may be less than about 3 wt. %, less than about 2 wt. %, or less than about 1 wt. %, and the concentration of zinc sulfate may be less than about 1.5 wt. %, less than about 1 wt. %, or less than about 0.75 wt. %. In some embodiments, the concentration of zinc lactate is about 1.0-1.1 wt. % and the concentration of zinc sulfate is about 0.6-0.7 wt. %. In some embodiments, the concentration of zinc in the plant treatment composition is less than about 3 wt. %, less than about 2 wt. %, or less than about 1 wt. %. Notwithstanding the above ranges, any suitable concentration range may be used that is not toxic to the plant and/or that does not render the zinc compound insoluble. For example, in other embodiments, concentrations of the zinc compound and/or zinc in the plant treatment composition may be equal to or exceed about 10 wt. %.

The compositions can comprise anywhere between 0 wt. % and 100 wt. % iron compounds, or any increment or range thereof. In some embodiments, the compositions comprise one or more iron compounds at concentrations of up to about 25 wt %, up to about 26 wt %, up to about 27 wt %, up to about 28 wt %, up to about 29 wt %, up to about 30 wt %, up to about 31 wt %, up to about 32 wt %, up to about 33 wt %, up to about 34 wt %, up to about 35 wt %, up to about 36 wt %, up to about 37 wt %, up to about 38 wt %, up to about 39 wt %, up to about 40 wt %, up to about 41 wt %, up to about 42 wt %, up to about 43 wt %, up to about 44 wt %, up to about 45 wt %, up to about 46 wt %, up to about 47 wt %, up to about 48 wt %, up to about 49 wt %, up to about 50 wt %, or any increment or range thereof.

In some embodiments, the concentration of the iron compound may range from about 0.001 wt. % to about 60 wt. %. In some embodiments, where the concentration of the iron compound is above about 60 wt. %, the iron compound is not soluble. Accordingly, in some embodiments, the concentration of the iron compound is less than about 60 wt. %, less than about 50 wt. %, less than about 40 wt. %, less than about 30 wt. %, less than about 20 wt. %, less than about 10 wt. %, less than about 1 wt. %. In embodiments in which the iron compound includes ferric ammonium citrate, the concentration of ferric ammonium may be about 30 wt. %. In some embodiments, the concentration of iron in the plant treatment composition may be less than about 14 wt. %, less than about 13 wt. %, less than about 12 wt. %, less than about 11 wt. %, less than about 10 wt. %, less than about 9 wt. %, less than about 8 wt. %, less than about 7 wt. %, less than about 6 wt. %, less than about 5 wt. %, less than about 4 wt. %, less than about 3 wt. %, less than about 2 wt. %, or less than about 1 wt. %. Notwithstanding the above ranges, any suitable concentration range may be used that does not render the iron compound insoluble. For example, in other embodiments, concentrations of the iron compound and/or iron in the plant treatment composition may equal to or exceed about 60 wt. %.

The compositions can comprise anywhere between 0 wt. % and 100% wt. % molybdenum compounds, or any increment or range thereof. In some embodiments, the compositions comprise one or more molybdenum compounds at concentrations of up to about 0.1 wt. % up to about 0.1 wt %, up to about 0.2 wt %, up to about 0.3 wt %, up to about 0.4 wt %, up to about 0.5 wt %, up to about 0.6 wt %, up to about 0.7 wt %, up to about 0.8 wt %, up to about 0.9 wt %, up to about 1.0 wt %, up to about 1.1 wt %, up to about 1.2 wt %, up to about 1.3 wt %, up to about 1.4 wt %, up to about 1.5 wt %, up to about 1.6 wt %, up to about 1.7 wt %, up to about 1.8 wt %, up to about 1.8 wt %, up to about 1.9 wt %, up to about 2.0 wt %, up to about 2.1 wt %, up to about 2.2 wt %, up to about 2.3 wt %, up to about 2.4 wt %, up to about 2.5 wt %, up to about 2.6 wt %, up to about 2.7 wt %, up to about 2.8 wt %, up to about 2.9 wt %, up to about 3.0 wt %, up to about 4.0 wt %, up to about 5.0 wt %, or any increment or range thereof.

In some embodiments, the concentration of the molybdenum compound may range from about 0.001 wt. % to about 2 wt. %. In some embodiments, where the concentration of the molybdenum compound is above about 2 wt. %, the molybdenum is not soluble. Accordingly, in some embodiments, the concentration of the molybdenum compound is less than about 2 wt. %, less than about 1.5 wt. %, less than about 1.2 wt. %, or less than about 0.6 wt. %. In embodiments in which the molybdenum compound includes one or more of ammonium molybdate and molybdic acid, the concentration of the ammonium molybdate and/or molybdic acid may be about less than 1.2 wt. %, or about less than 0.6 wt. %. In some embodiments, the concentration of molybdenum in the plant treatment composition may be less than about 0.6 wt. % or at least about 0.3 wt. %. Notwithstanding the above ranges, any suitable concentration range may be used that does not render the molybdenum compound insoluble. For example, in other embodiments, concentrations of the molybdenum compound and/or molybdenum in the plant treatment concentration may be equal to or exceed about 2 wt. %.

The compositions can comprise anywhere between 0 wt. % and 100% wt. % manganese compounds, or any increment or range thereof. In some embodiments, the compositions comprise one or more molybdenum compounds at concentrations of up to about 0.1 wt %, up to about 1 wt %, up to about 2 wt %, up to about 3 wt %, up to about 4 wt %, up to about 5 wt %, up to about 10 wt %, up to about 15 wt %, up to about 20 wt %, up to about 25 wt %, up to about 30 wt %, up to about 35 wt %, up to about 40 wt %, up to about 45 wt %, up to about 50 wt %, up to about 55 wt %, up to about 60 wt %, or any increment or range thereof.

In some embodiments, the concentration of the manganese compound may range from about 0.001 wt. % to about 3 wt. %. In many embodiments, the concentration of the manganese compound is less than about 2 wt. %, less than about 1.5 wt. %, less than about 1.2 wt. %, or less than about 0.6 wt. %. Notwithstanding the above ranges, any suitable concentration range may be used that does not render the manganese compound insoluble. For example, in other embodiments, concentrations of the manganese compound and/or manganese in the plant treatment concentration may be equal to or exceed about 1.5 to about 2.5 wt. %.

The compositions can be prepared using carriers. Carriers are ideally inert materials that do not react with the active components of the composition chemically, or bind the active components physically by absorption or adsorption. Liquid carriers may include pure water, such as reverse osmosis water, or other liquids, such as crop oils or surfactants which are compatible with the composition and plant tissue. The composition may be at least about 50% water by weight, at least about 65% water by weight, at least about 75% water by weight, at least about 85% water by weight, or at least about 90% water by weight. In some embodiments, the composition will be about 60% to about 70% water, 80% to about 99% water, about 85% to about 98% water, about 90% to about 95% water, or about 91% to about 94% water.

In some other compositions it is preferable to use solid carriers, such as diatomaceous earth, finely ground limestone ($CaCO_3$), or magnesium carbonate ($MgCO_3$). Sugars such as sucrose, maltose, maltodextrin, or dextrose may also be used as solid carriers. In other compositions, it is beneficial to use a combination of solid and liquid carriers.

The composition may also include a fiber, for example, a fiber that can act as a food source for beneficial bacteria in soil or another growth medium. Fiber can also act as an adherent. Soluble fibers are preferred as they generally enhance product efficacy and stability by keeping less soluble materials in solution or suspension due to their inherent charge and ability to disperse other charged components in solution. Soluble fibers also allow for higher composition-to-seed adhesion in pre-treatment. Fiber content within the composition is adjustable to better maintain less soluble materials in solution or suspension, and to modify composition "stickiness". Higher fiber content and "stickiness" is often desirable in seed pre-treatments in order to ensure sufficient composition binding to and coverage of the seeds. Fiber content and type can also be modified to control composition-seed adhesion time, and adhesion strength. Because seeds can be pre-treated off-site and must be transported to farms, adhesion strength is important to ensure that pre-treatment compositions do not shake, rub, or fall off the seeds during processing, shipping, storage, or planting. The higher fiber content and overall concentration of pre-treatment compositions in comparison foliar and in-furrow application compositions may increase composition density. Lower fiber content may be preferable for liquid foliar or in-furrow application compositions, which ideally have lower percent solids and viscosities to allow for easier transport and application, and to minimize equipment clogging. In some embodiments, the fiber includes commercially available Penetrate. Suitable and effective fibers include hemicellulose, for example, the hemicellulose extracted from Larch trees. In some embodiments, the fiber is larch arabinogalactan. Another example of a suitable fiber is commercially available as Penetrate. Another example of a suitable fiber is a yucca plant extract, commercially available as Saponix 5000 or BioLiquid 5000.

The composition can further include one or more enzymes, including a blend of enzymes. The enzymes can serve to break down cellulosic material and other material, including stover left on a field after harvest. Useful and beneficial enzymes include enzymes which break down starch, such as amylases, enzymes which break down protein, such as proteases, enzymes which break down fats and lipids, such as lipases, and enzymes which break down cellulosic material, such as cellulases.

The composition can include one or more pesticides. For example, the composition can include one or more compatible herbicides, such as glyphosate. The composition can include many different types of fungicides, which may contain active ingredients including but not limited to: chlorothalonil, copper hydroxide, copper sulfate, mancozeb, flowers of sulfur, cymoxanil, thiabendazole, captan, vinclozolin, maneb, metiram, thiram, ziram, iprodione, fosetylaluminum, azoxystrobin, and metalaxyl. The composition can include many different types of insecticides, which may contain active ingredients including but not limited to: aldicarb, acephate, chlorpyrifos, pyrethroids, malathion, carbaryl, sulfuryl fluoride, naled, dicrotophos, phosmet, phorate, diazinon, dimethoate, azinphos-methyl, endosulfan, imidacloprid, and permethrin. The composition can include many different types of herbicides, which may contain active ingredients including but not limited to: diuron, 2-methyl-4-chlorophenoxyacetic acid (MCPA), paraquat, dimethenamid, simazine, trifluralin, propanil, pendimenthalin, metolachlor-S, glyphosate, atrazine, acetochlor, "2,4-D", methylchlorophenoxypropionic acid (MCPP), pendimethalin, dicamba, pelarganoc acid, triclopyr, monosodium methyl arsenate (MSMA), sethoxydim, quizalofop-P, primisulfuron, imazamox, cyanazine, bromoxylin, s-ethyl dipropylthiocarbamate (EPTC), glufosinate, norflurazon, clomazone, fomesafen, alachlor, diquat, and isoxaflutole.

The composition can be prepared with and/or combined with an in-furrow treatment composition. The in-furrow treatment composition may include a mineral chelated compound and a mineral salt. For example, the mineral of the mineral chelated compound may include a mineral, such as one or more of cobalt and manganese. The chelate of the mineral chelated compound may include lactate and an anion of the mineral salt compound may include sulfate. In many embodiments, the in-furrow treatment composition may include one or more of a cobalt lactate, cobalt sulfate, one or more iron compounds (e.g., iron ammonium sulfate, iron sulfate, iron diethylenetriamine pentaacetic acid, and/or ferric ammonium citrate), manganese lactate, an emulsifier, a surfactant (e.g., Saponix 5000), and a soluble fiber (e.g., liquid arabinogalactan).

In one embodiment, the composition is prepared to provide high percentages of aqueous soluble minerals. Additional optional components include forms of soluble calcium, boric acid, and the like.

In some embodiments, the composition includes a carrier, a zinc compound, an iron compound, a molybdenum compound, additional chelated or inorganic salts, soluble fiber, and enzymes. Some exemplary chelated or inorganic salts particular to this embodiment include salts of scandium, selenium, titanium, vanadium, chromium, manganese, iron, zinc, molybdenum, or combinations thereof.

In some embodiments, the composition can contain up to 98% carrier, such as water, 0-40% of one or more of zinc, iron, and molybdenum compounds, 0-60% of one or more exemplary chelated or inorganic salts, 0-15% fiber, and 0-0.1 enzymes. In some such embodiments the fiber can be soluble.

Another composition that can be used to treat seeds, plants, and soil is a dry mixture of components that can be applied as a powder to a desired target (e.g., seed, plants, or soil). Components that can be included in such a composition include a zinc compound, iron compound, molybdenum compound, dextrose, manganese sulfate, yucca extract, hemicellulosic fiber, and enzymes capable of digesting cellulosic fiber.

Another composition that can be used to treat seeds, plants, and soil is a treatment composition that includes a zinc compound, iron compound, and molybdenum compound and various other components such as fiber and enzymes. A treatment composition of the invention can be an aqueous solution or aqueous dispersion or suspension.

In one embodiment, a composition can include about 85% to about 95% water, zinc lactate and/or zinc sulfate, one or more iron compounds (e.g., iron ammonium sulfate, iron sulfate, iron diethylenetriamine pentaacetic acid, and/or ferric ammonium citrate), ammonium molybdate or molybdic acid, cobalt lactate, iron-EDTA or iron lactate, manganese-EDTA or manganese lactate, soluble hemicellulosic fiber, and enzymes that can facilitate the degradation of cellulosic material.

In some embodiments, the composition may include water, zinc lactate, zinc sulfate, one or more iron compounds (e.g., iron ammonium sulfate, iron sulfate, iron diethylenetriamine pentaacetic acid, and/or ferric ammonium citrate), and ammonium molybdate (e.g., ammonium molybdate (IV), tetrahydrate). In some embodiments, the composition may further include molybdic acid.

In some embodiments, the composition may include water, zinc lactate, zinc sulfate, one or more iron compounds (e.g., iron ammonium sulfate, iron sulfate, iron diethylenetriamine pentaacetic acid, and/or ferric ammonium citrate), and molybdic acid. In some embodiments, the composition may further include ammonium molybdate (e.g., ammonium molybdate (IV), tetrahydrate).

In some embodiments, the composition may include water, zinc lactate, one or more iron compounds (e.g., iron ammonium sulfate, iron sulfate, iron diethylenetriamine pentaacetic acid, and/or ferric ammonium citrate), and ammonium molybdate (e.g., ammonium molybdate (IV), tetrahydrate). In some embodiments, the composition may further include molybdic acid.

In some embodiments, the composition may include water, zinc lactate, one or more iron compounds (e.g., iron ammonium sulfate, iron sulfate, iron diethylenetriamine pentaacetic acid, and/or ferric ammonium citrate), and molybdic acid. In some embodiments, the composition may further include ammonium molybdate (e.g., ammonium molybdate (IV), tetrahydrate).

In some embodiments, the composition may include water, a zinc compound, iron compound, and molybdenum compound.

In some embodiments, the composition may include water, a zinc compound, iron compound, molybdenum compound, and manganese compound.

In some embodiments, the composition may include water, a zinc compound, iron compound, molybdenum compound, and optionally an additional component.

In some embodiments, the composition may include water, zinc lactate, zinc sulfate, one or more iron compounds (e.g., iron ammonium sulfate, iron sulfate, iron diethylenetriamine pentaacetic acid, and/or ferric ammonium citrate), ammonium molybdate, potassium benzoate. For example, in some embodiments, the composition comprises about 50-60% (w/w) of water, about 0.5-1.5% (w/w) of zinc lactate dihydrate, about 0.25-0.75% (w/w) of zinc sulfate monohydrate, about 25-35% of one or more iron compounds (e.g., iron ammonium sulfate, iron sulfate, iron diethylenetriamine pentaacetic acid, and/or ferric ammonium citrate), about 0.25-0.75% (w/w) of ammonium molybdate (VI) tetrahydrate), about 0.15-0.30% (w/w) potassium benzoate, and optionally about 5-15% of an additional component.

In some embodiments, the composition comprises about 50% to 60% by weight of reverse osmosis water, about 0.8% to 1.2% by weight of zinc lactate dihydrate, about 0.5% to 1.0% by weight of zinc sulfate monohydrate, about 25% to 35% of one or more iron compounds (e.g., iron ammonium sulfate, iron sulfate, iron diethylenetriamine pentaacetic acid, and/or ferric ammonium citrate), about 0.25% to 0.75% ammonium molybdate (VI) tetrahydrate, about 0.1% to 0.3% potassium benzoate, and an optional additional nutrient source or fertilizer.

FIG. 1 is a flowchart of a method 100 of preparing a seed, soil, or plant treatment composition (e.g., including a biostimulant and/or biostimulant composition) comprising contacting 101 one or more of a zinc precursor, iron precursor, and molybdenum precursor with a carboxylic acid to form one or more of a carboxylate salt of zinc or a zinc chelated compound, a carboxylate salt of iron or an iron chelated compound, and/or a carboxylate salt of molybdenum or a molybdenum chelated compound, optionally adding 102 one or more mineral salts and/or one or more mineral chelates to any one of the carboxylate salts, and mixing 103 the solution to form the treatment composition. Optionally, any of the other components described herein may be added before, during, and/or after steps 101, 102, and/or 103. For example, one or more of a carrier, solid carrier, fiber, enzyme, pesticide, fungicide, insecticide, herbicide, chelated or inorganic salts, and any other component described herein may be added and/or combined before, during, and/or after any of steps 101, 102, and/or 103.

At step 101, one or more of a zinc precursor, iron precursor, and/or molybdenum precursor may be contacted with a carboxylic acid to form, optionally in solution, one or more of a carboxylate salt of zinc or a zinc chelated compound, carboxylate salt of iron or an iron chelated compound, and carboxylate salt of molybdenum or a molybdenum chelated compound. In some embodiments, the contacting proceeds in water. The volume of water may be about half of the total volume of water to be included. The solution may be reacted over a period of time, sufficient to provide a carboxylate salt of zinc or a zinc chelated compound, a carboxylate salt of iron or an iron chelated compound, and/or a carboxylate salt of molybdenum or a molybdenum chelated compound. The solution may be stirred for a period of time (e.g., about 1 hour) and heated to a temperature (e.g., 80° F. to 100° F.).

Carboxylic acid may be contacted with the zinc, iron, and/or molybdenum precursors such as by mixing, stirring, agitating, vibrating, shaking, turning, spinning, and/or other conventional techniques known in the art for contacting. If the carboxylic acid is lactic acid, the carboxylic acid content may be about 0.01% to about 10% of the mixture by weight. The content of the zinc precursor, iron precursor, and/or molybdenum precursor may include about 0.01% to about 3% of the mixture by weight. More specifically, the lactic acid may include about 1.8% to about 7.5% and the zinc precursor, iron precursor, and/or molybdenum precursor may include about 0.7% to about 2.8% of the mixture by weight.

The carboxylic acid and zinc precursor, iron precursor, and/or molybdenum precursor may be placed in a vessel, optionally with one or more catalysts. Examples of a catalyst include iron and alkaline earth metals. The vessel may be optionally agitated, such as by vibrating, shaking, turning, or spinning, or the solution mixed or stirred. Water may be added to the vessel before, during, or after the contacting of the carboxylic acid with the compound containing one or more of zinc, iron, and molybdenum. Once a solution is formed, it may be reacted over a period of time. The reaction may initiate based solely on the contact between carboxylic acid and the zinc precursor, iron precursor, and/or molybdenum precursor, after addition or contact with a catalyst or similarly with the contact or addition of water of some combination thereof. Depending on the type of zinc precursor, iron precursor, and/or molybdenum precursor being utilized, carbon dioxide may be evolved as the solution heats up. Both water vapor and optionally carbon dioxide may be generated and released from the vessel. In some embodiments, no reflux process is needed or desired, as often used conventionally with regard to related reactions. By-products may be passively and naturally removed, without the need for solvent removal or refluxing. Carbon dioxide and water may be released to the atmosphere, for example.

Once the compound and carboxylic acid are allowed to react over a period of time, the formation of a carboxylate salt of zinc or a zinc chelated compound, a carboxylate salt of iron or an iron chelated compound, and/or a carboxylate salt of molybdenum or a molybdenum chelated compound may be confirmed by observing the solution. In some embodiments, once the a carboxylate salt of zinc or a zinc chelated compound, a carboxylate salt of iron or an iron chelated compound, and/or a carboxylate salt of molybdenum or a molybdenum chelated compound is/are formed, the solution may be clear or about clear.

At step 102, other compounds can be added to the solution. In some embodiments, the other compounds are selected from mineral salts and/or mineral chelates. Any of the mineral salts and/or mineral chelates of the present disclosure may be used herein. In some embodiments, if a zinc precursor was added in step 101, additional zinc compounds can be added at step 102. In some embodiments, if step 101 did not include adding any zinc precursors, a zinc compound can be added in step 102. In some embodiments, if an iron precursor was added in step 101, additional iron compounds can be added at step 102. In some embodiments, if step 101 did not include adding any iron precursors, an iron compound can be added in step 102. In some embodiments, if a molybdenum precursor was added in step 101, additional molybdenum compounds can be added at step 102. In some embodiments, if step 101 did not include adding any molybdenum precursors, a molybdenum compound can be added in step 102.

In some embodiments, one or more of iron compounds, molybdenum compounds, and manganese compounds may be added to the solution at step 102. The remaining water to be added to the solution may be provided before, during, or after one or more of the iron compound, molybdenum compound, and manganese compound are added to the solution. In some embodiments, another zinc compound may be added to the solution. For example, in some embodiments, zinc sulfate may be added to the solution. Upon adding one or more of an iron compound, molybdenum compound, and zinc compound, the solution may be mixed and/or reacted over a period of time (e.g., about 20 to about 30 minutes) to form the treatment composition.

At step 103, the solution is mixed. Mixing the solution may include one or more of mixing, stirring, agitating, shaking, turning, spinning, and/or other conventional techniques known in the art to facilitate and/or achieve contacting. In many embodiments, the solution may be mixed for a period of time, for example, such as for about 20 minutes to about 30 minutes.

The treatment compositions of the present disclosure provide flexibility and control over numerous applications. The treatment compositions may be combined, mixed, and/or contacted with any of the other components (e.g., components other than a zinc compound, iron compound, and molybdenum compound), including those disclosed herein and those not disclosed herein, to achieve the benefits of the treatment composition of the present disclosure in addition to the benefits provided by the other components (e.g., such as a fertilizer, pesticide, etc.). It may be desirable to vary the components to be combined, mixed, and/or contacted with the treatment composition of the present disclosure over time and/or over the course of a season. For example, some components may be more desirable early in a season and other components may be more desirable later in a season (e.g., before harvesting). In addition, the treatment compositions of the present disclosure may be combined with other components in either a liquid form and/or a solid form.

In some embodiments, the concentrations of each of the zinc compounds, iron compounds, molybdenum compounds, and manganese compounds, if present, are varied depending on any of a variety of factors, including, but not limited to, soil conditions (e.g., presence and/or absence of chemical species and, if present, the concentrations of such species).

Many embodiments relate to compositions that can be used to treat seeds, plants, and soil include mixtures having natural, organic, inorganic, or biological fertilizers, or combinations thereof, with one or more compatible pesticides. These compositions may also contain enzymes, fibers, water, and minerals as discussed above. Such mixtures ensure or enhance seed germination and plant growth, health, and yield while protecting seeds and plants from infection or infestation and harsh conditions, such as drought. Seed pre-treatment has shown to be beneficial for a number of reasons. In general, seed pre-treatment will create a zone of pest suppression after planting in the immediate area of the seed. As a result, fewer pesticide application trips are required, which minimizes physical damage to plants, reduces application and handling costs, and cuts down on pesticide drift problems.

For some pests, such as fungal diseases, protectant seed treatments are preferable to post-infestation or post-infection treatments because the pathogens live in such close association with host plants that it can be difficult to kill the pest without harming the host. Other types of fungicidal seed pre-treatments include seed disinfestation, which controls spores and other forms of disease organisms on the seed surface, and seed disinfection, which eliminates pathogens that have penetrated into the living cells of the seed.

Figure 2:
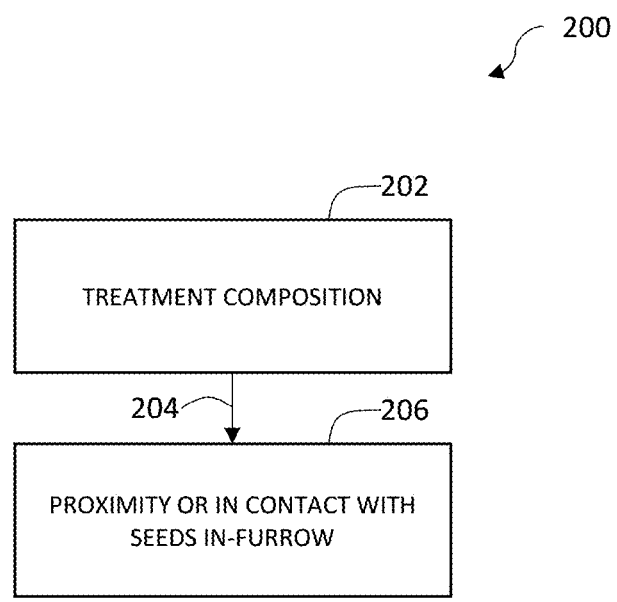
FIG. 2 is a flowchart of a method of using a seed, soil, or treatment composition in-furrow, according to one or more embodiments of the present disclosure.

FIG. 2 is a flowchart of a method 200 of using a treatment composition in-furrow, according to one or more embodiments of the present disclosure. One or more treatment compositions 202 can be applied 204 in proximity or in-contact with one or more seeds in-furrow 206. In order to save a farmer time and increase efficiency, one or more treatment compositions 202 can be simultaneously or near-simultaneously placed in-furrow during planting. In-furrow fertilizers can be applied within proximity to a seed or in contact with a seed to promote more vigorous seedling growth by providing immediate nutrient supply to the plant roots. Proximity of in furrow fertilizer to seeds is determined based fertilizer compositions, such as ammonia and salt content that may be toxic to young seedlings. Soil type can also affect in-furrow fertilization efficacy as dryer, sandier soils can exacerbate root zone drying. Maintaining higher moisture content in soil can improve crop response to in-furrow fertilization by alleviating the effects of salt and ammonia. In addition to in-furrow, the mineral chelated compound can be introduced in a side-dress application, tilled in soil as a soil surface application, and combinations thereof. Any of the treatment compositions of the present disclosure may be used herein. A zinc-iron-molybdenum composition is an example of a treatment composition that can be placed in-furrow with a plant seed without risk or harm or incompatibility with the seeds or proximate chemical treatments. In some embodiments, the treatment composition 202 includes a biostimulant or a biostimulant composition.

In-furrow application compositions can be solids, homogenous liquids, or heterogeneous slurries. Liquid or slurry application compositions may be preferable as they can be applied using common agricultural sprayers and other like equipment. In many embodiments, the treatment compositions are provided in liquid form.

The treatment composition can include one or more zinc compounds, one or more iron compounds, and/or one or more molybdenum compounds. In some embodiments, the compositions further comprise one or more manganese compounds. The treatment composition can also include one or more enzymes, carriers, fiber, or a combination thereof. Examples of such compounds and methods of making are described in co-owned U.S. patent application Ser. No. 12/835,545. These treatment compositions may include any of the components and/or compounds described herein and thus shall not be limiting.

Figure 3:
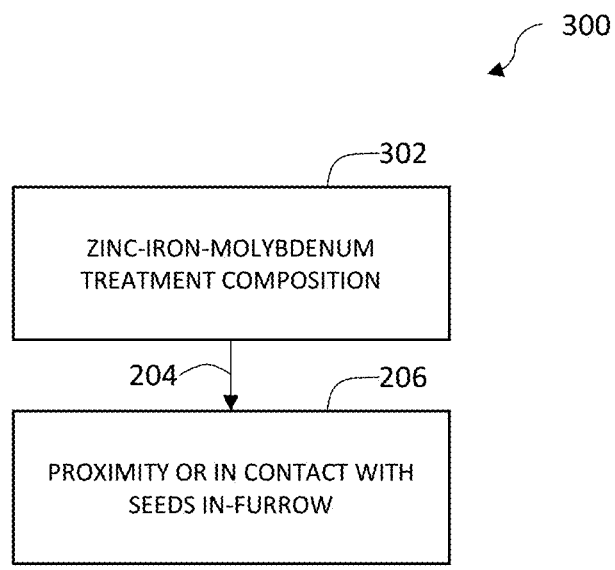
FIG. 3 is a flowchart of a method of using a zinc-iron-molybdenum composition in-furrow, according to one or more embodiments of the present disclosure.

FIG. 3 is a flowchart of a method 300 of using a zinc-iron-molybdenum composition in-furrow, according to one or more embodiments of the present disclosure. The zinc-iron-molybdenum treatment composition 302 can be applied 204 in proximity or in-contact with one or more seeds in-furrow 206. In some embodiments, the treatment composition 302 includes a biostimulant or a biostimulant composition.

Examples of zinc-iron-molybdenum treatment compositions 302 include one or more of a zinc compound, an iron compound, and a molybdenum compound. For example, the zinc-iron-molybdenum treatment compositions may include and/or may be prepared from one or more of a zinc chelated compound, iron chelated compound, and/or molybdenum compound. In addition, the zinc-iron-molybdenum treatment compositions may include one or more of zinc lactate, zinc sulfate, one or more iron compounds (e.g., iron ammonium sulfate, iron sulfate, iron diethylenetriamine pentaacetic acid, and/or ferric ammonium citrate), ammonium molybdate, and molybdic acid. Other components and/or compounds described herein may be added to the zinc-iron-molybdenum treatment compositions and/or the zinc-iron-molybdenum treatment compositions may be combined with any of the other components and/or compounds described herein. The other components and/or compounds may include one or more of a carrier, solid carrier, fiber, enzyme, pesticide, fungicide, insecticide, herbicide, and chelated or inorganic salts.

Figure 4:
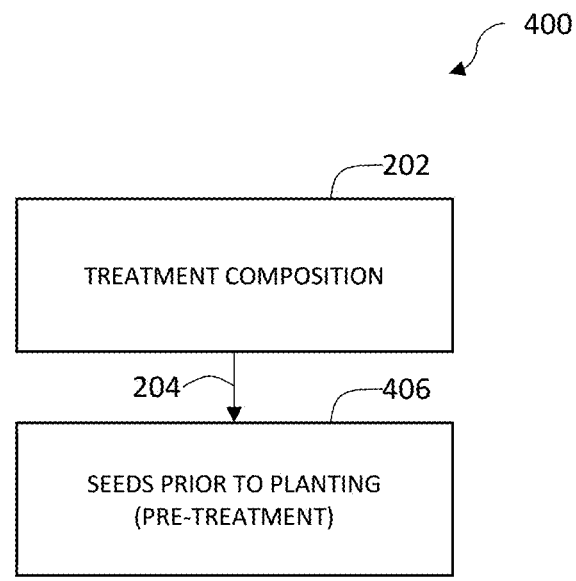
FIG. 4 is a flowchart of a method of using a treatment composition in pre-treatment of seeds, according to one or more embodiments of the present disclosure.

FIG. 4 is a flowchart of a method 400 of using a treatment composition in pre-treatment of seeds, according to one or more embodiments of the present disclosure. The treatment composition 202 can be applied 204 to one or more seeds prior to planting, such as in a pre-treatment stage 406. In some embodiments, the treatment composition 202 includes a biostimulant or a biostimulant composition.

Seed pre-treatment pesticides can be applied as dusts, but are often homogenous solutions or heterogenous slurries or suspensions. Seed treatment or pretreatment 406 can be accomplished within a seed bag or by mechanical means, such as in a tumbler. The one or more seeds can be agitated after applying 204. Agitating can include tumbling, vibrating, mixing, shaking, and combinations thereof. The applying 204 can be accomplished by spraying, pouring or other means of contacting the treatment composition and seeds. Applying 204 a treatment composition can be performed at an end amount of about 4-5 grams/acre, about 2-5 gms/a, about 5-35 gms/a, about 25-70 gms/a, about 45-95 gms/a, about 75-140 gms/a, about 100-500 gms/a or about 5-5000 gms/a, for example. Seed pre-treatment can be carried out at an off-site facility, on-site at the farm, or on-board planting equipment immediately prior to planting.

The treatment composition can be combined with one or more pesticides, including herbicides, insecticides, fungicides, and adherents, including commercial products, without negatively affecting the commercial product or seeds. The adherent can be a polymer (e.g., polysaccharide) such as a biocompatible and biodegradable adhesive material used in agricultural settings.

Figure 5:
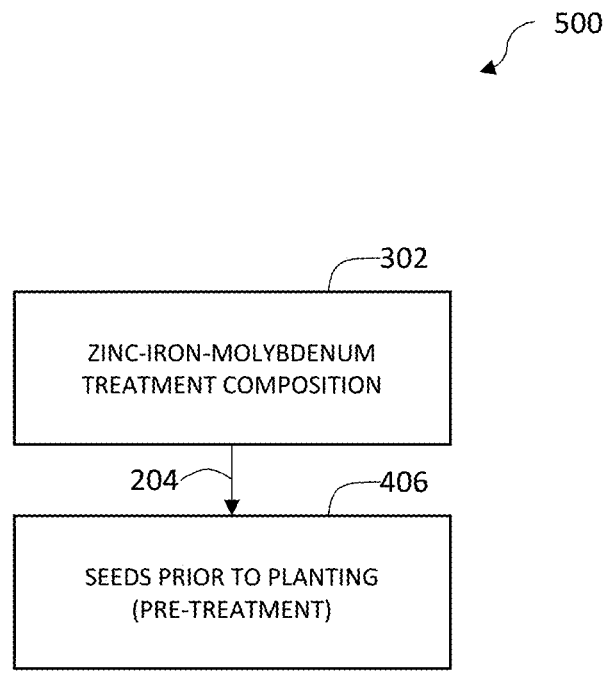
FIG. 5 is a flowchart of a method of using a zinc-iron-molybdenum composition in pre-treatment of seeds, according to one or more embodiments of the present disclosure.

FIG. 5 is a flowchart of a method 500 of using a zinc-iron-molybdenum treatment composition in pre-treatment of seeds, according to one or more embodiments of the present disclosure. One or more zinc-iron-molybdenum treatment compositions 302 can be applied 204 to one or more seeds prior to planting, such as in a pre-treatment stage 406. In some embodiments, the treatment composition 302 includes a biostimulant or a biostimulant composition.

Figure 6:
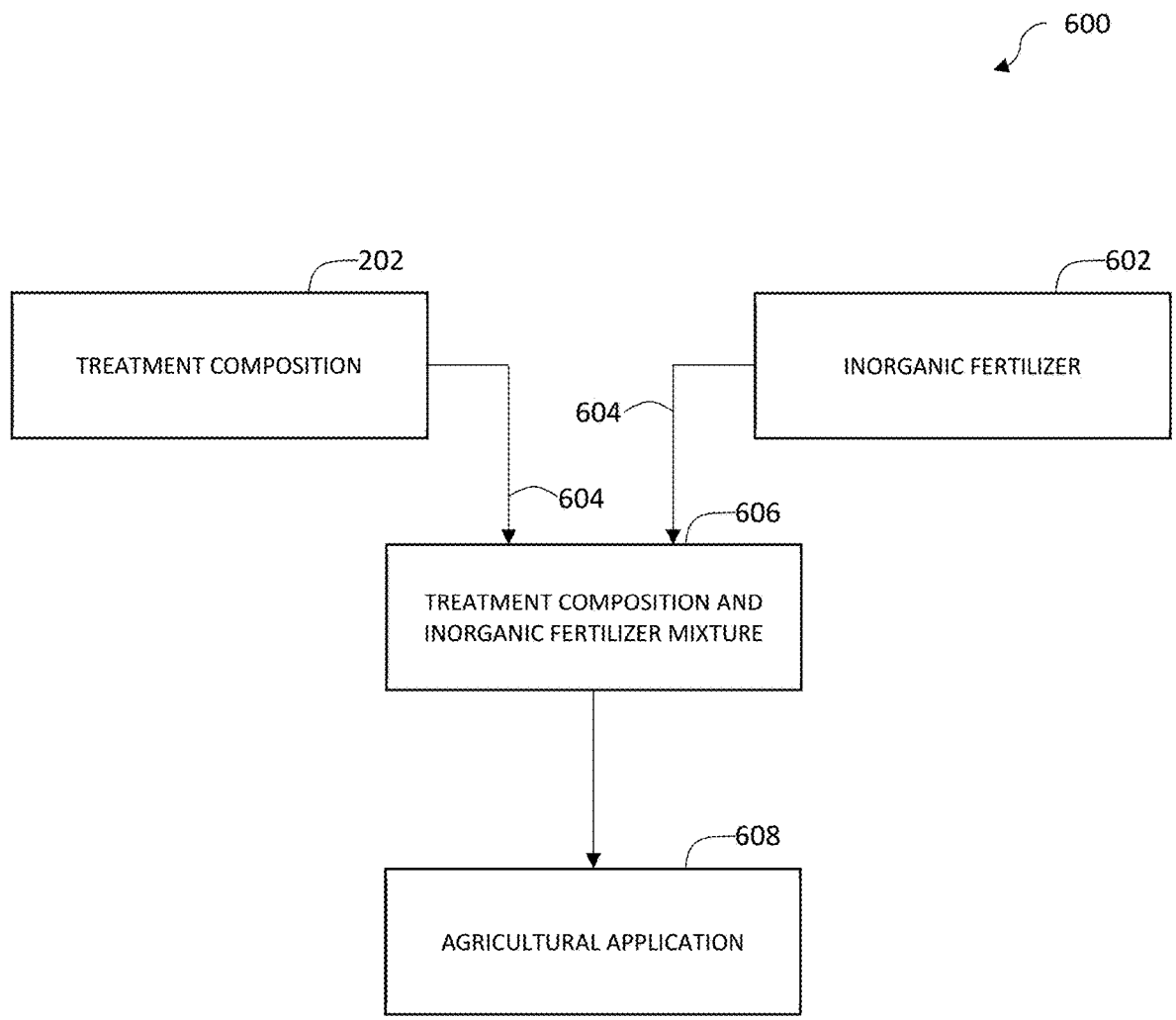
FIG. 6 is a flowchart of a method of using a treatment composition and inorganic fertilizer mixture, according to one or more embodiments of the present disclosure.

FIG. 6 is a flowchart of a method 600 of using a treatment composition and inorganic fertilizer mixture, according to one or more embodiments of the present disclosure. The treatment composition 202 can be contacted 604 or mixed with one or more inorganic fertilizers 602, sufficient to form a mixture 606. The mixture 606 can be used in an agricultural application 608. The applying the mixture in an agricultural application 608 can include one or more of applying to foliar, broadcasting on soil, tilling in soil, and in-furrow. In some embodiments, the treatment composition 202 includes a biostimulant or a biostimulant composition.

Figure 7:
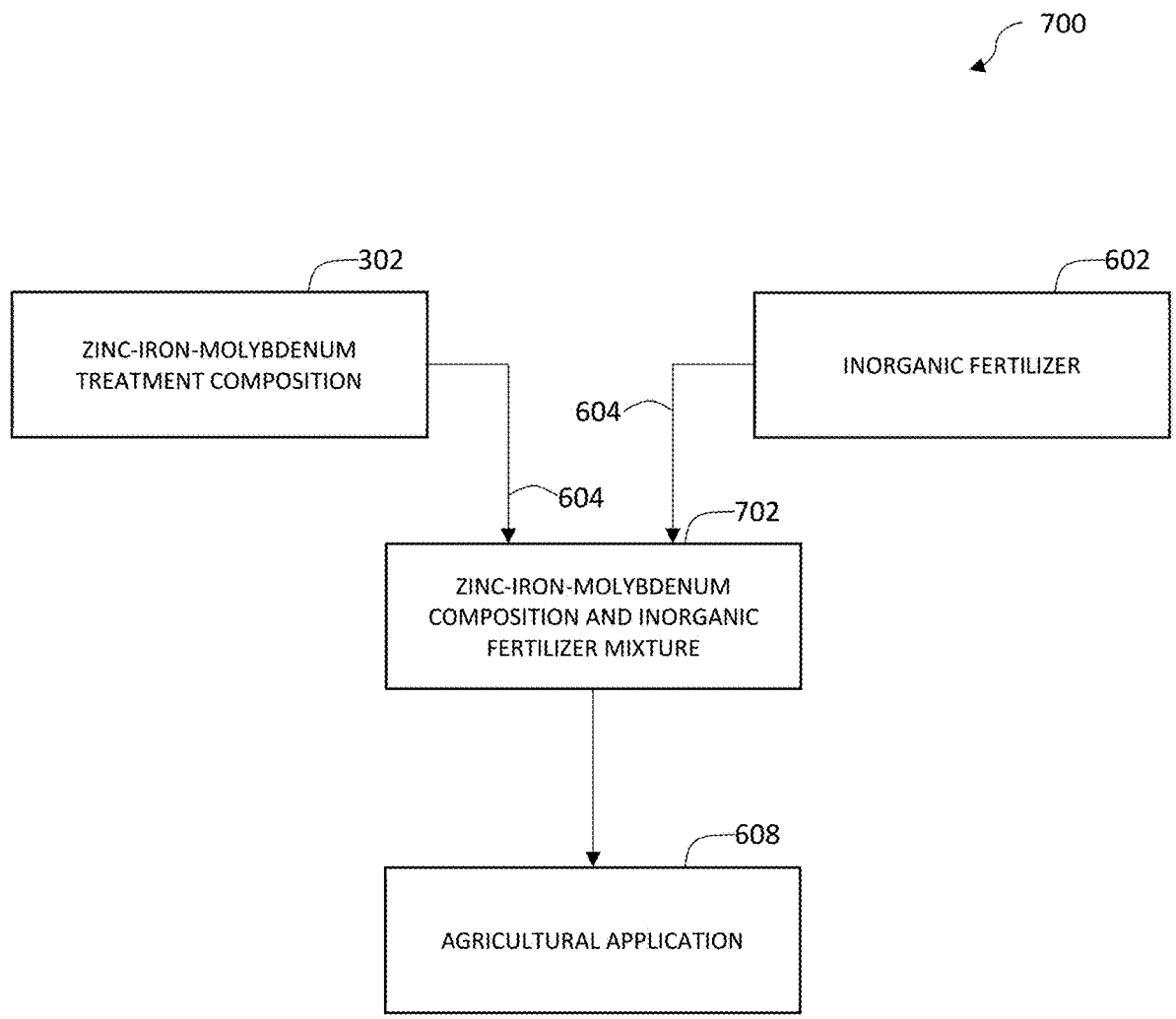
FIG. 7 is a flowchart of a method of using a zinc-iron-molybdenum composition and inorganic fertilizer mixture, according to one or more embodiments of the present disclosure.

FIG. 7 is a flowchart of a method 700 of using a zinc-iron-molybdenum treatment composition and inorganic fertilizer mixture, according to one or more embodiments of the present disclosure. The zinc-iron-molybdenum treatment composition 302 can be contacted 605 or mixed with one or more inorganic fertilizers 602, sufficient to form a mixture 702. The mixture 702 can be used in an agricultural application 608. In some embodiments, the treatment composition 302 includes a biostimulant or a biostimulant composition.

Figure 8:
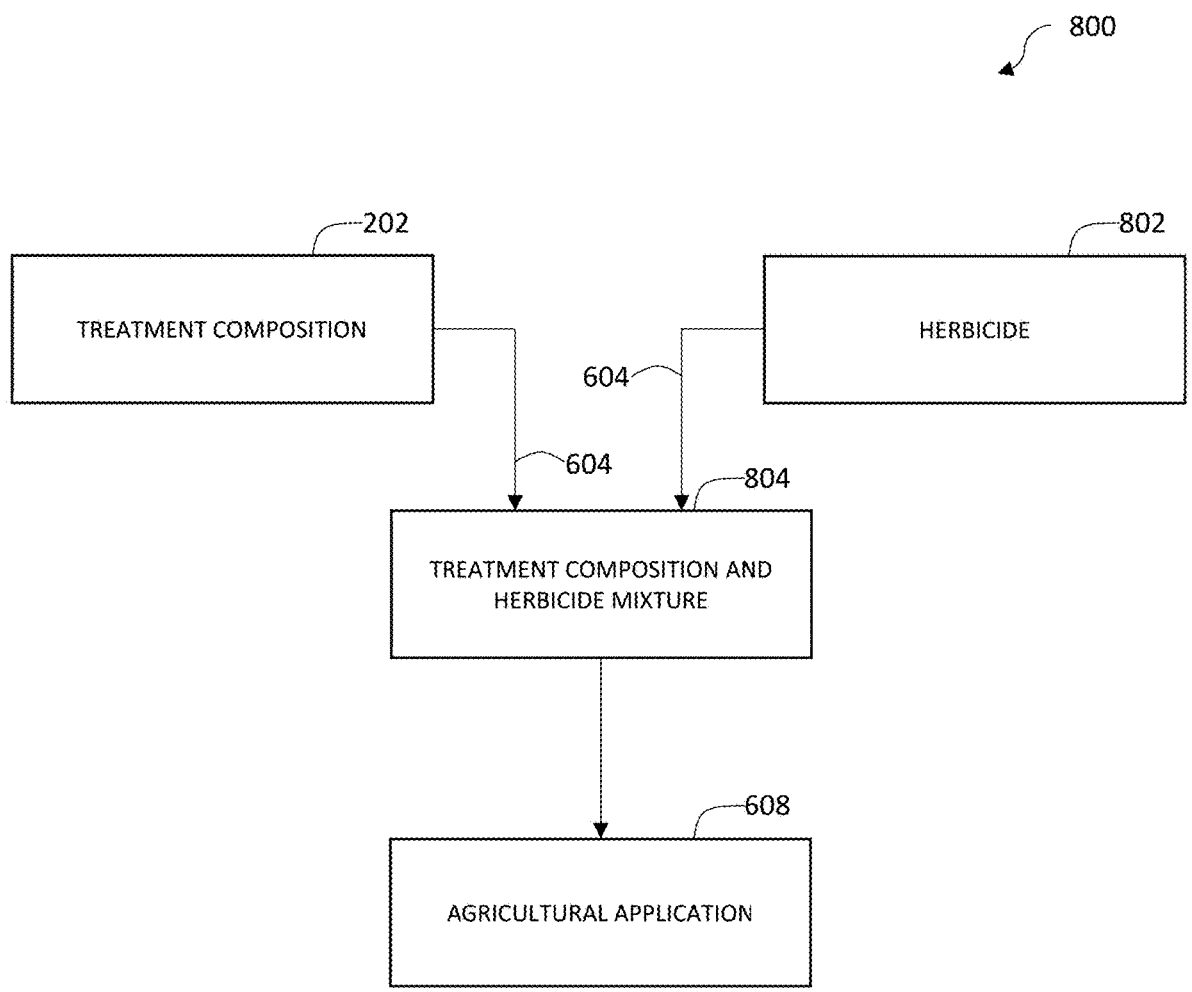
FIG. 8 is a flowchart of a method of using a treatment composition and herbicide mixture, according to one or more embodiments of the present disclosure.

FIG. 8 is a flowchart of a method 800 of using a treatment composition and herbicide mixture, according to one or more embodiments of the present disclosure. The treatment composition 202 can be contacted 604 or mixed with one or more herbicides 802, sufficient to form a mixture 804. The mixture 804 can be used in an agricultural application. In some embodiments, the treatment composition 202 includes a biostimulant or a biostimulant composition.

Figure 9:
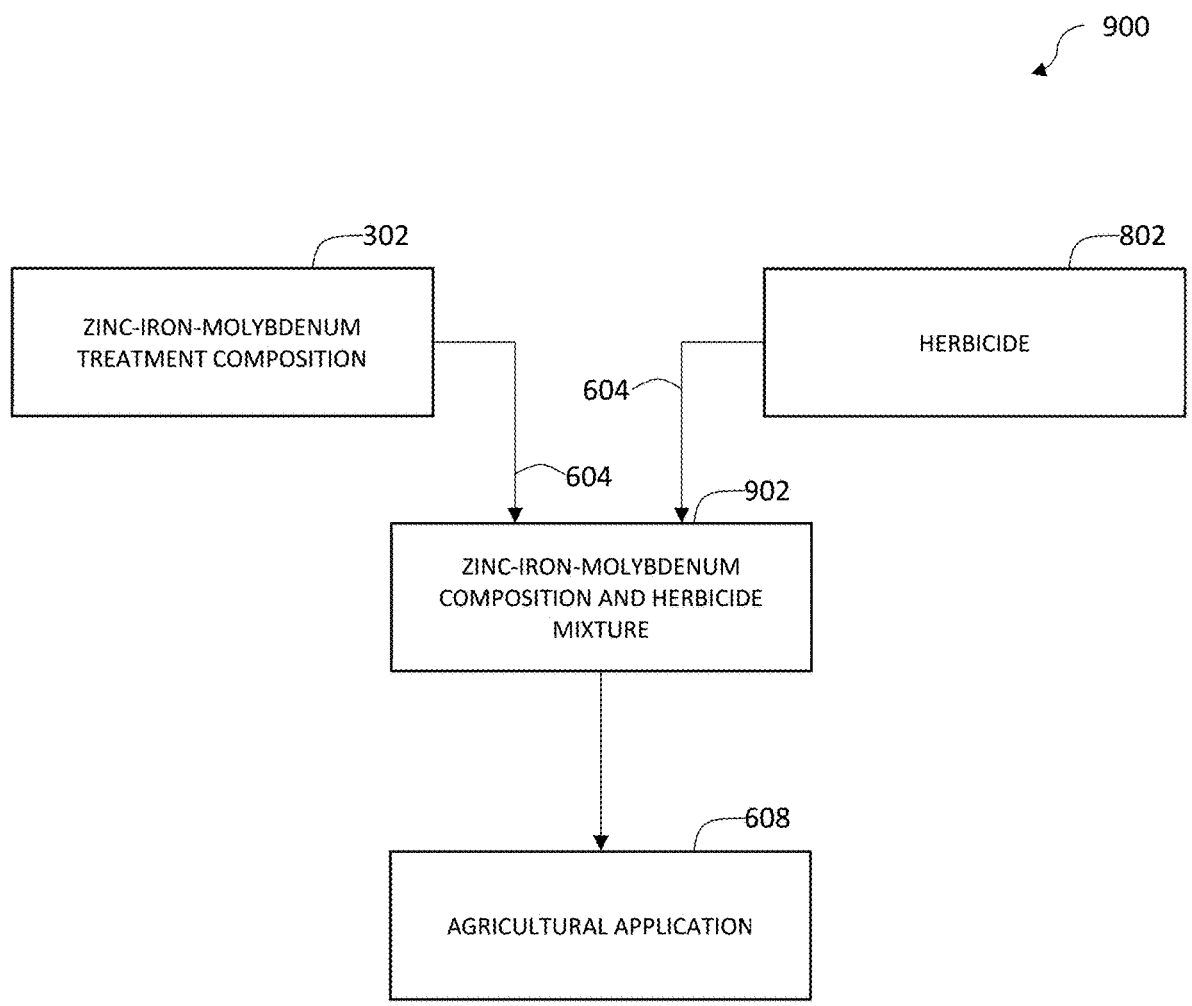
FIG. 9 is a flowchart of a method of using a zinc-iron-molybdenum composition and herbicide mixture, according to one or more embodiments of the present disclosure.

FIG. 9 is a flowchart of a method 900 of using a zinc-iron-molybdenum treatment composition and herbicide mixture, according to one or more embodiments of the present disclosure. The zinc-iron-molybdenum treatment composition 302 can be contacted 604 or mixed with one or more herbicides 802, sufficient to form a mixture 902. The mixture 902 can be used in an agricultural application. In some embodiments, the treatment composition 302 includes a biostimulant or a biostimulant composition.

Figure 10:
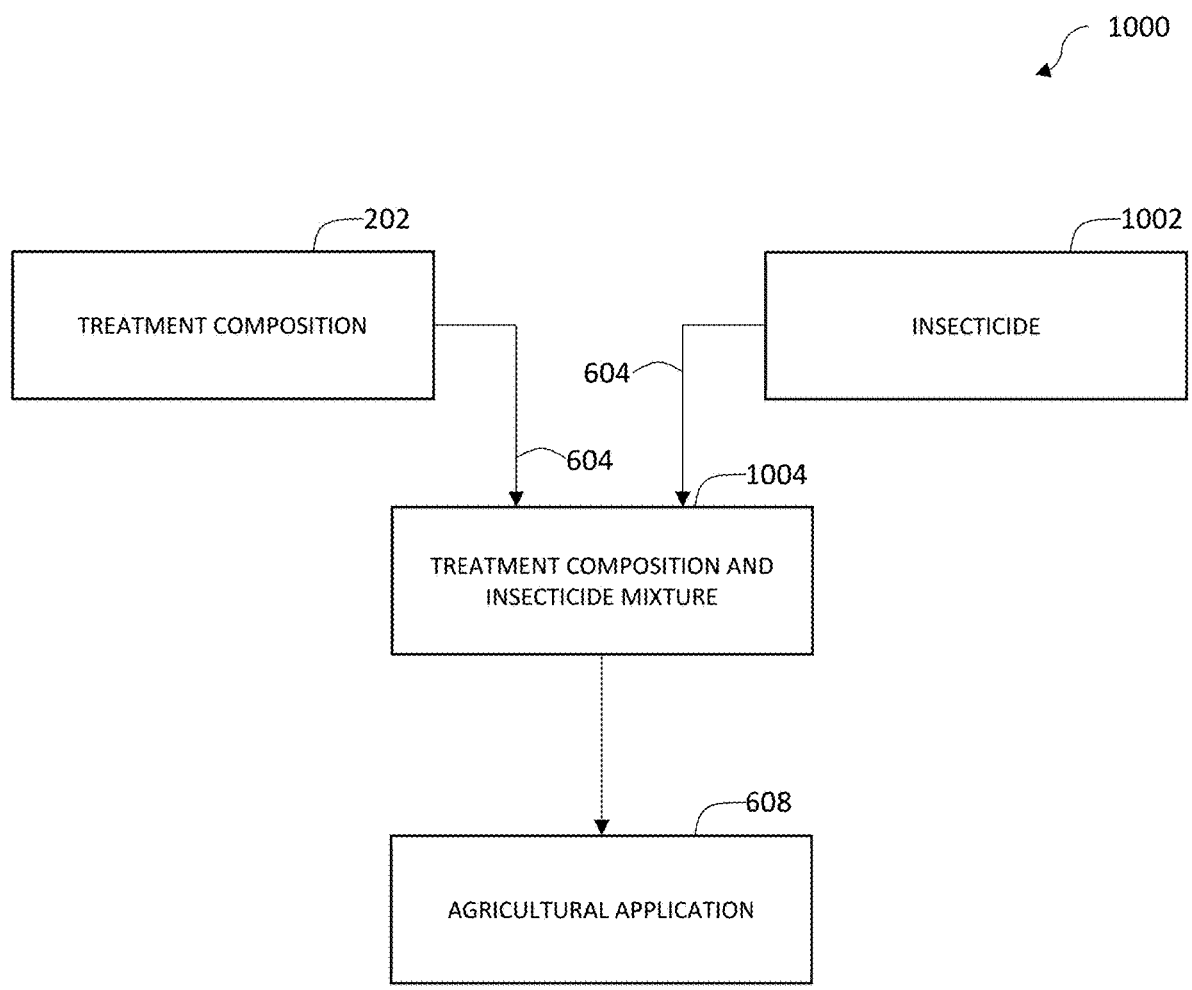
FIG. 10 insecticide mixture, according to one or more embodiments of the present disclosure.

FIG. 10 is a flowchart of a method 1000 of using a treatment composition and insecticide mixture, according to one or more embodiments of the present disclosure. The treatment composition 202 can be contacted 604 or mixed with one or more insecticides 1002, sufficient to form a mixture 1004. The mixture 1004 can be used in an agricultural application 608. In some embodiments, the treatment composition 202 includes a biostimulant or a biostimulant composition.

Figure 11:
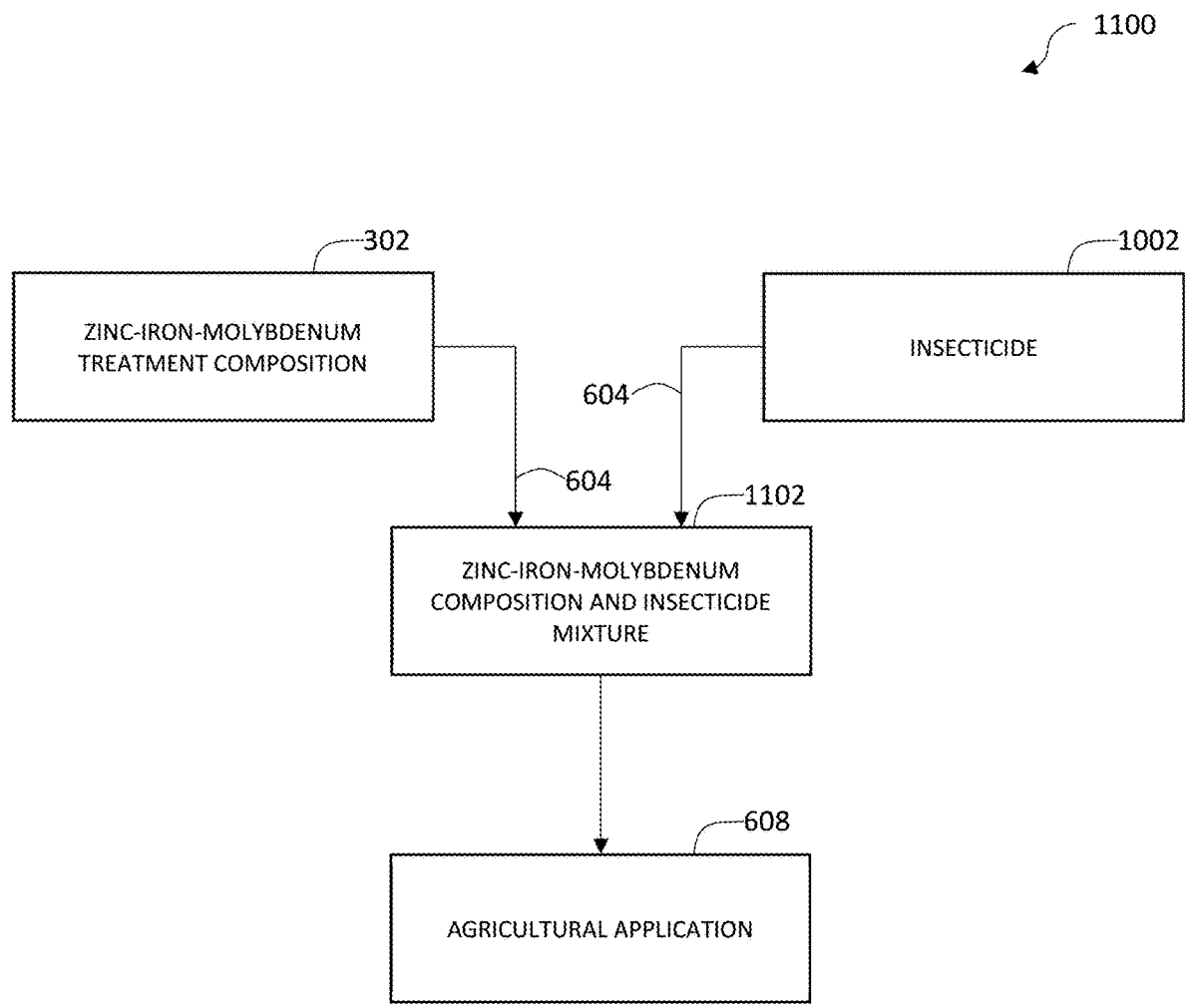
FIG. 11 is a flowchart of a method of using a zinc-iron-molybdenum composition and insecticide mixture, according to one or more embodiments of the present disclosure.

FIG. 11 is a flowchart of a method 1100 of using a zinc-iron-molybdenum treatment composition and insecticide mixture, according to one or more embodiments of the present disclosure. The zinc-iron-molybdenum treatment composition 302 can be contacted 604 with one or more insecticides 1002, sufficient to form a mixture 1102. The mixture 1102 can be used in an agricultural application 608. In some embodiments, the treatment composition 302 includes a biostimulant or a biostimulant composition.

Figure 12:
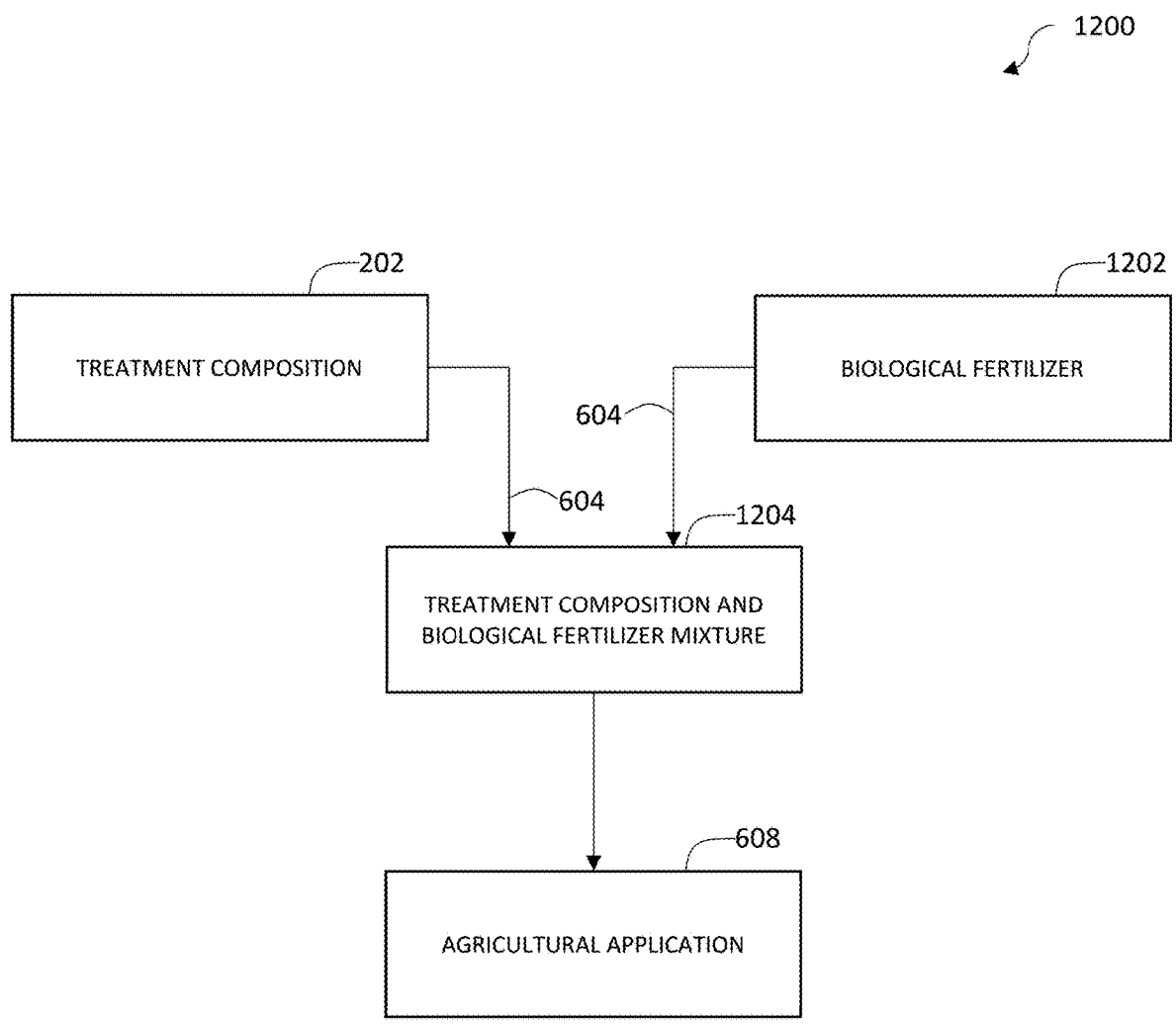
FIG. 12 is a flowchart of a method of using a treatment composition and biological fertilizer, according to one or more embodiments of the present disclosure.

FIG. 12 is a flowchart of a method 1200 of using a treatment composition and biological fertilizer, according to one or more embodiments of the present disclosure. The treatment composition 202 can be contacted 604 or mixed with one or more biological fertilizers 1202, sufficient to form a mixture 1204. The mixture 1204 can be used in an agricultural application 608. In some embodiments, the treatment composition 202 includes a biostimulant or a biostimulant composition.

Figure 13:
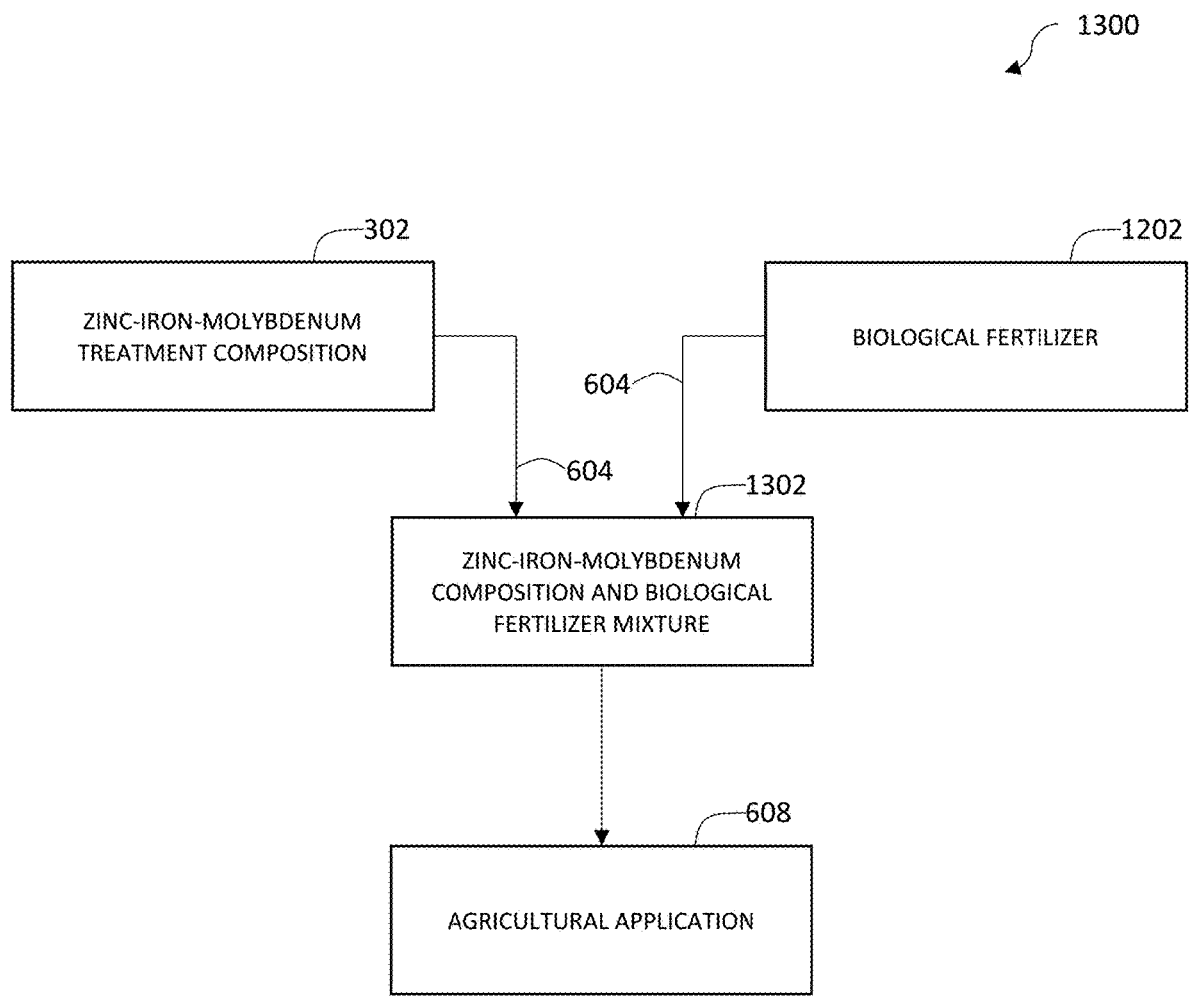
FIG. 13 is a flowchart of a method of using a zinc-iron-molybdenum composition and biological fertilizer, according to one or more embodiments of the present disclosure.
Figure 14:
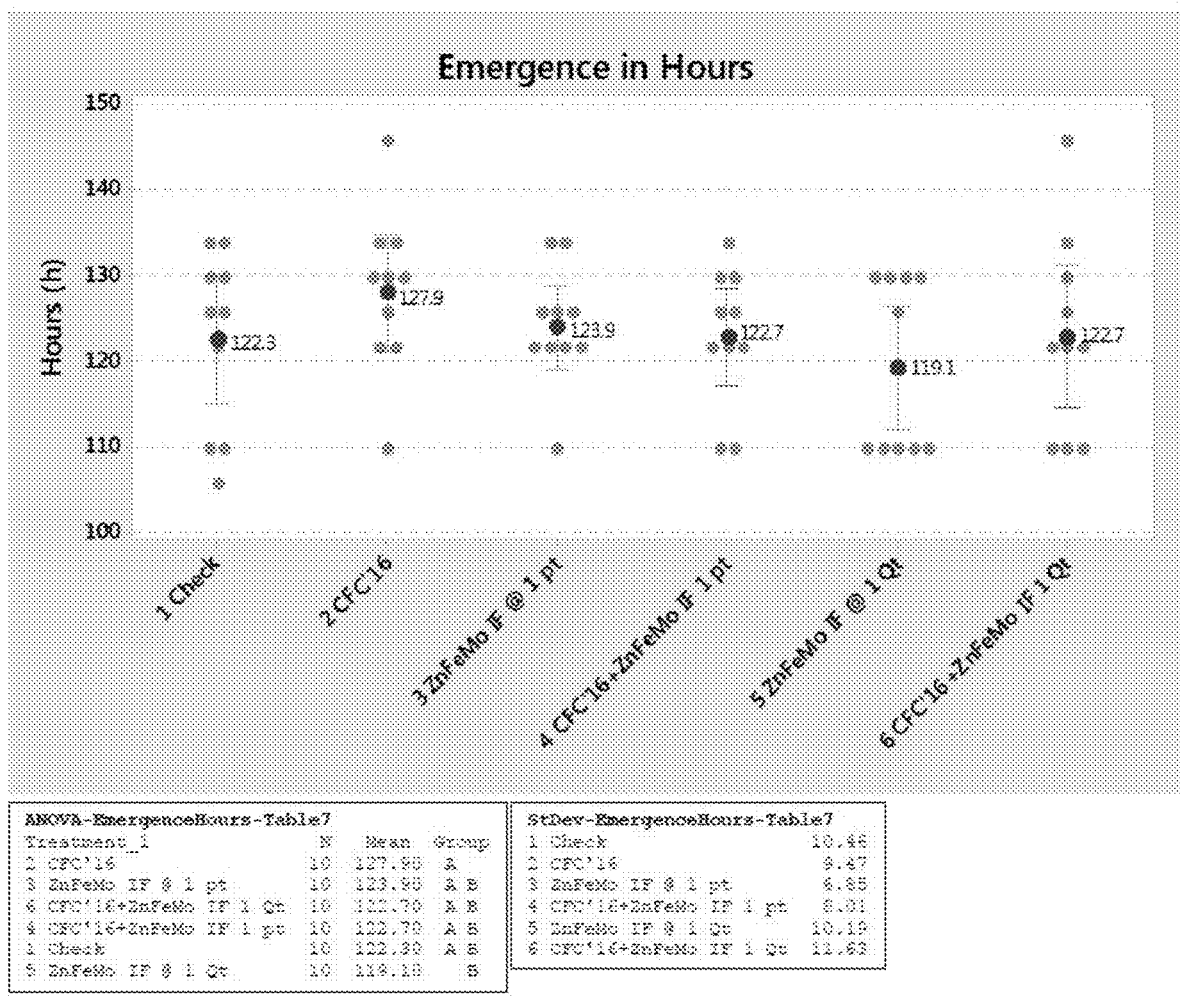
FIG. 14 is a graphical view plant emergence, according to one or more embodiments of the present disclosure.
Figure 15:
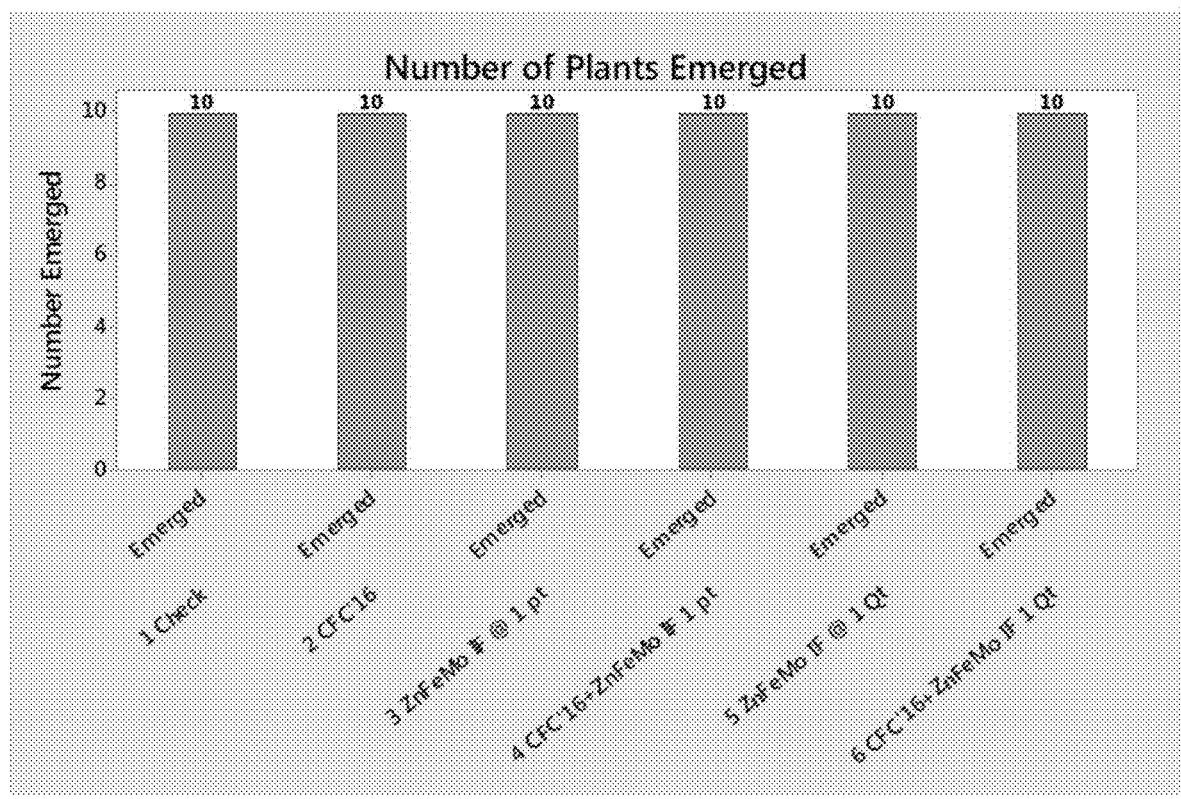
FIG. 15 is a graphical view of the number of plants emerged, according to one or more embodiments of the present disclosure.
Figure 16:
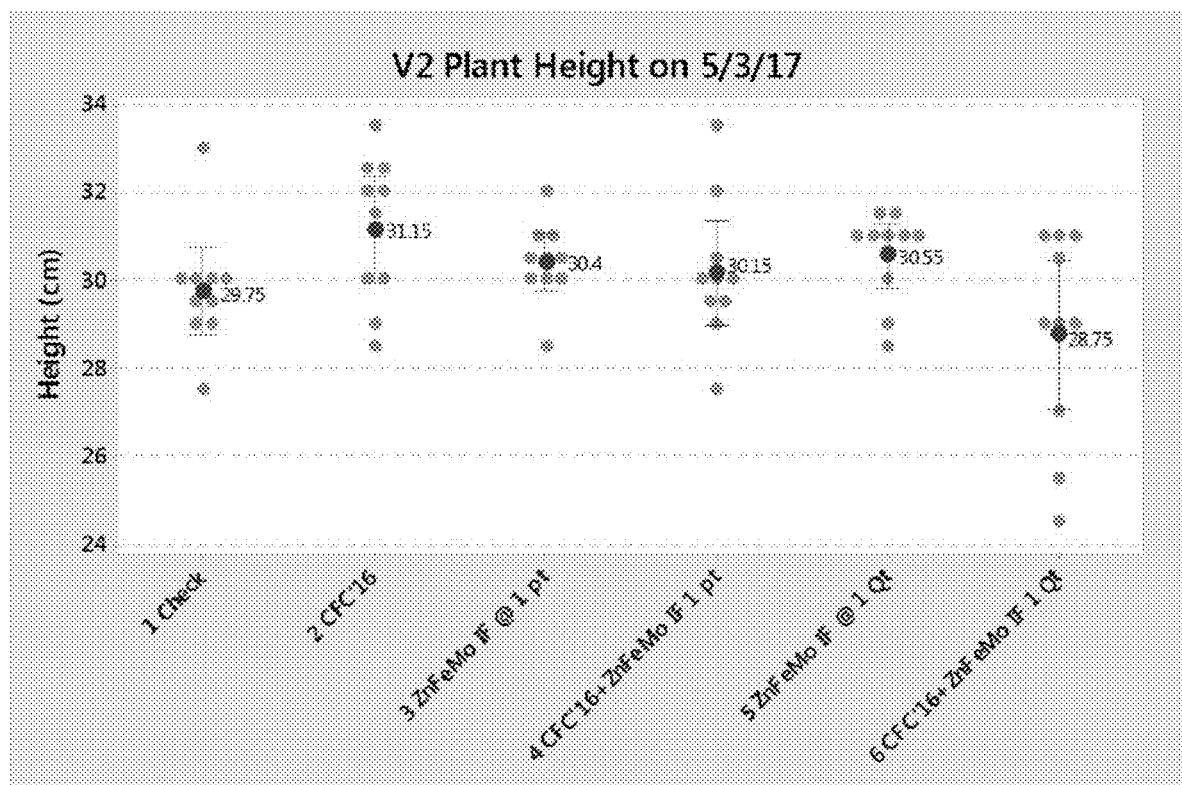
FIG. 16 is a graphical view of plant height, according to one or more embodiments of the present disclosure.
Figure 17:
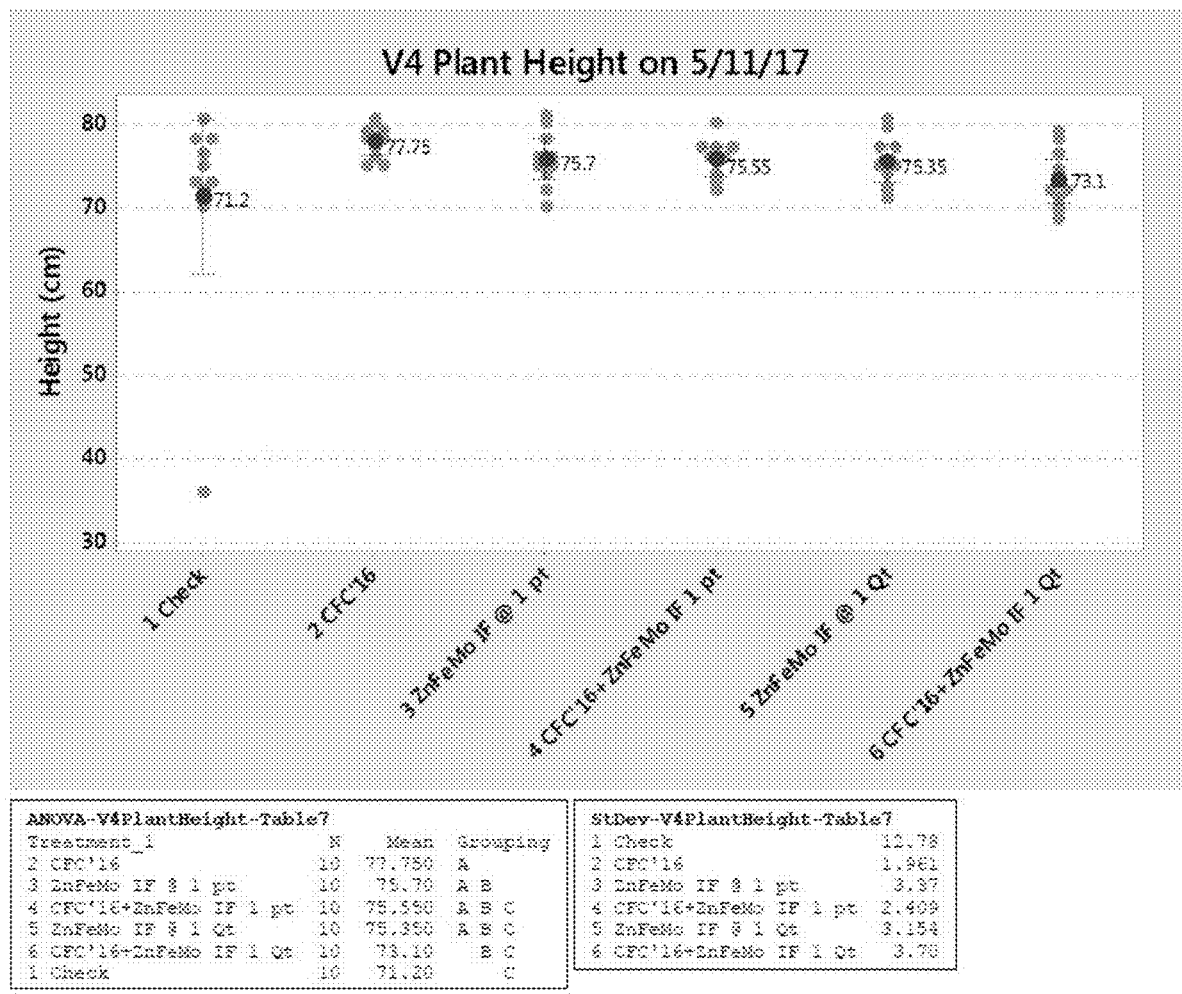
FIG. 17 is a graphical view of plant height, according to one or more embodiments of the present disclosure.
Figure 18:
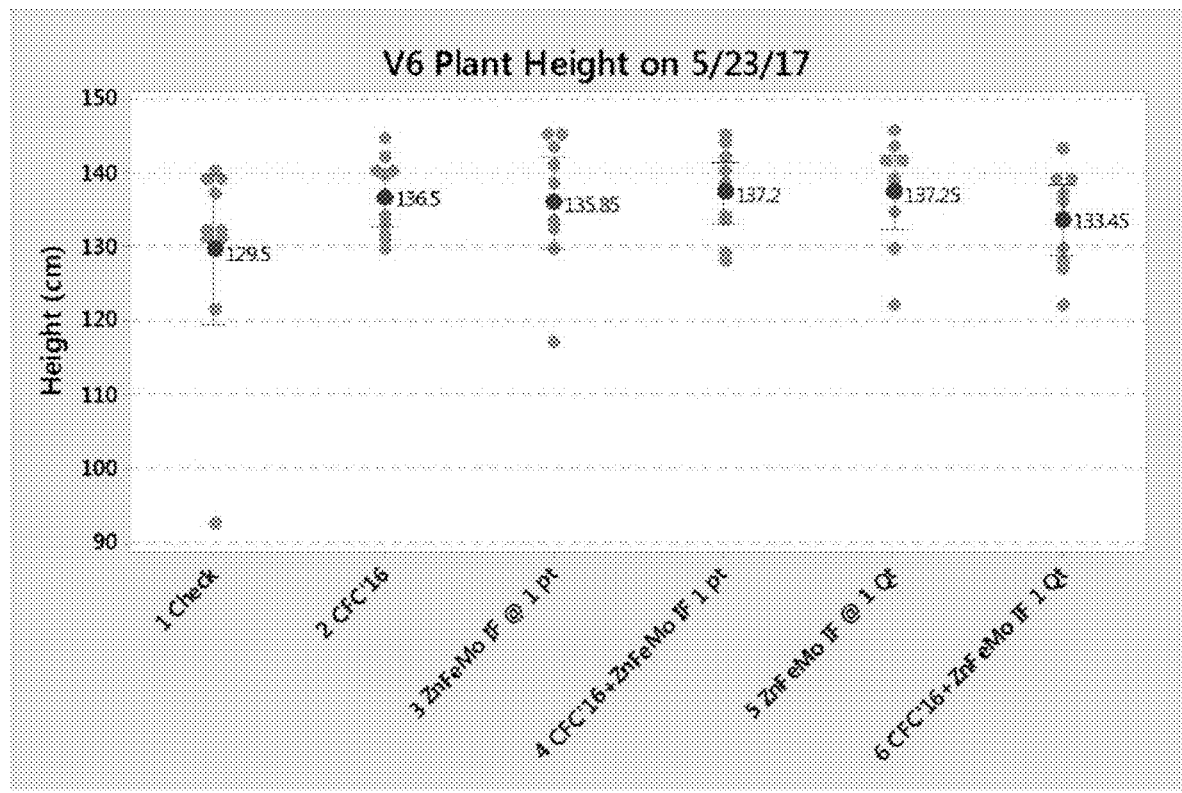
FIG. 18 is a graphical view of plant height, according to one or more embodiments of the present disclosure.
Figure 19:
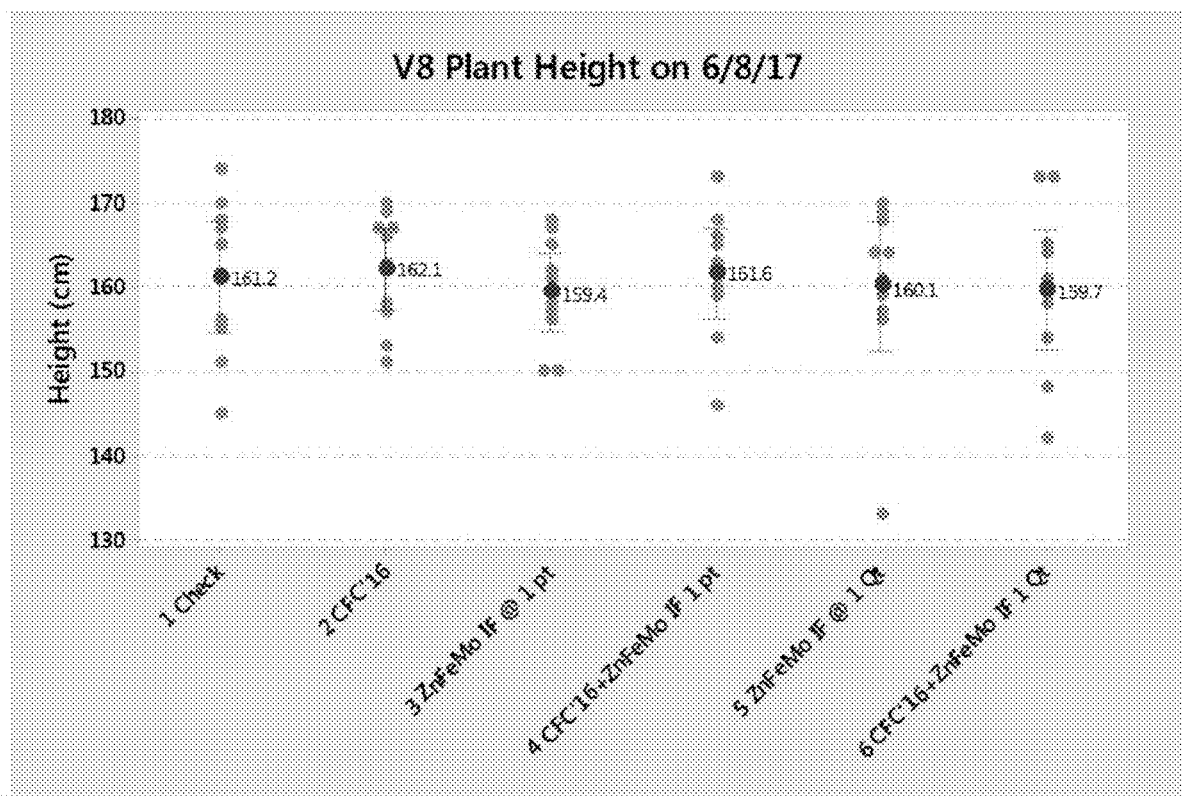
FIG. 19 is a graphical view of plant height, according to one or more embodiments of the present disclosure.
Figure 20:
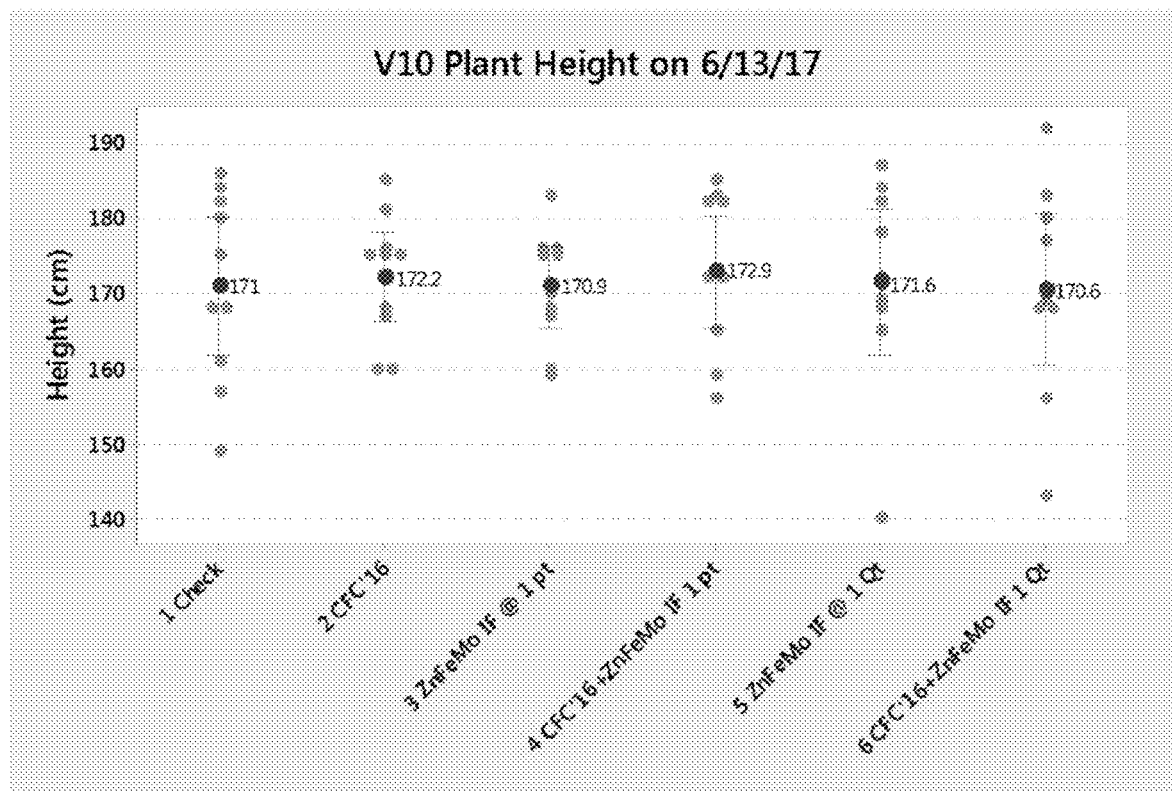
FIG. 20 is a graphical view of plant height, according to one or more embodiments of the present disclosure.
Figure 21:
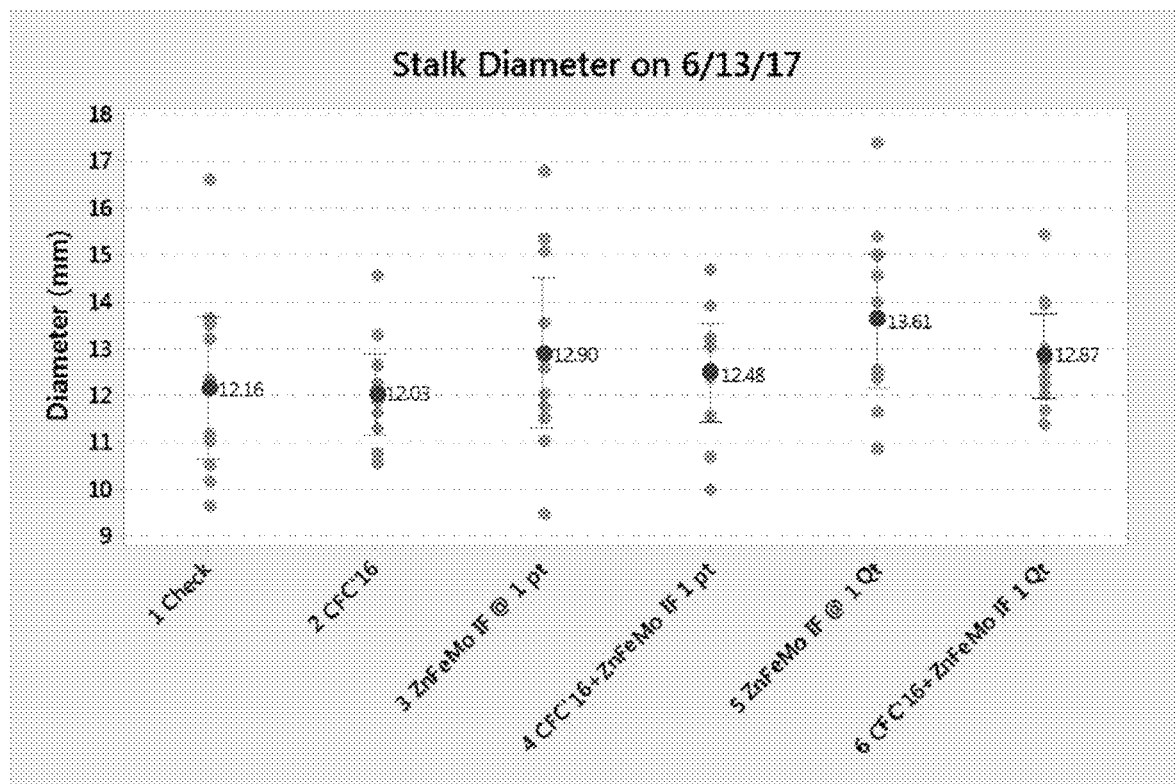
FIG. 21 is a graphical view of stalk diameter, according to one or more embodiments of the present disclosure.
Figure 22:
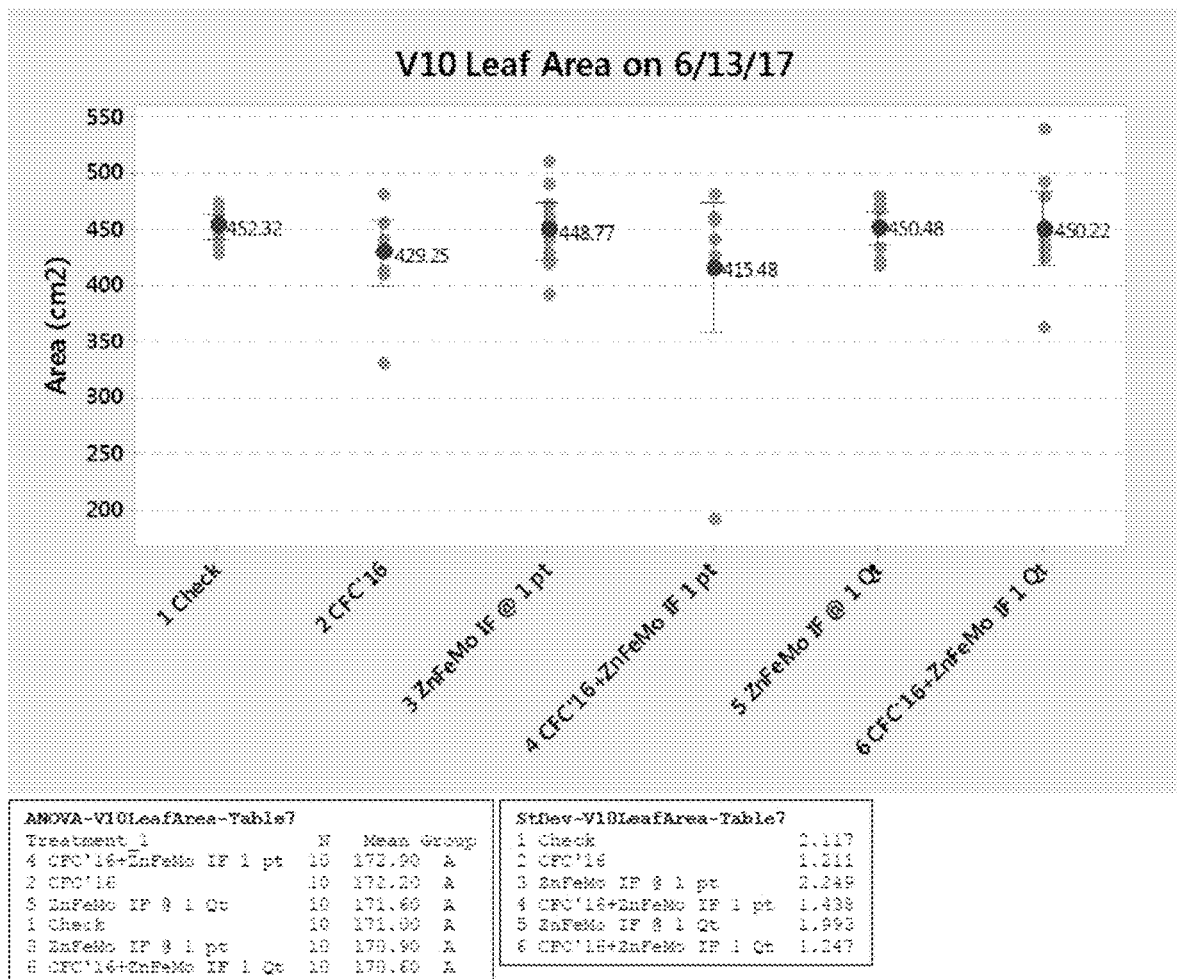
FIG. 22 is a graphical view of leaf area, according to one or more embodiments of the present disclosure.
Figure 23:
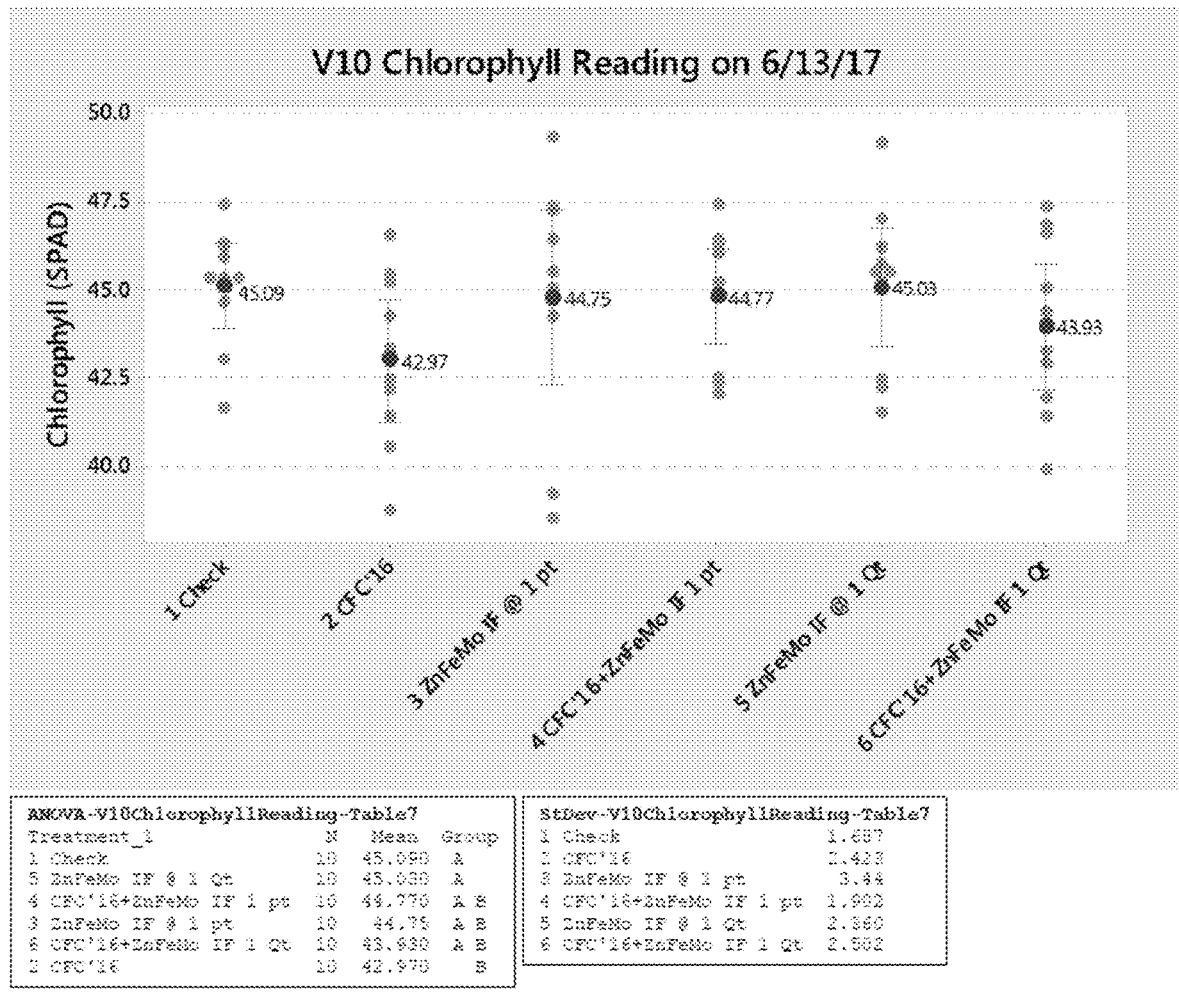
FIG. 23 is a graphical view of chlorophyll levels, according to one or more embodiments of the present disclosure.
Figure 24:
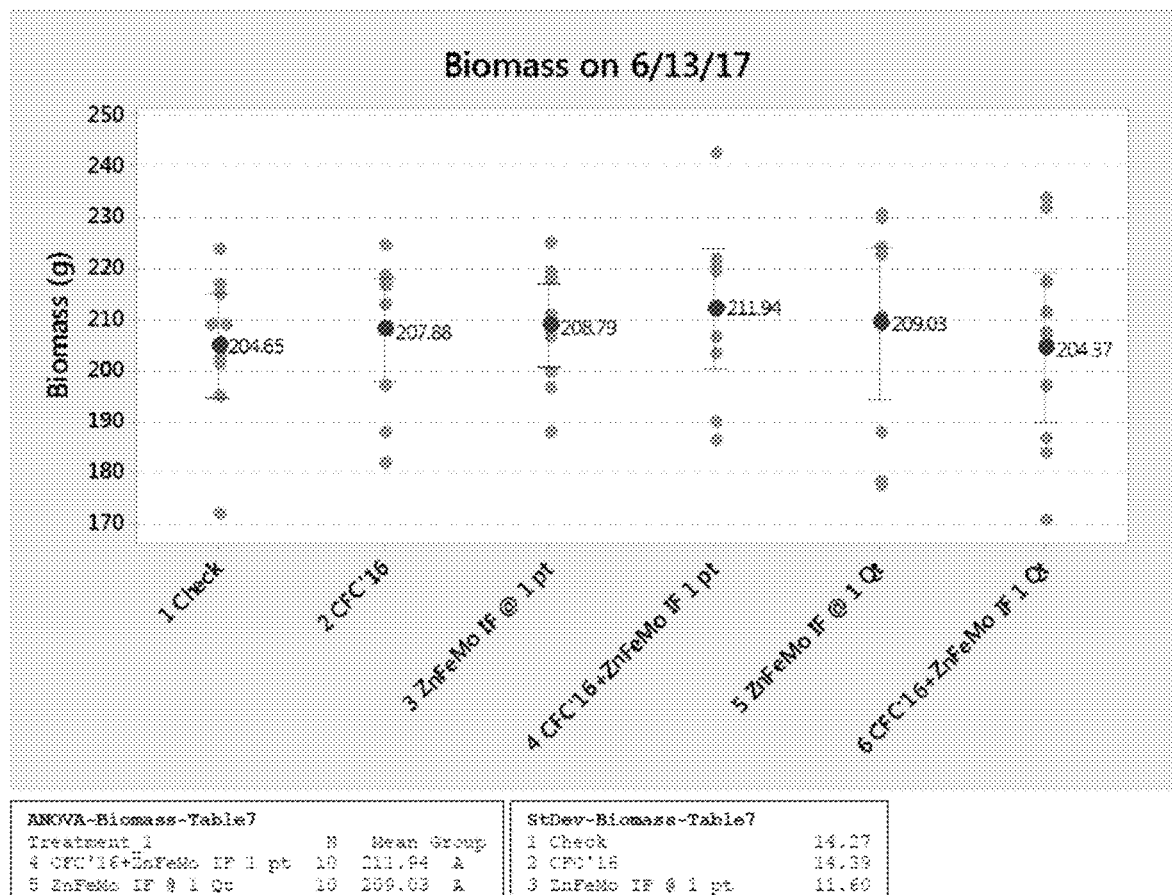
FIG. 24 is a graphical view of biomass, according to one or more embodiments of the present disclosure.
Figure 25:
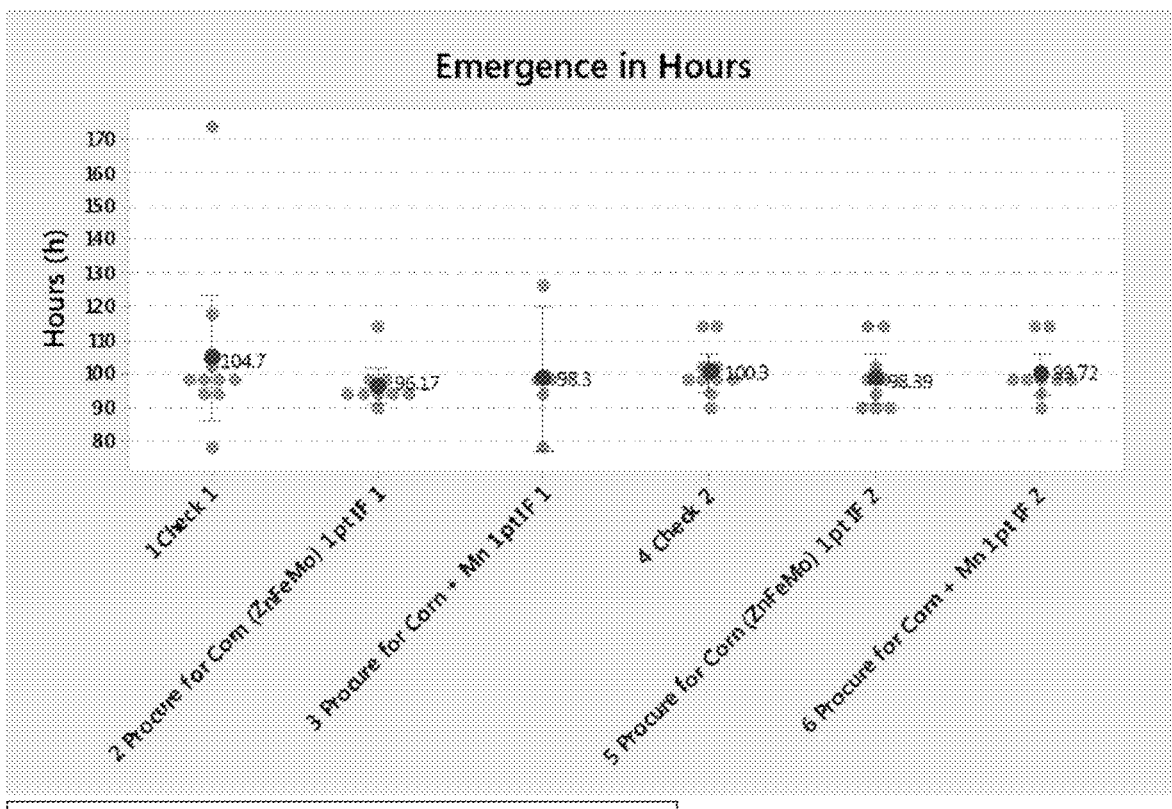
FIG. 25 is a graphical view plant emergence, according to one or more embodiments of the present disclosure.
Figure 26:
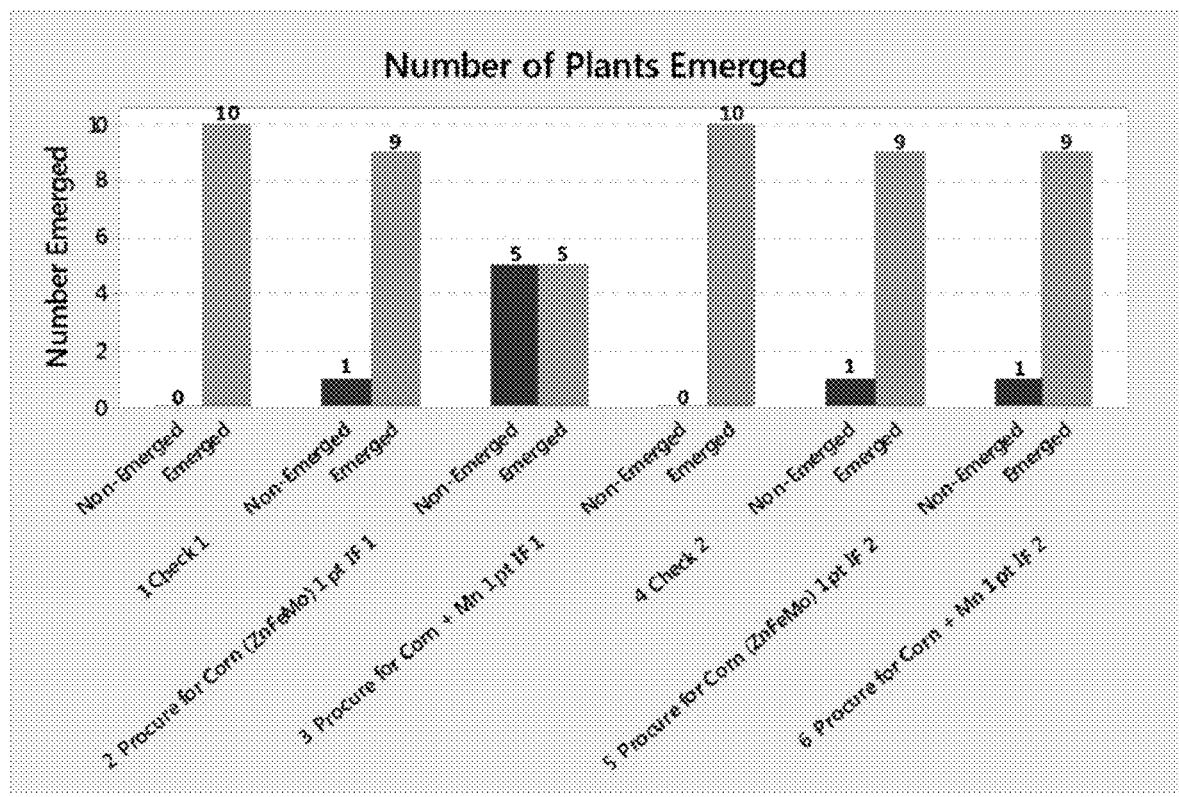
FIG. 26 is a graphical view of the number of plants emerged, according to one or more embodiments of the present disclosure.
Figure 27:
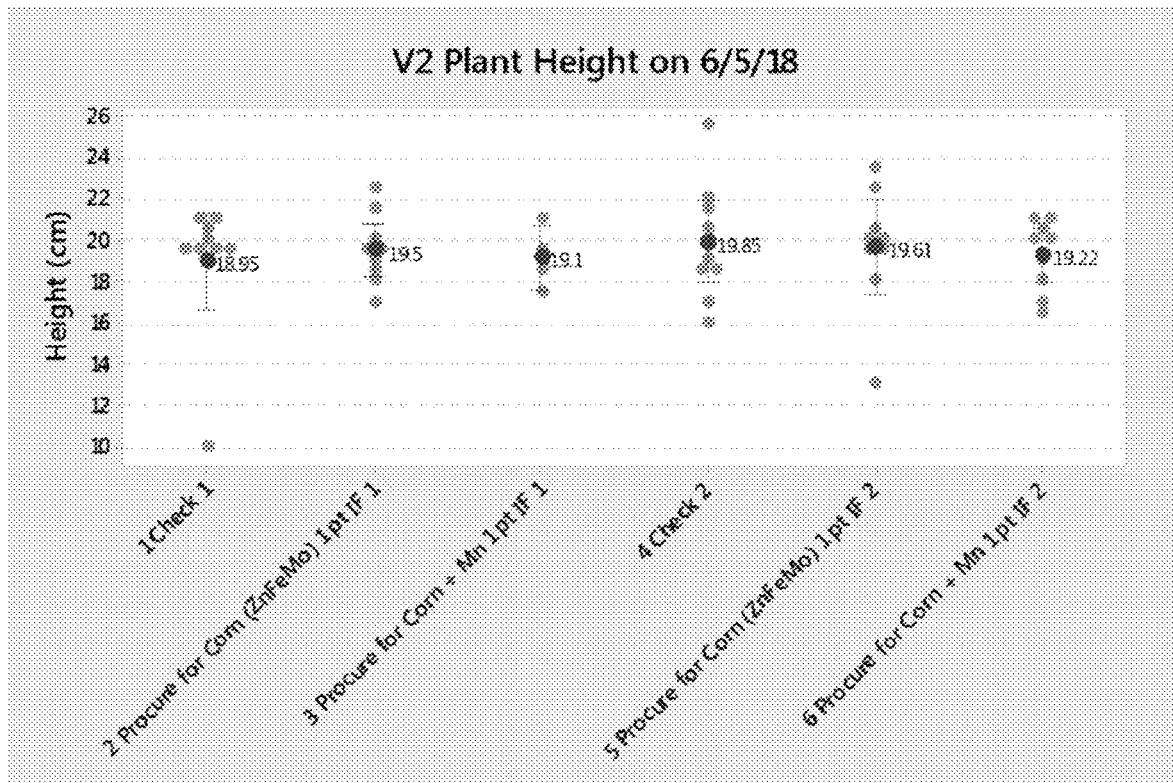
FIG. 27 is a graphical view of plant height, according to one or more embodiments of the present disclosure.
Figure 28:
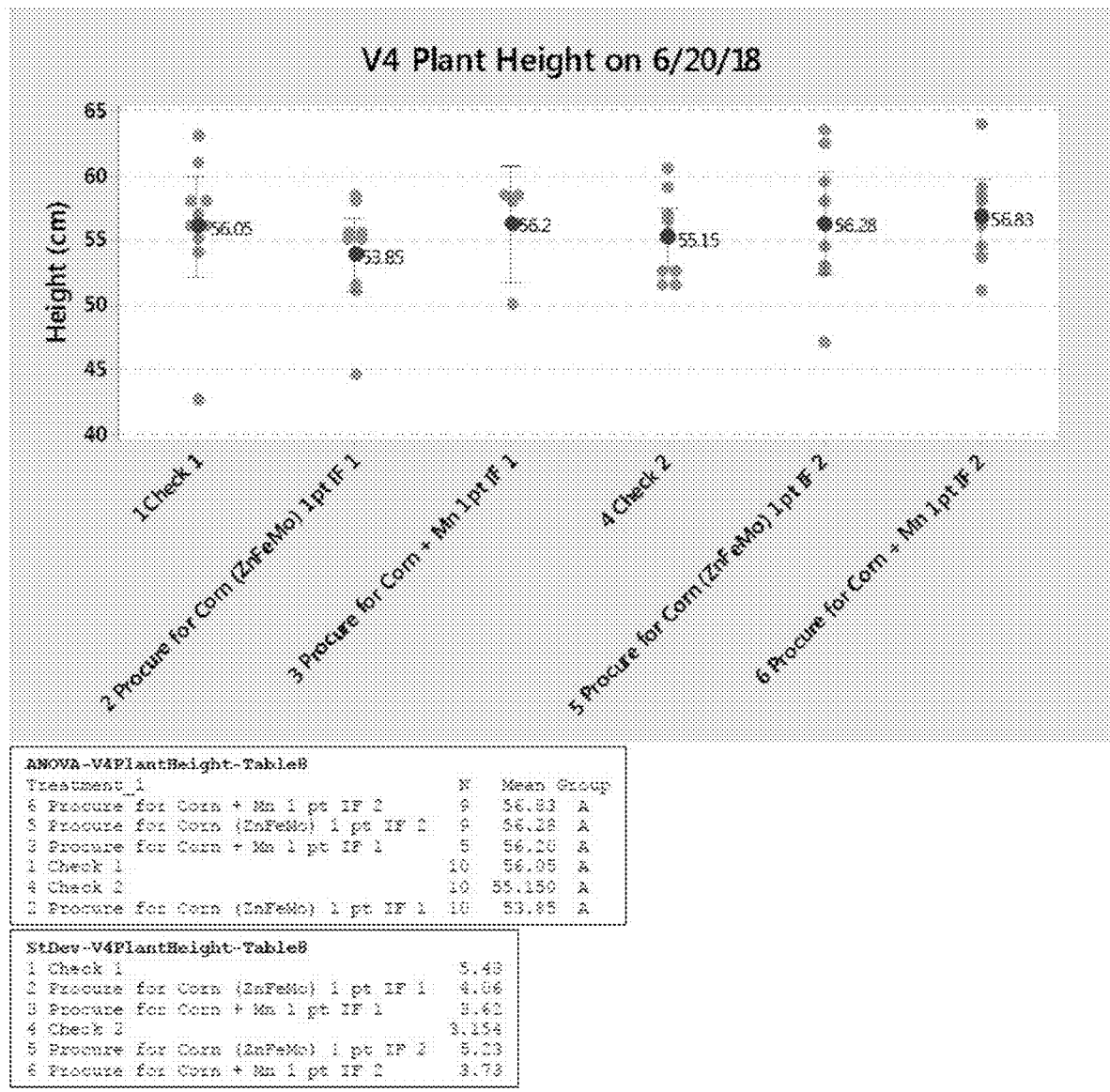
FIG. 28 is a graphical view of plant height, according to one or more embodiments of the present disclosure.
Figure 29:
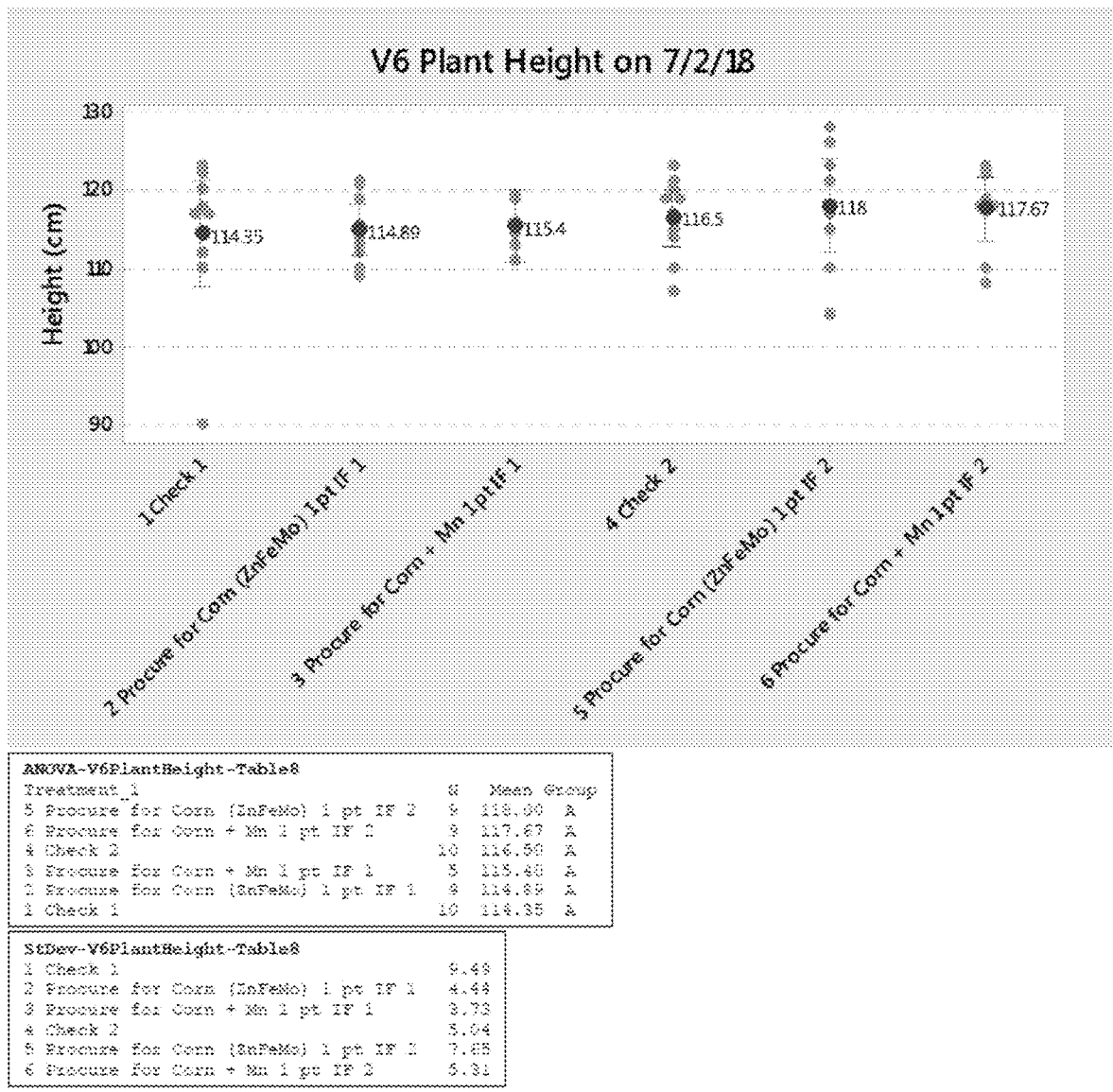
FIG. 29 is a graphical view of plant height, according to one or more embodiments of the present disclosure.
Figure 30:
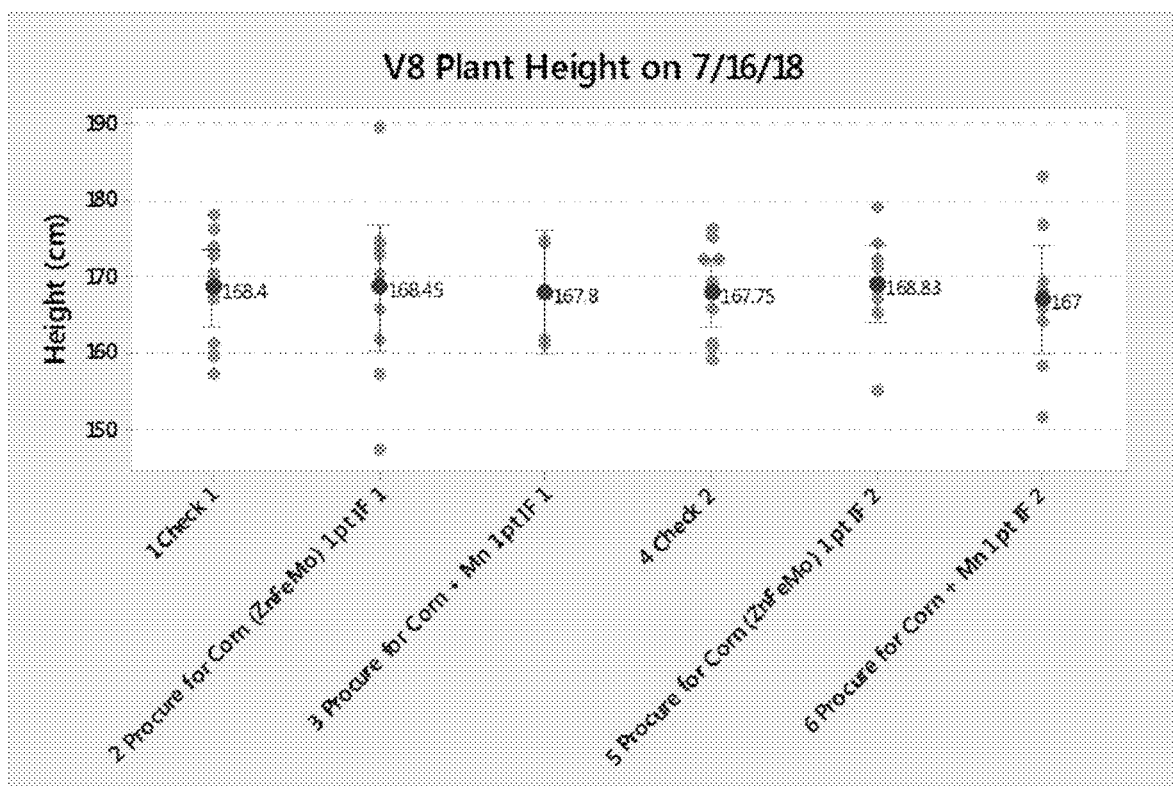
FIG. 30 is a graphical view of plant height, according to one or more embodiments of the present disclosure.
Figure 31:
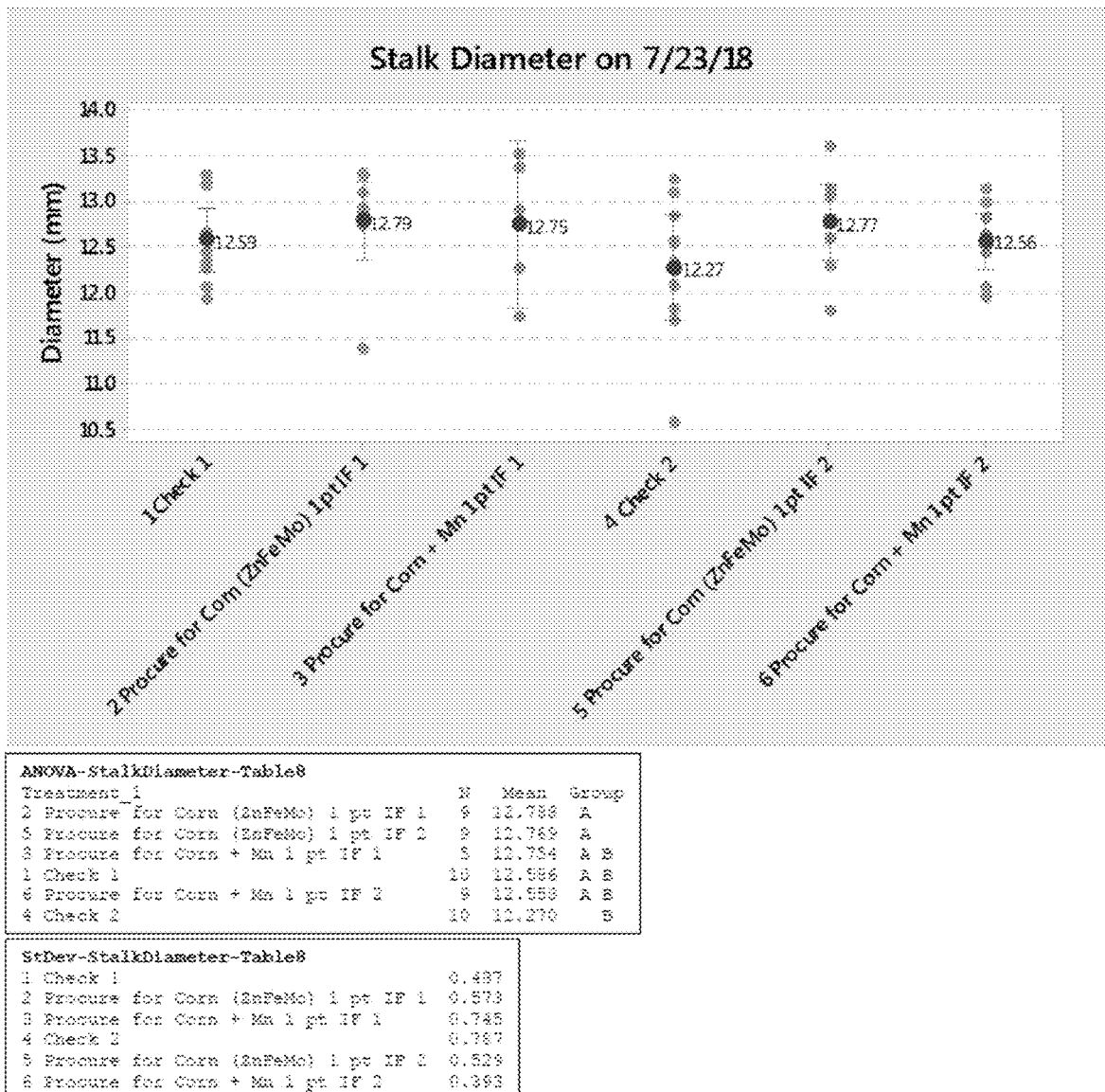
FIG. 31 is a graphical view of stalk diameter, according to one or more embodiments of the present disclosure.
Figure 32:
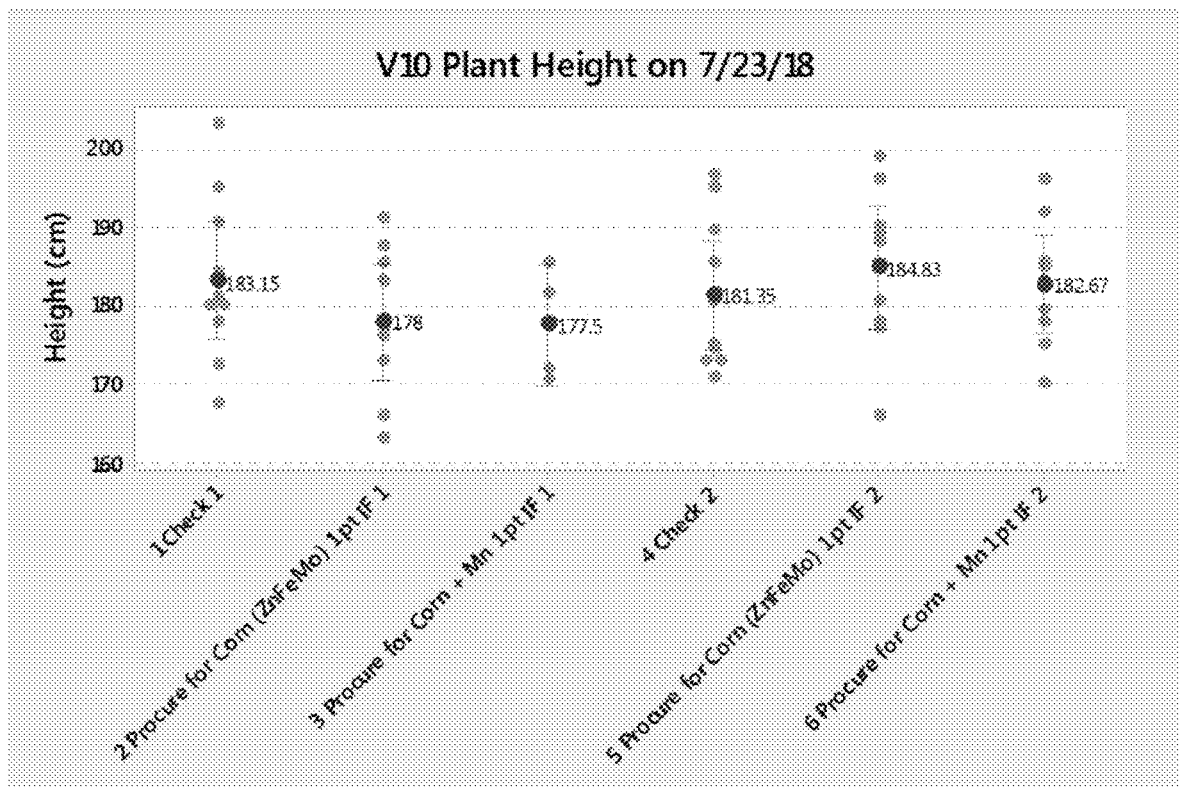
FIG. 32 is a graphical view of plant height, according to one or more embodiments of the present disclosure.
Figure 33:
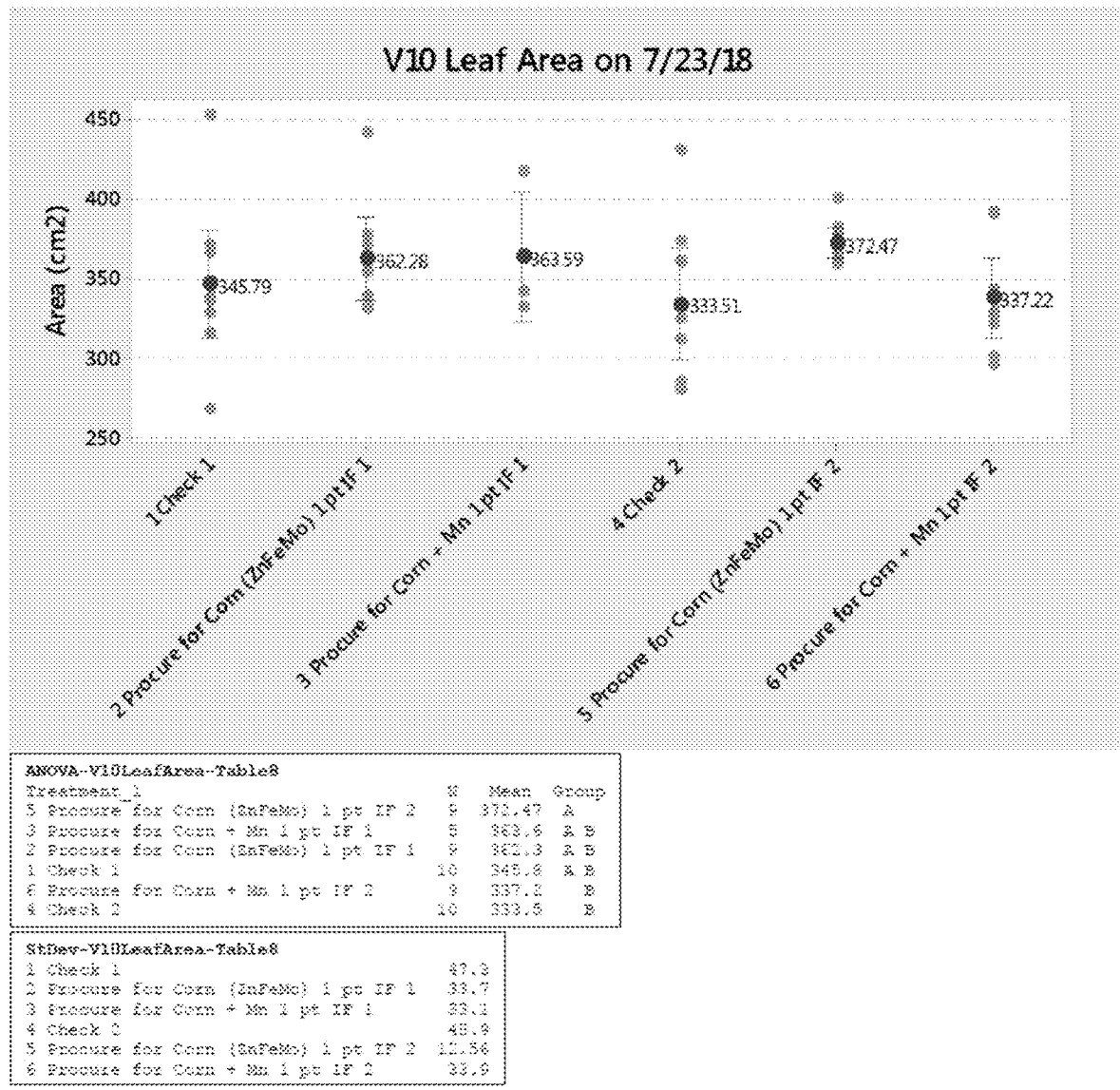
FIG. 33 is a graphical view of leaf area, according to one or more embodiments of the present disclosure.
Figure 34:
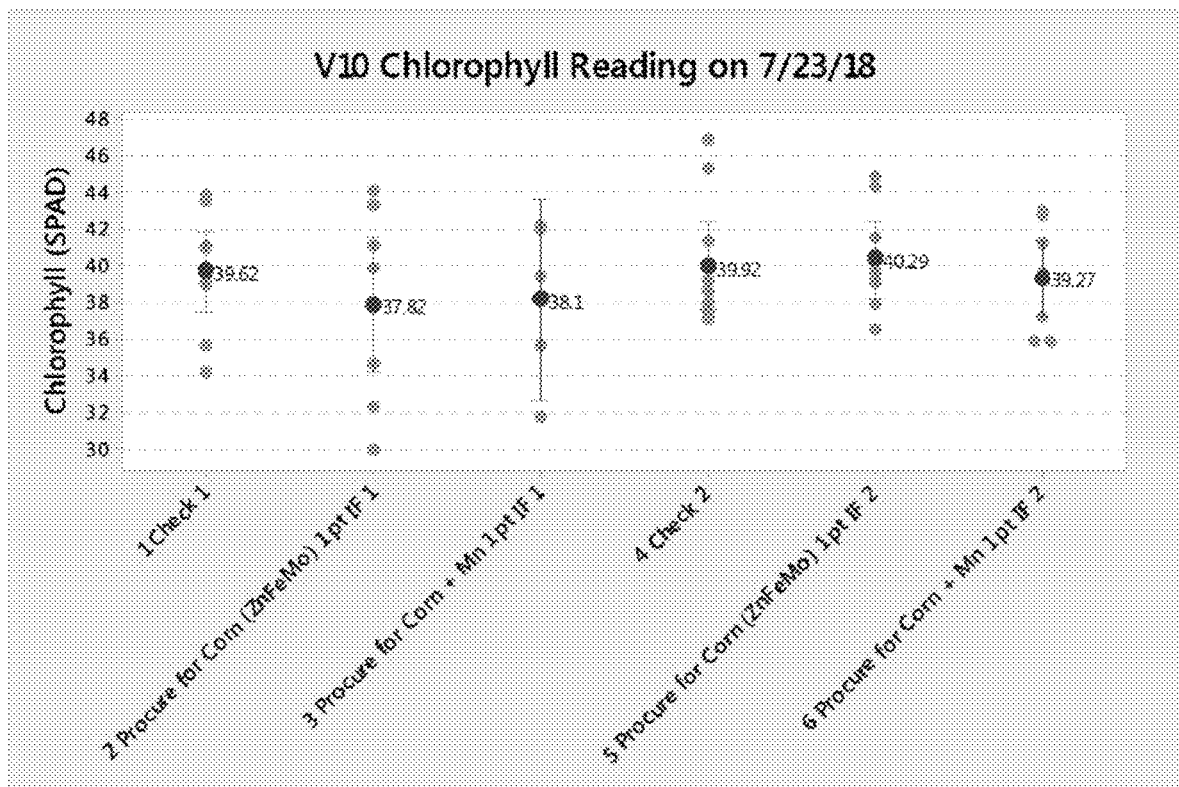
FIG. 34 is a graphical view of chlorophyll levels, according to one or more embodiments of the present disclosure.
Figure 35:
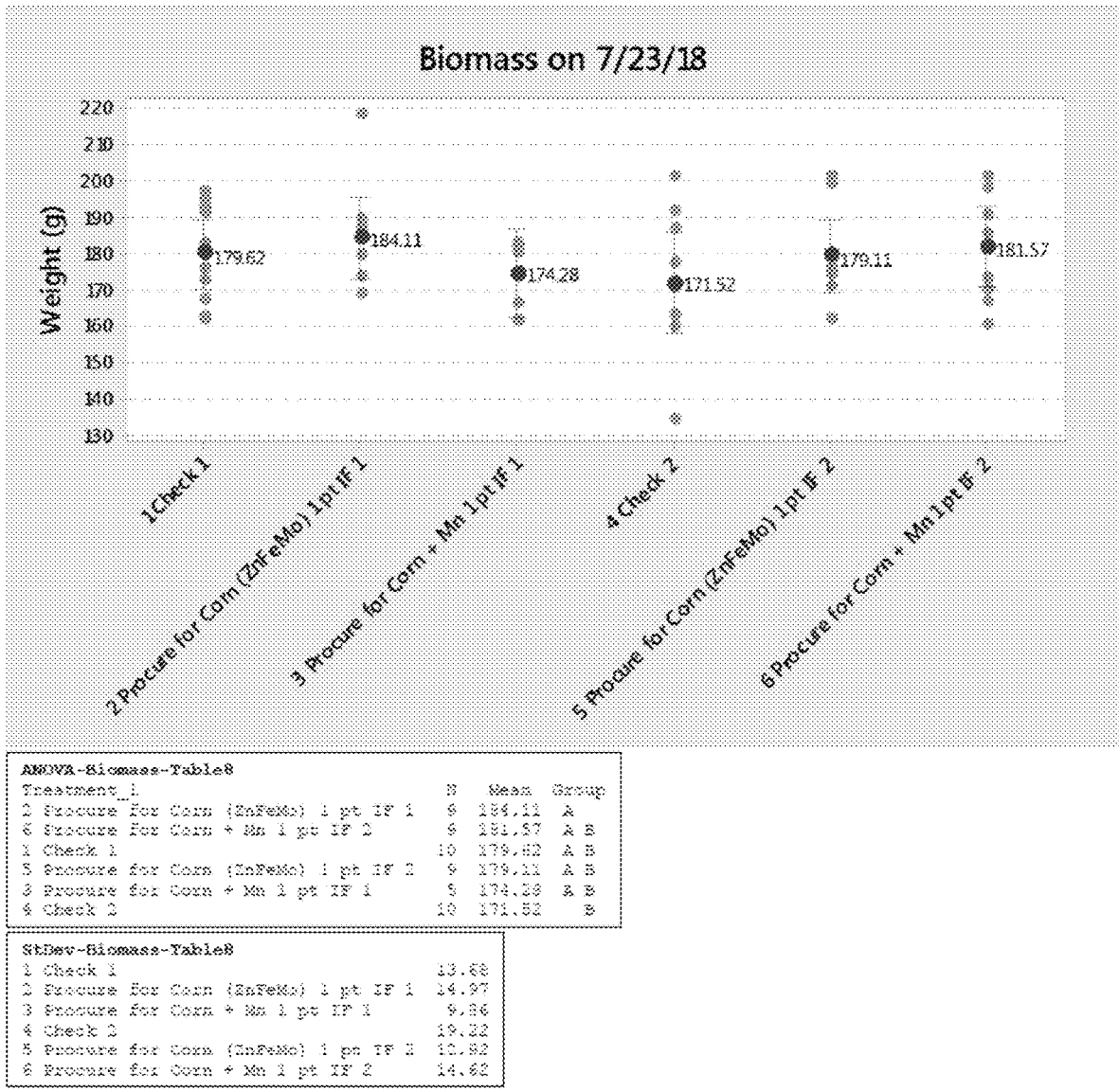
FIG. 35 is a graphical view of biomass, according to one or more embodiments of the present disclosure.
Figure 36:
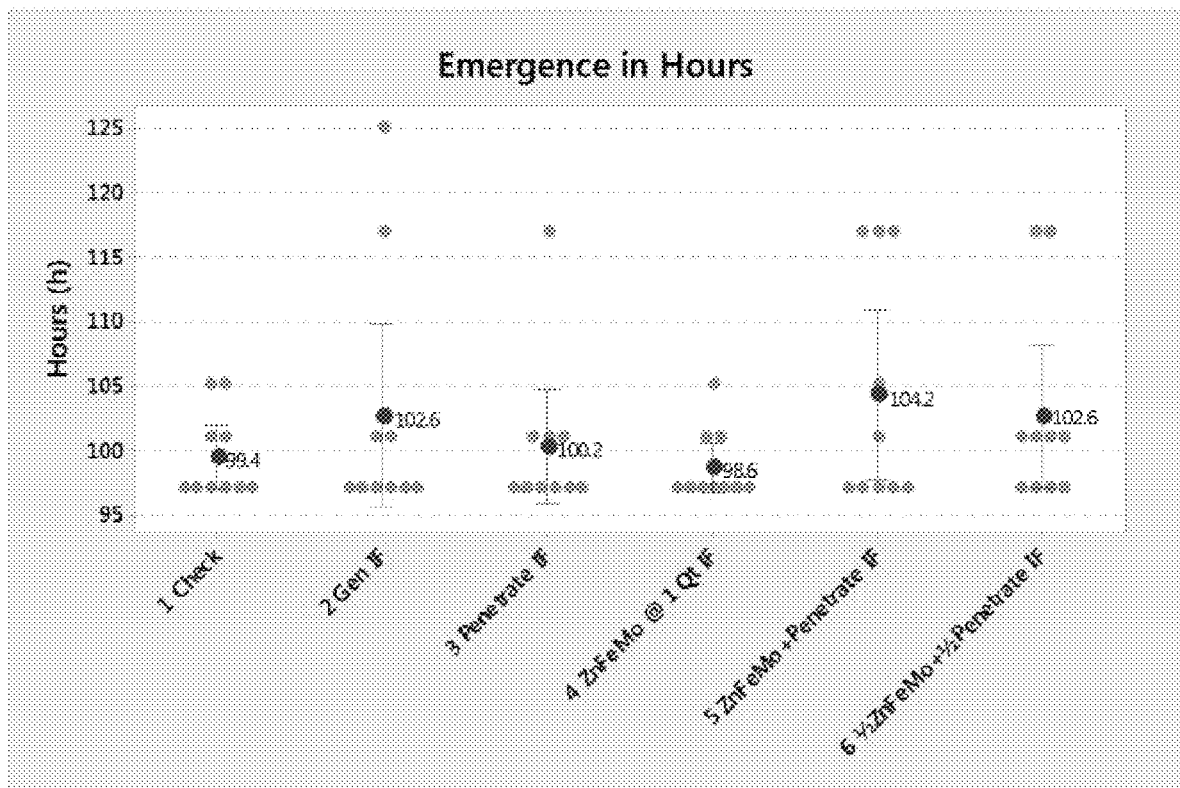
FIG. 36 is a graphical view plant emergence, according to one or more embodiments of the present disclosure.
Figure 37:
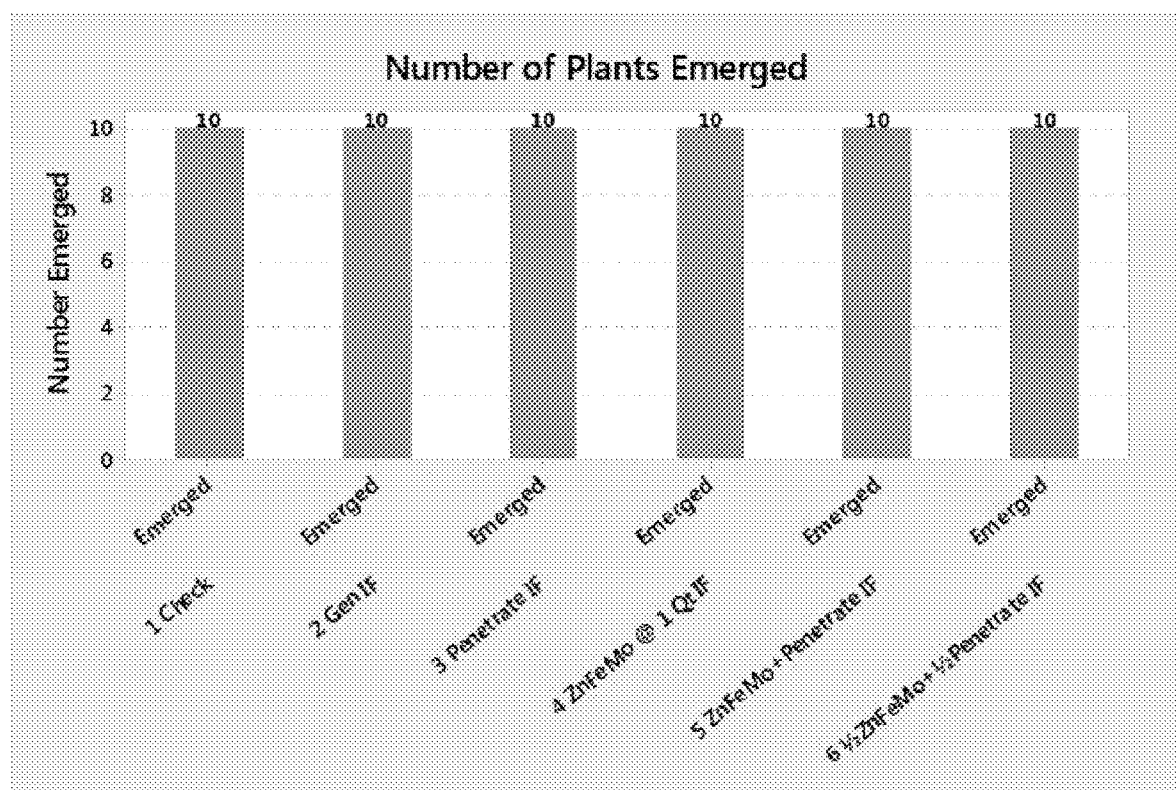
FIG. 37 is a graphical view of the number of plants emerged, according to one or more embodiments of the present disclosure.
Figure 38:
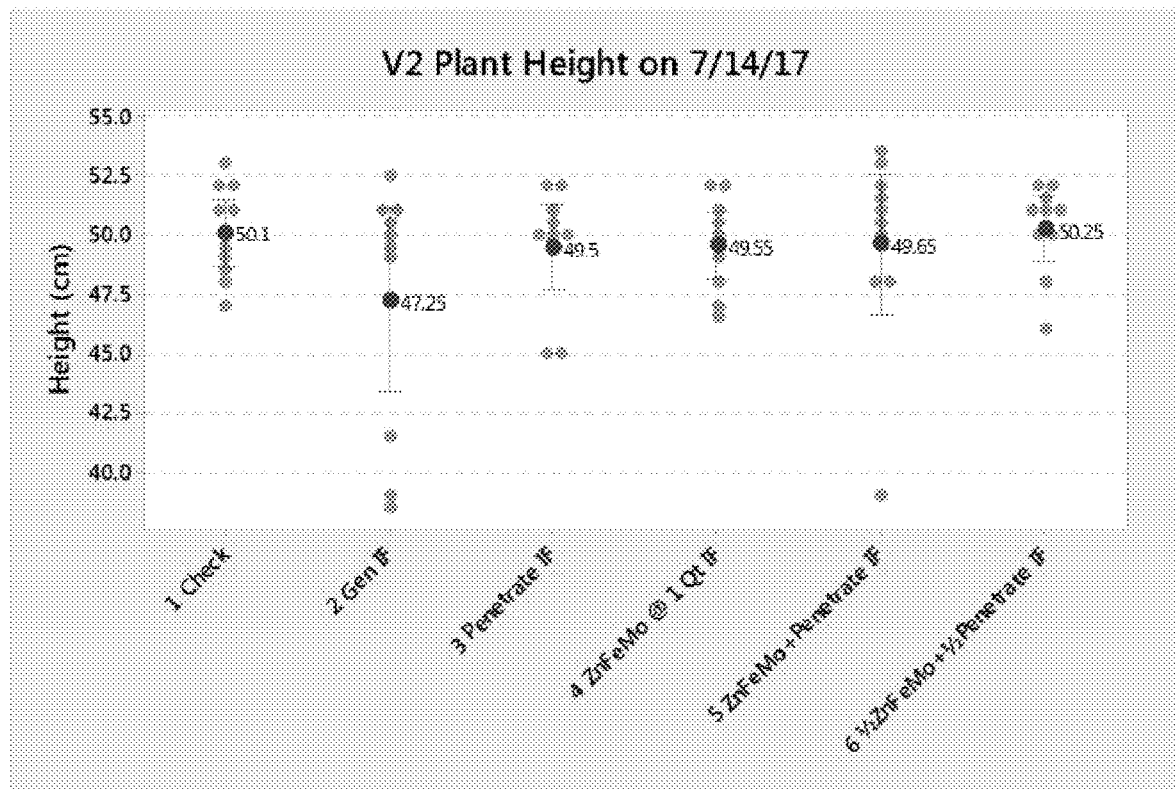
FIG. 38 is a graphical view of plant height, according to one or more embodiments of the present disclosure.
Figure 39:
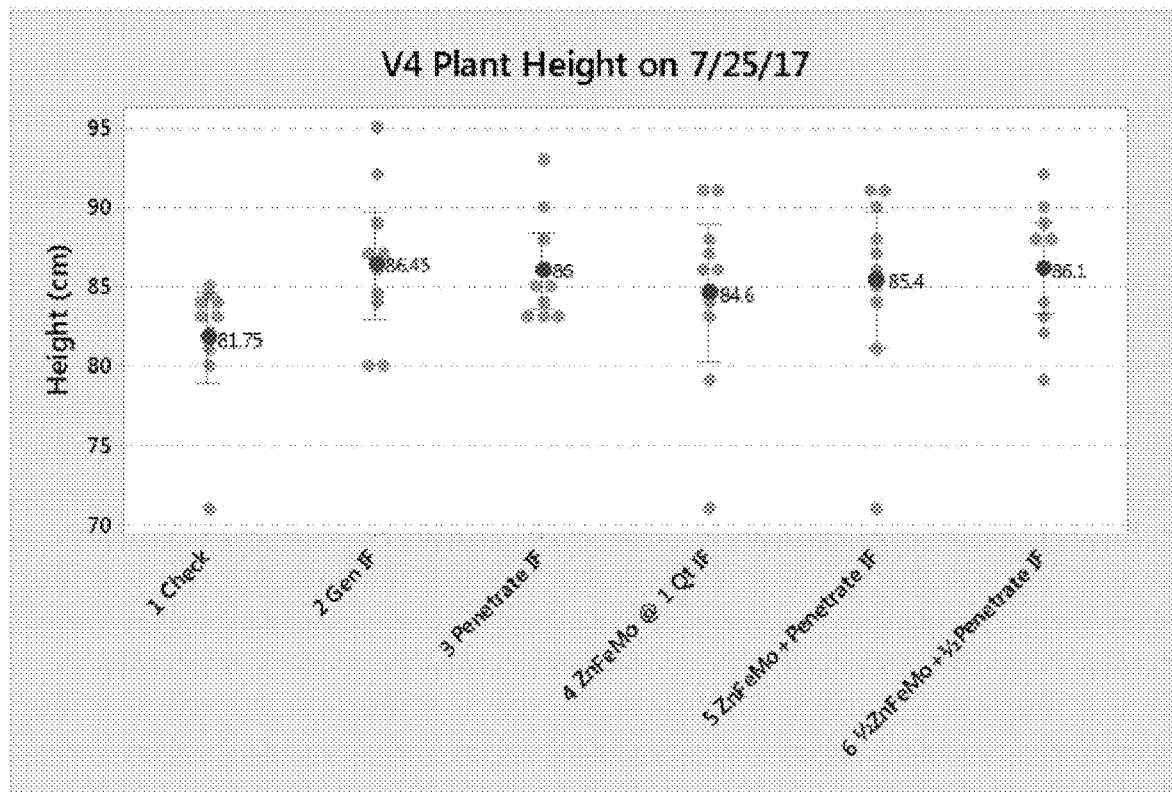
FIG. 39 is a graphical view of plant height, according to one or more embodiments of the present disclosure.
Figure 40:
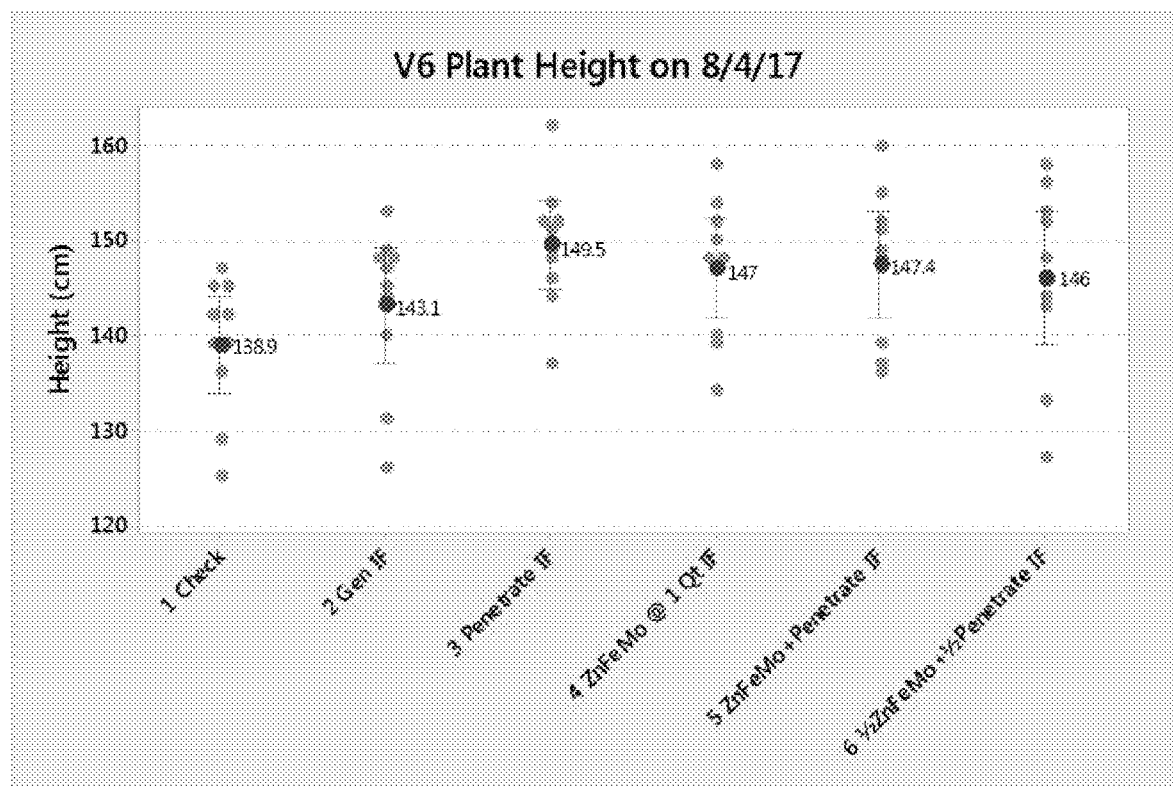
FIG. 40 is a graphical view of plant height, according to one or more embodiments of the present disclosure.
Figure 41:
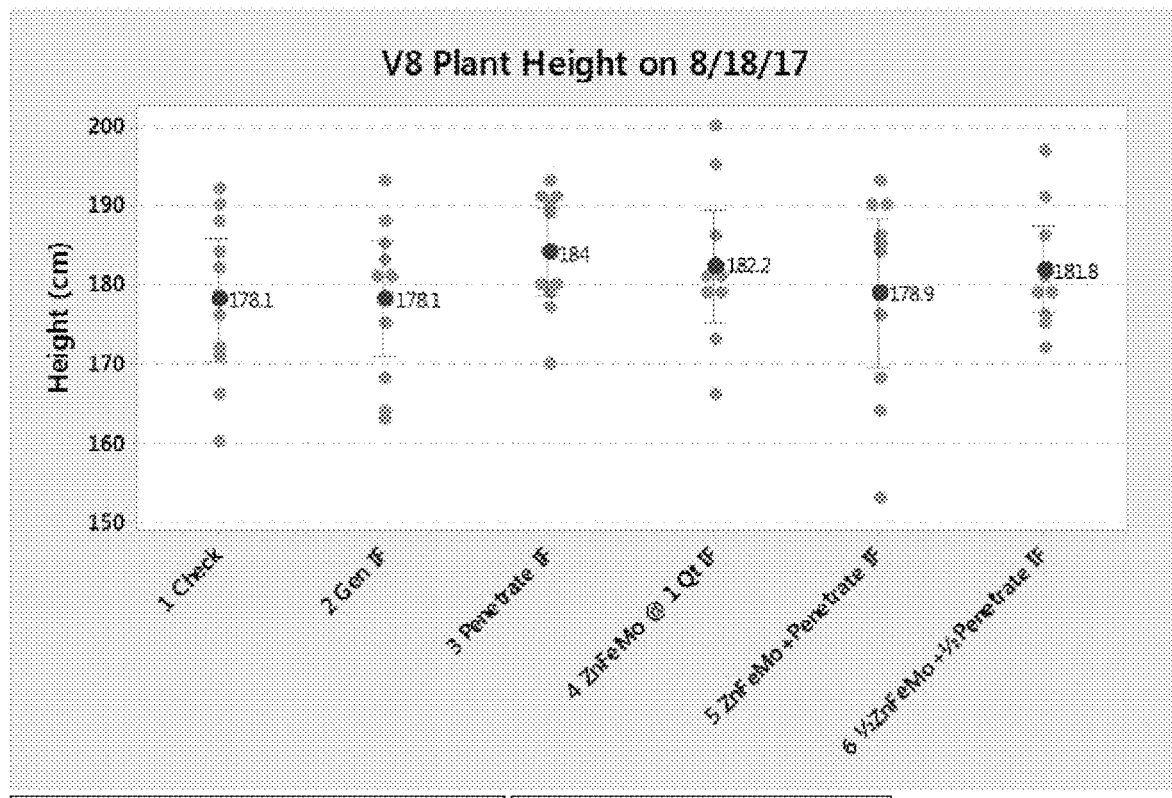
FIG. 41 is a graphical view of plant height, according to one or more embodiments of the present disclosure.
Figure 42:
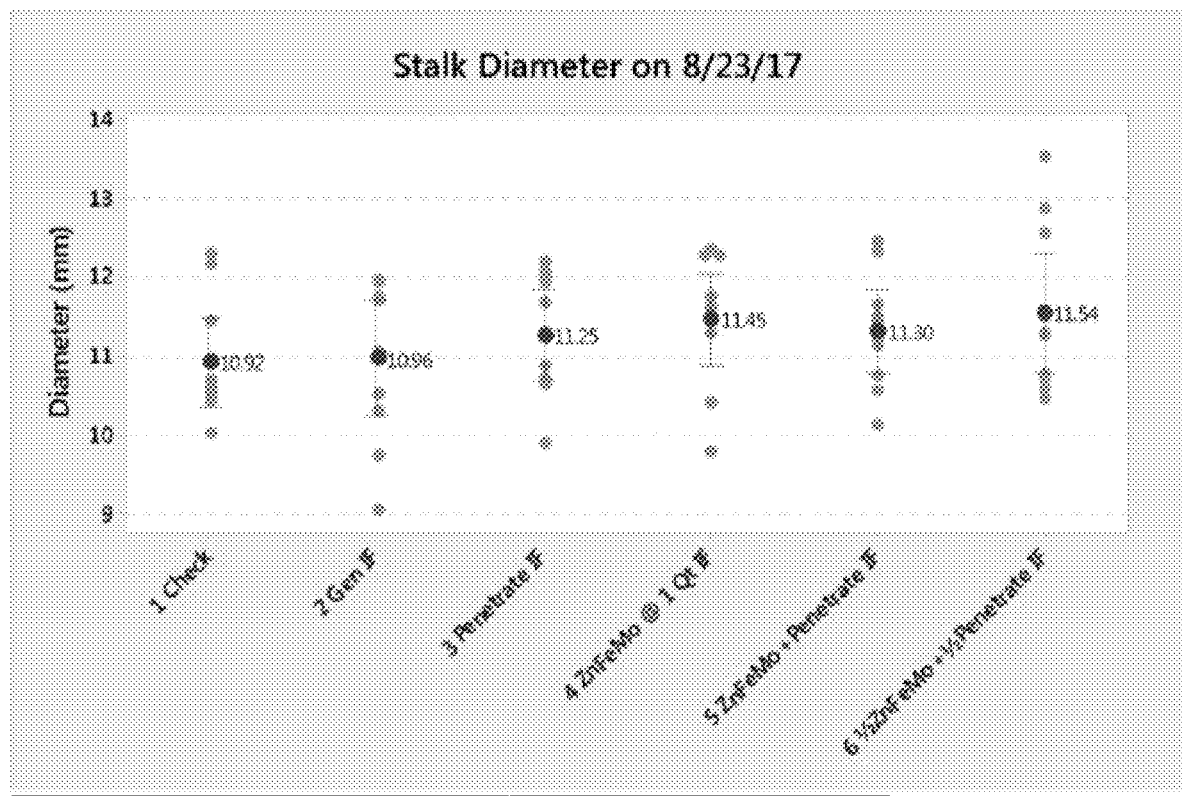
FIG. 42 is a graphical view of stalk diameter, according to one or more embodiments of the present disclosure.
Figure 43:
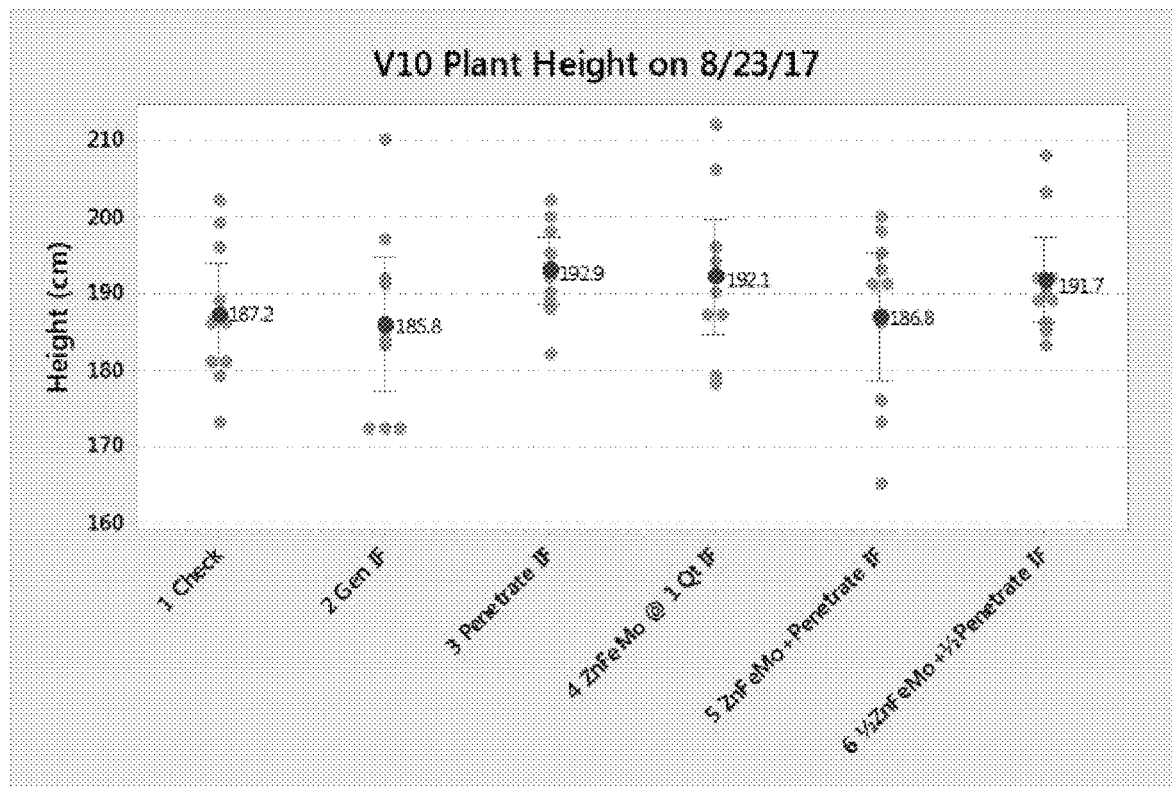
FIG. 43 is a graphical view of plant height, according to one or more embodiments of the present disclosure.
Figure 44:
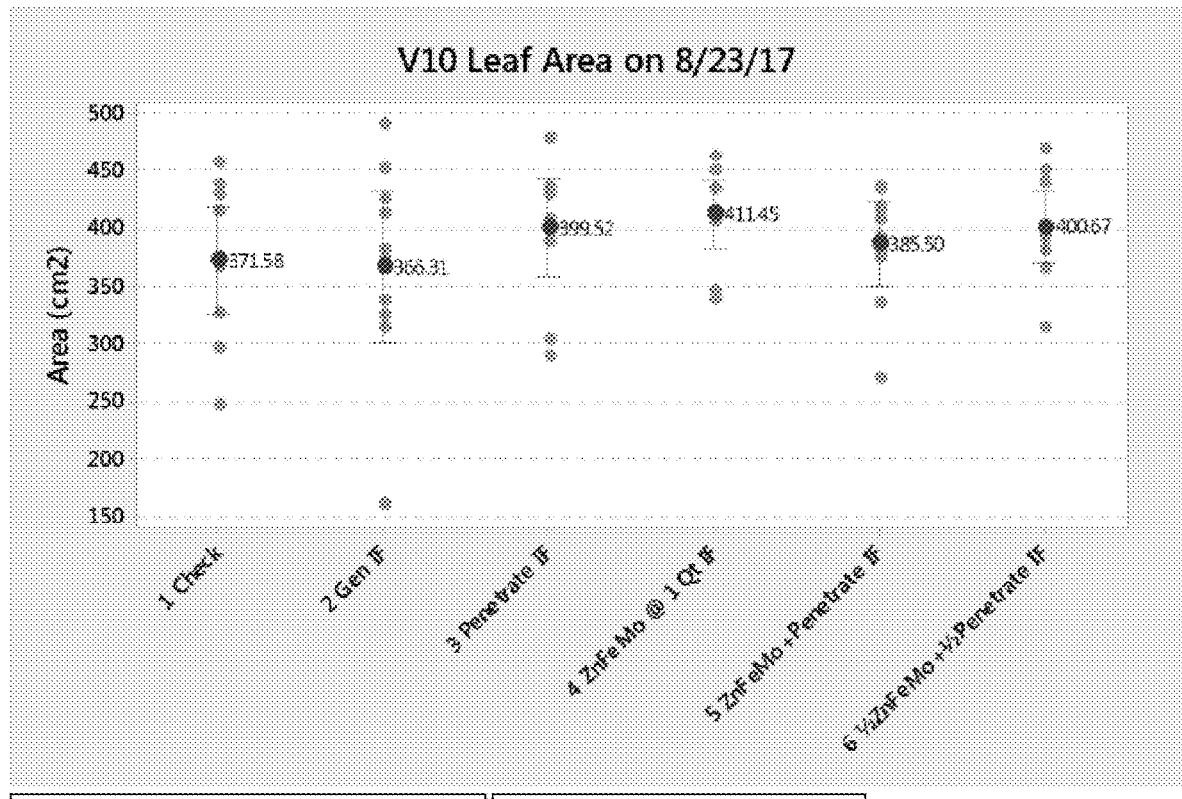
FIG. 44 is a graphical view of leaf area, according to one or more embodiments of the present disclosure.
Figure 45:
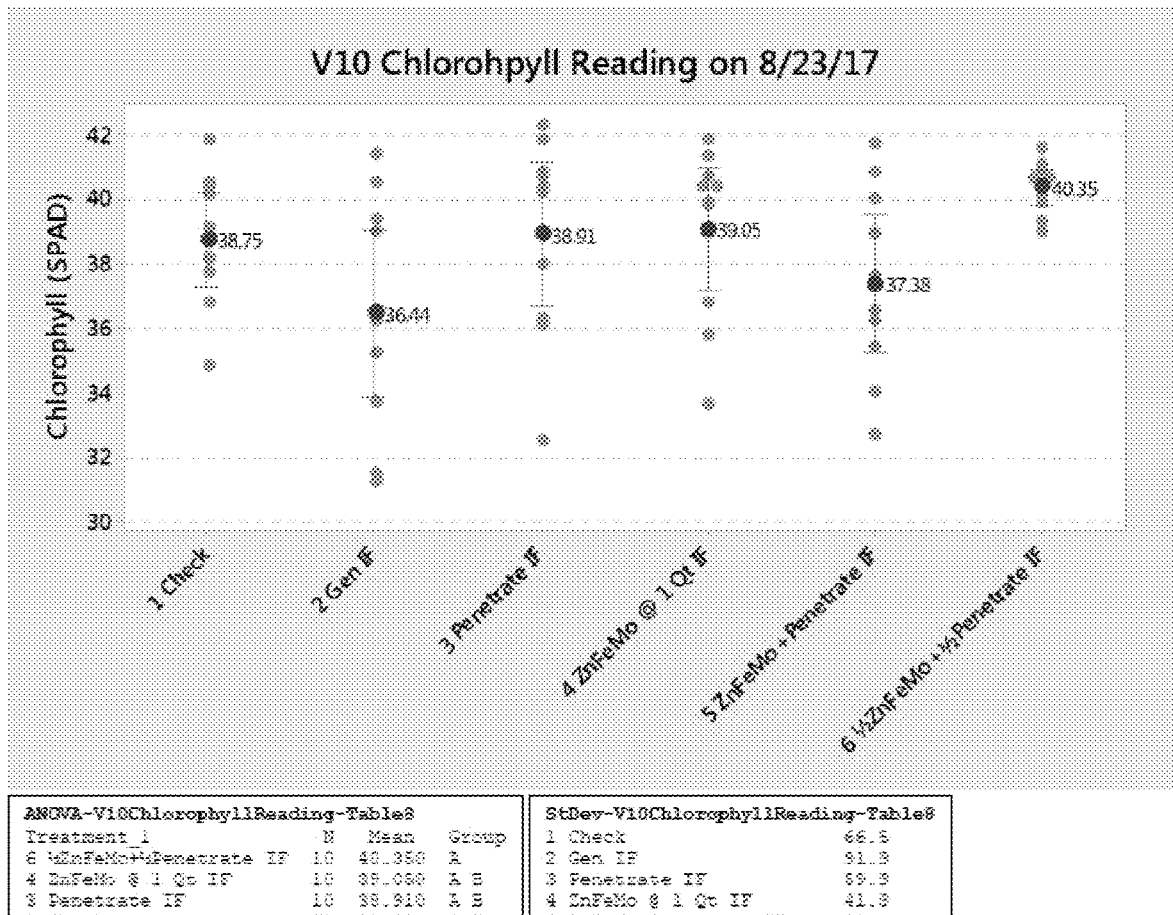
FIG. 45 is a graphical view of chlorophyll levels, according to one or more embodiments of the present disclosure.
Figure 46:
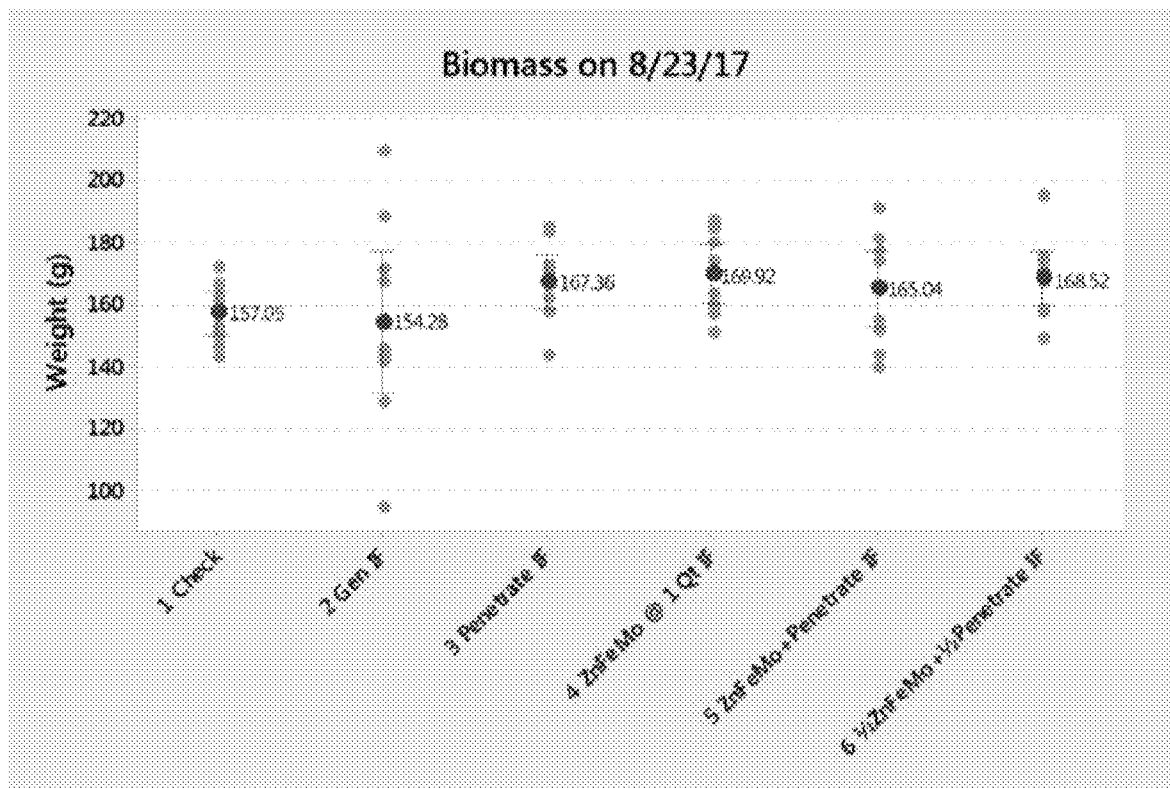
FIG. 46 is a graphical view of biomass, according to one or more embodiments of the present disclosure.
Figure 47:
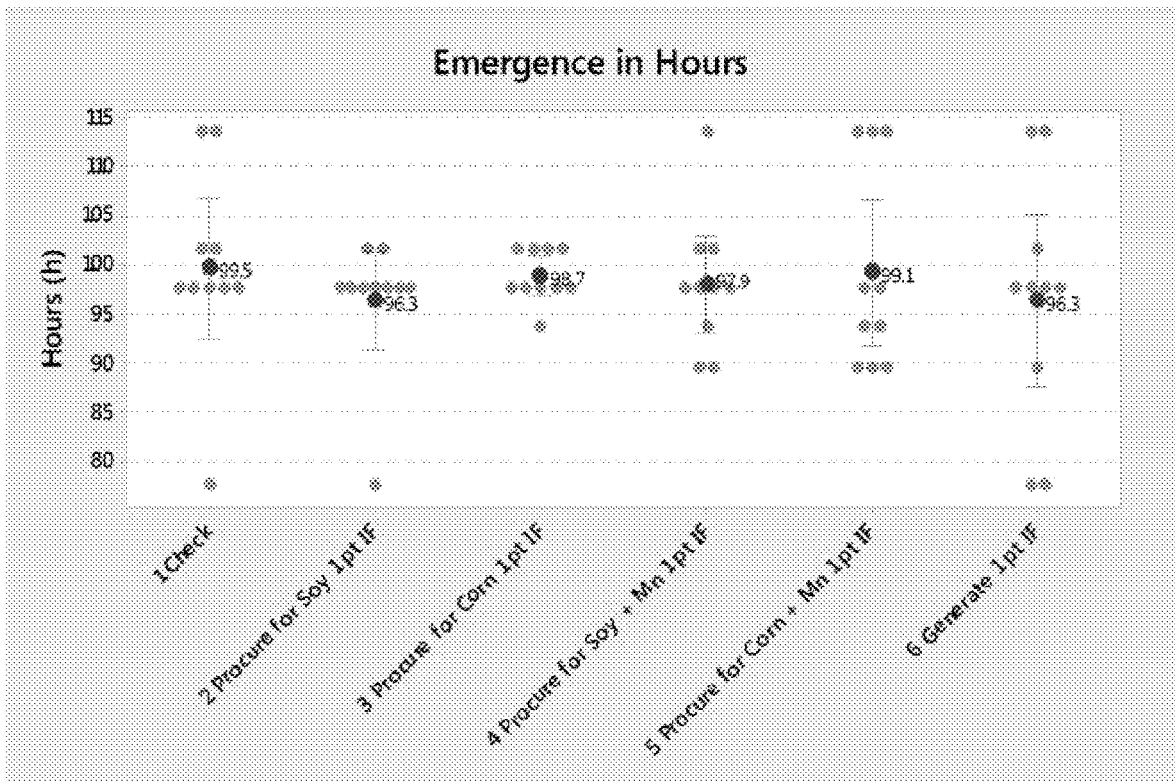
FIG. 47 is a graphical view plant emergence, according to one or more embodiments of the present disclosure.
Figure 48:
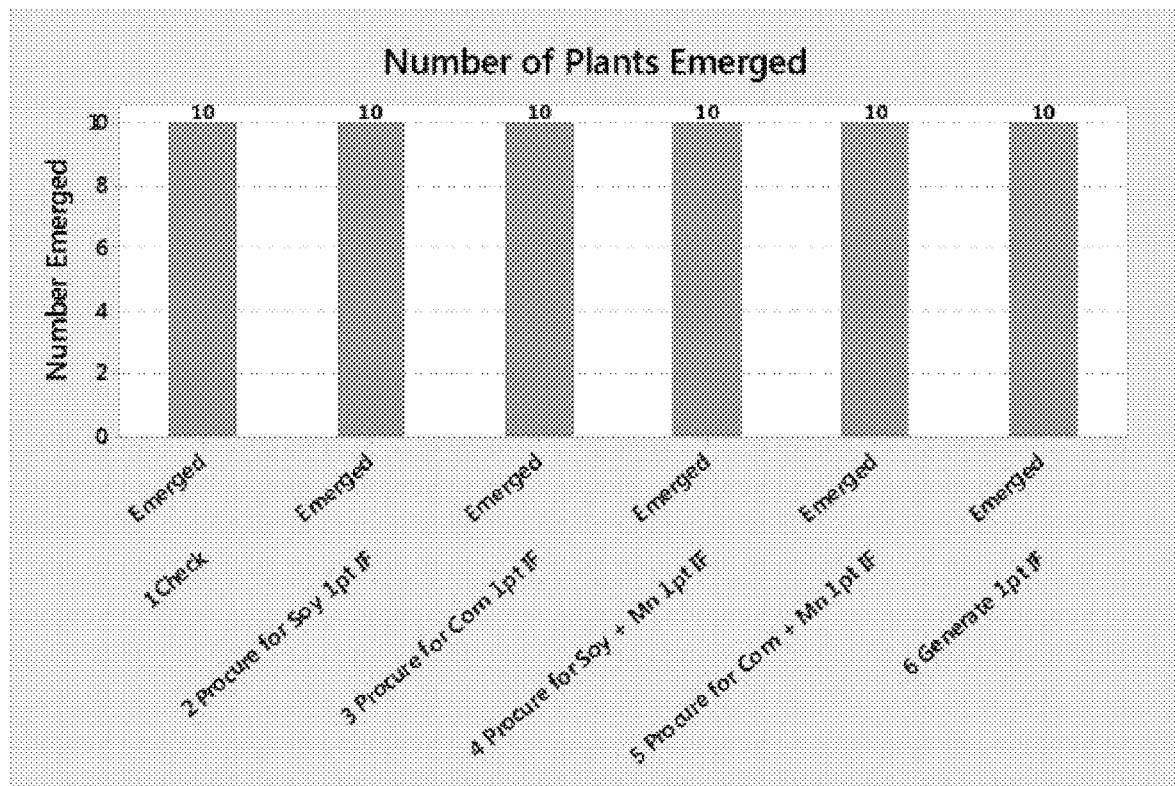
FIG. 48 is a graphical view of the number of plants emerged, according to one or more embodiments of the present disclosure.
Figure 49:
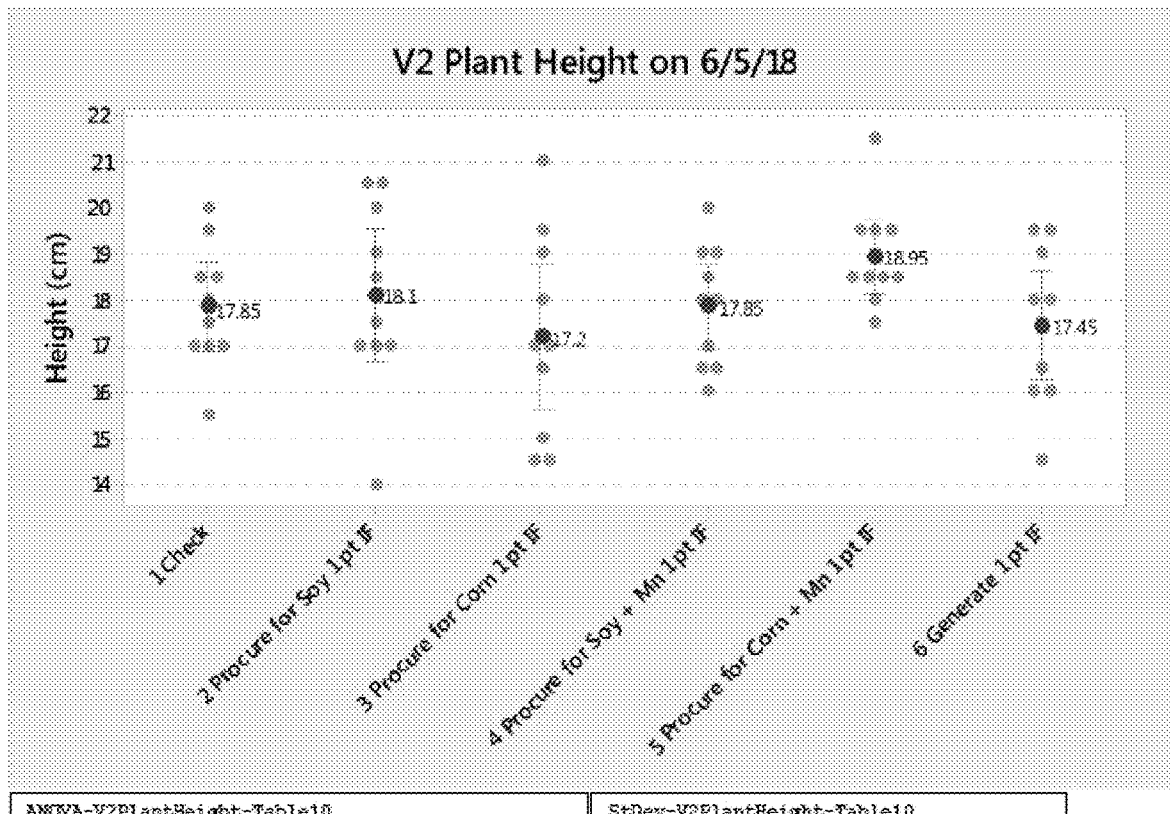
FIG. 49 is a graphical view of plant height, according to one or more embodiments of the present disclosure.
Figure 50:
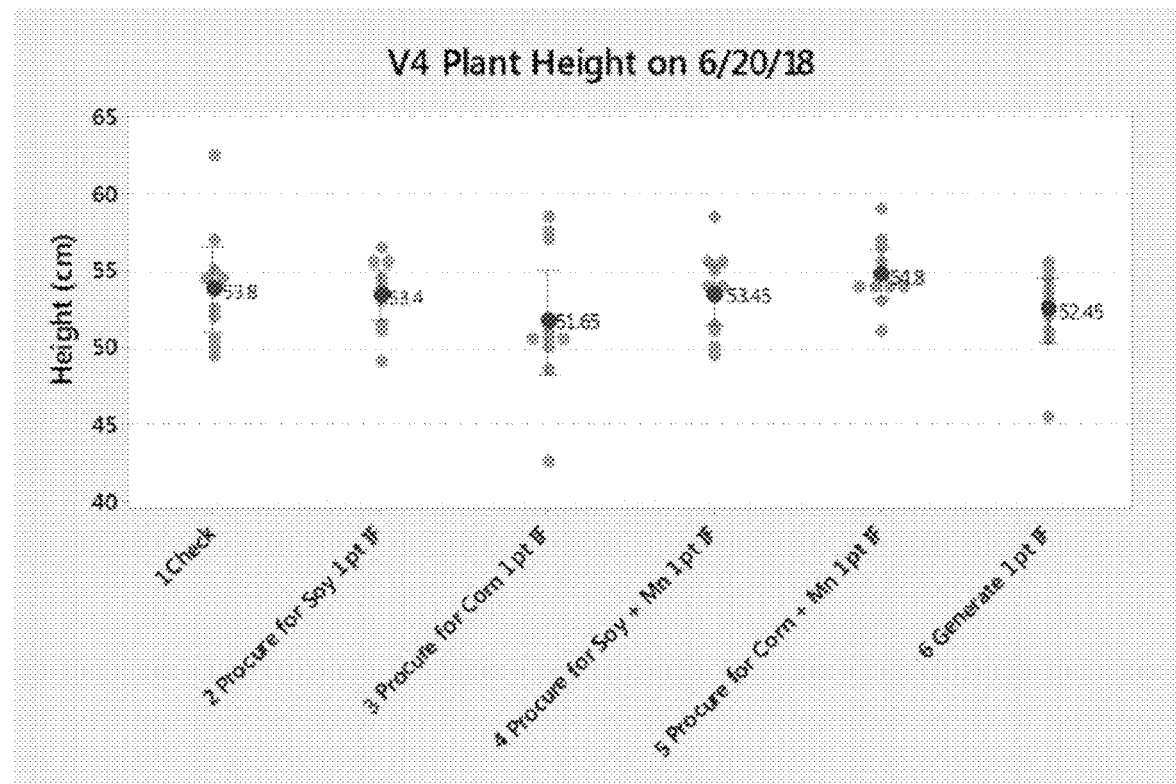
FIG. 50 is a graphical view of plant height, according to one or more embodiments of the present disclosure.
Figure 51:
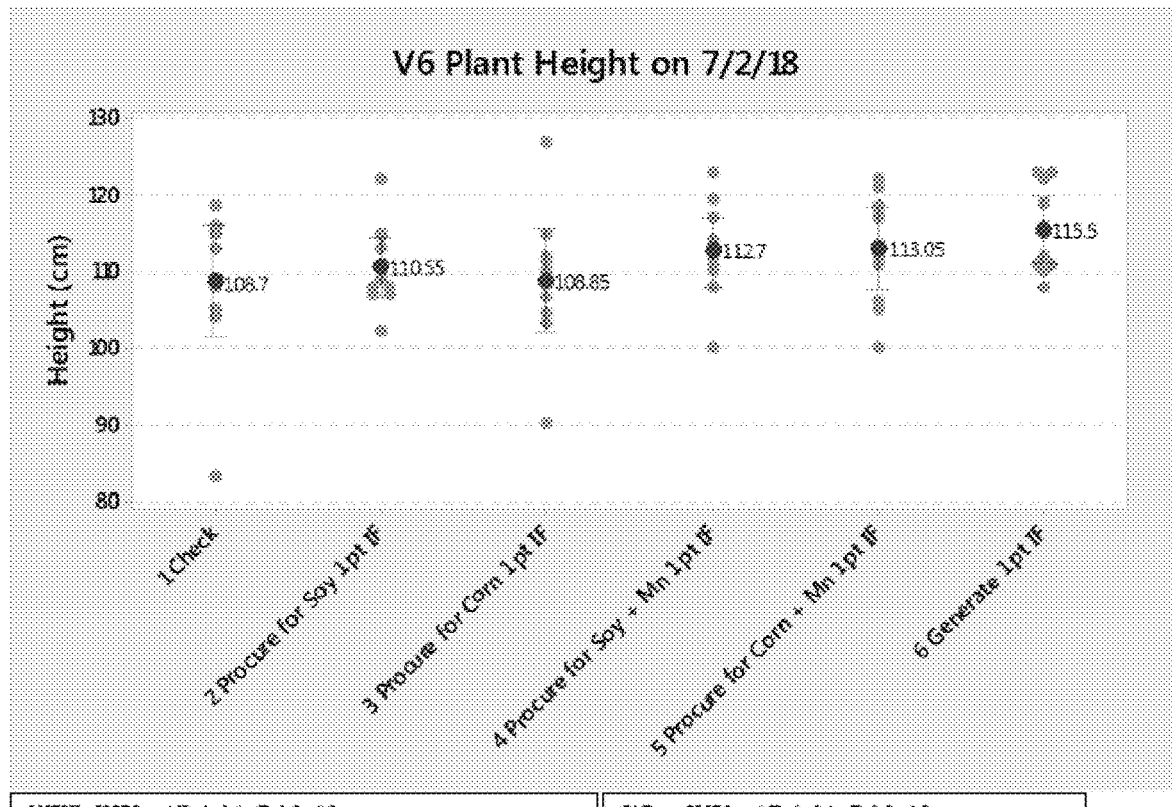
FIG. 51 is a graphical view of plant height, according to one or more embodiments of the present disclosure.
Figure 52:
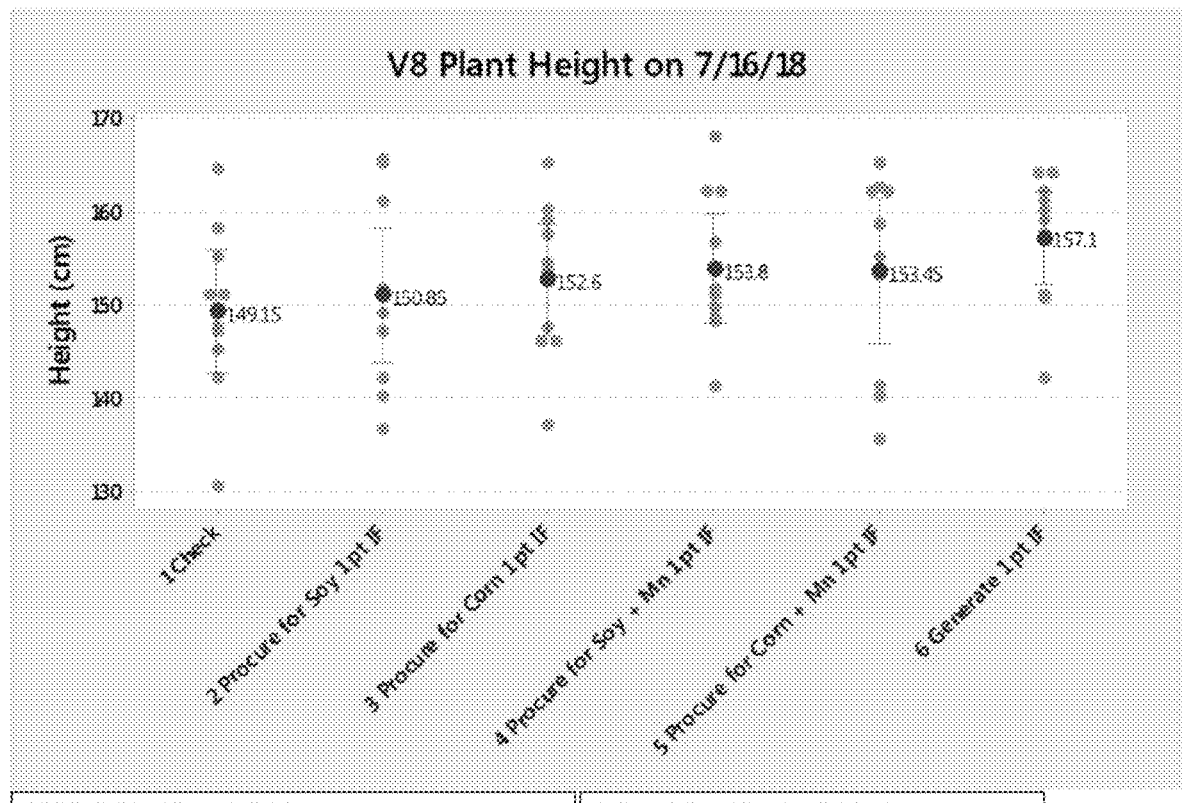
FIG. 52 is a graphical view of plant height, according to one or more embodiments of the present disclosure.
Figure 53:
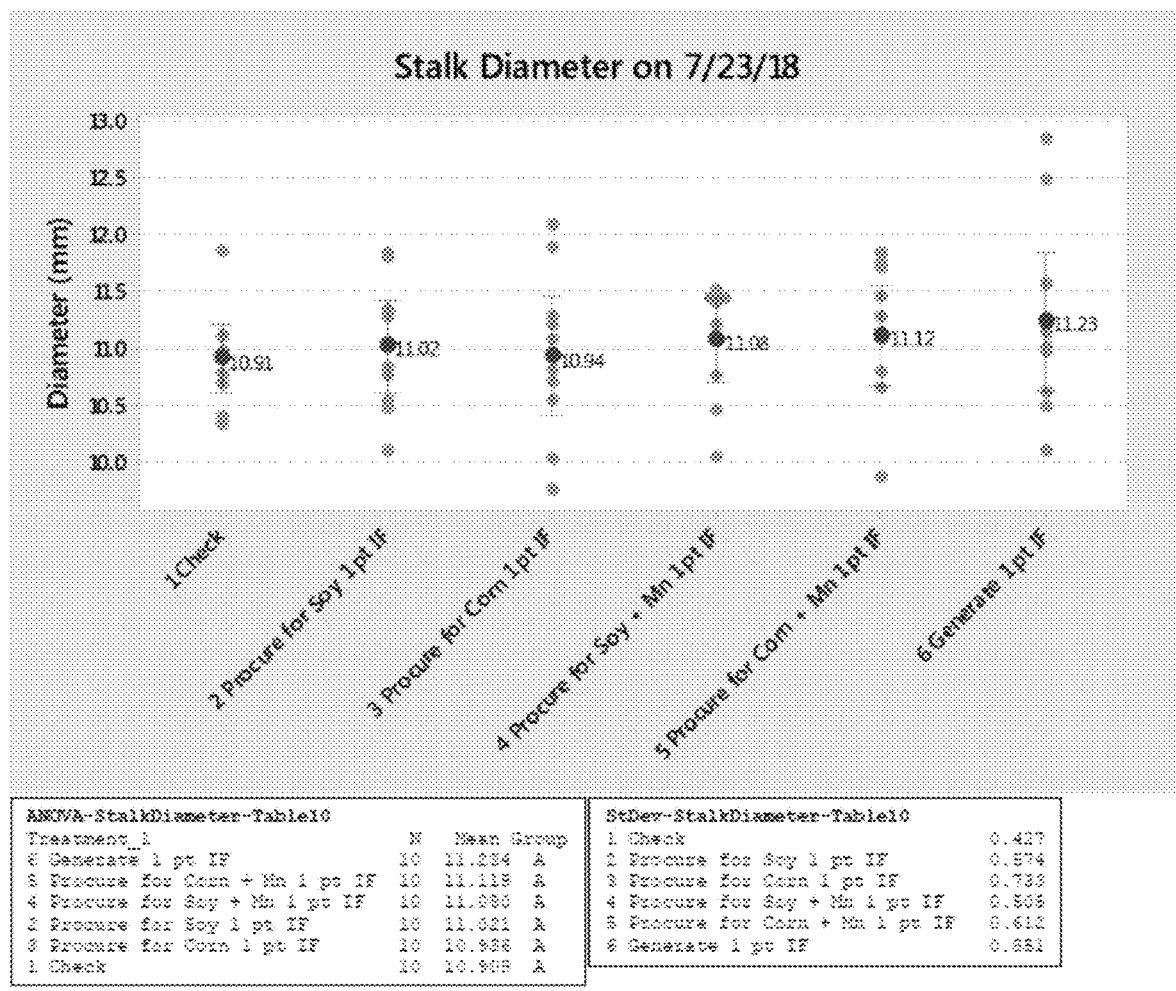
FIG. 53 is a graphical view of stalk diameter, according to one or more embodiments of the present disclosure.
Figure 54:
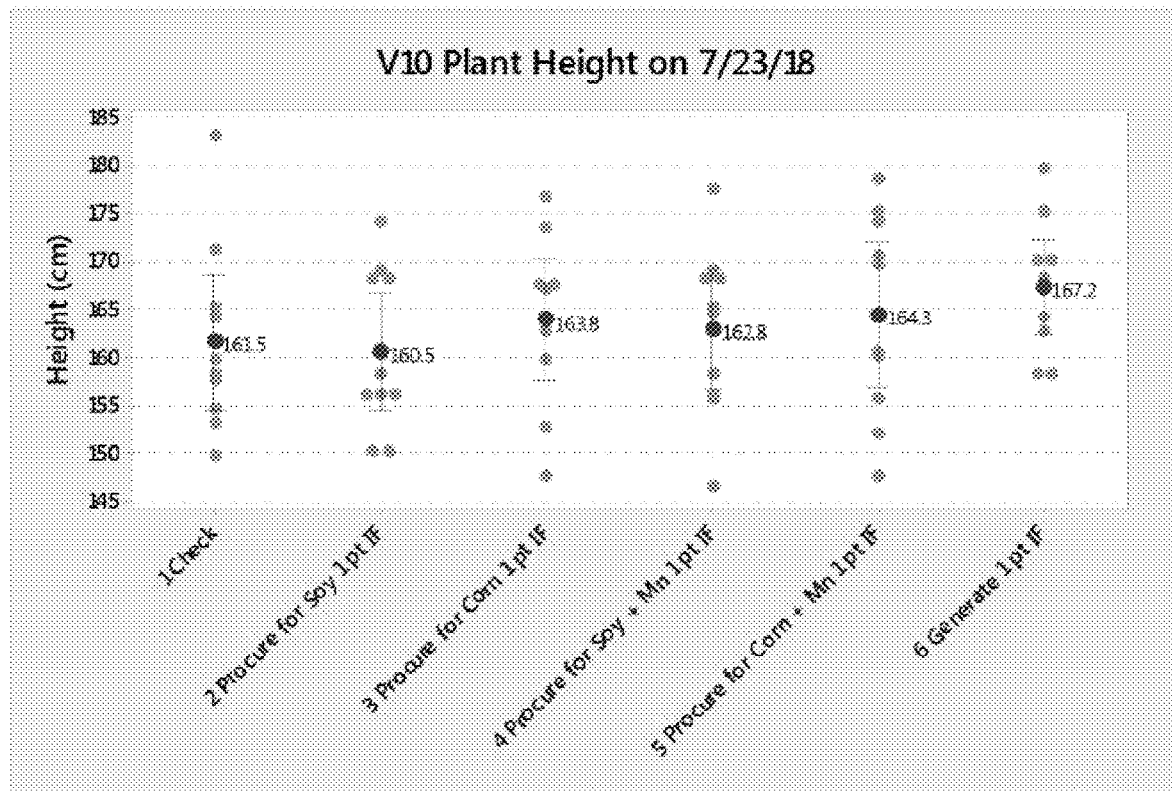
FIG. 54 is a graphical view of plant height, according to one or more embodiments of the present disclosure.
Figure 55:
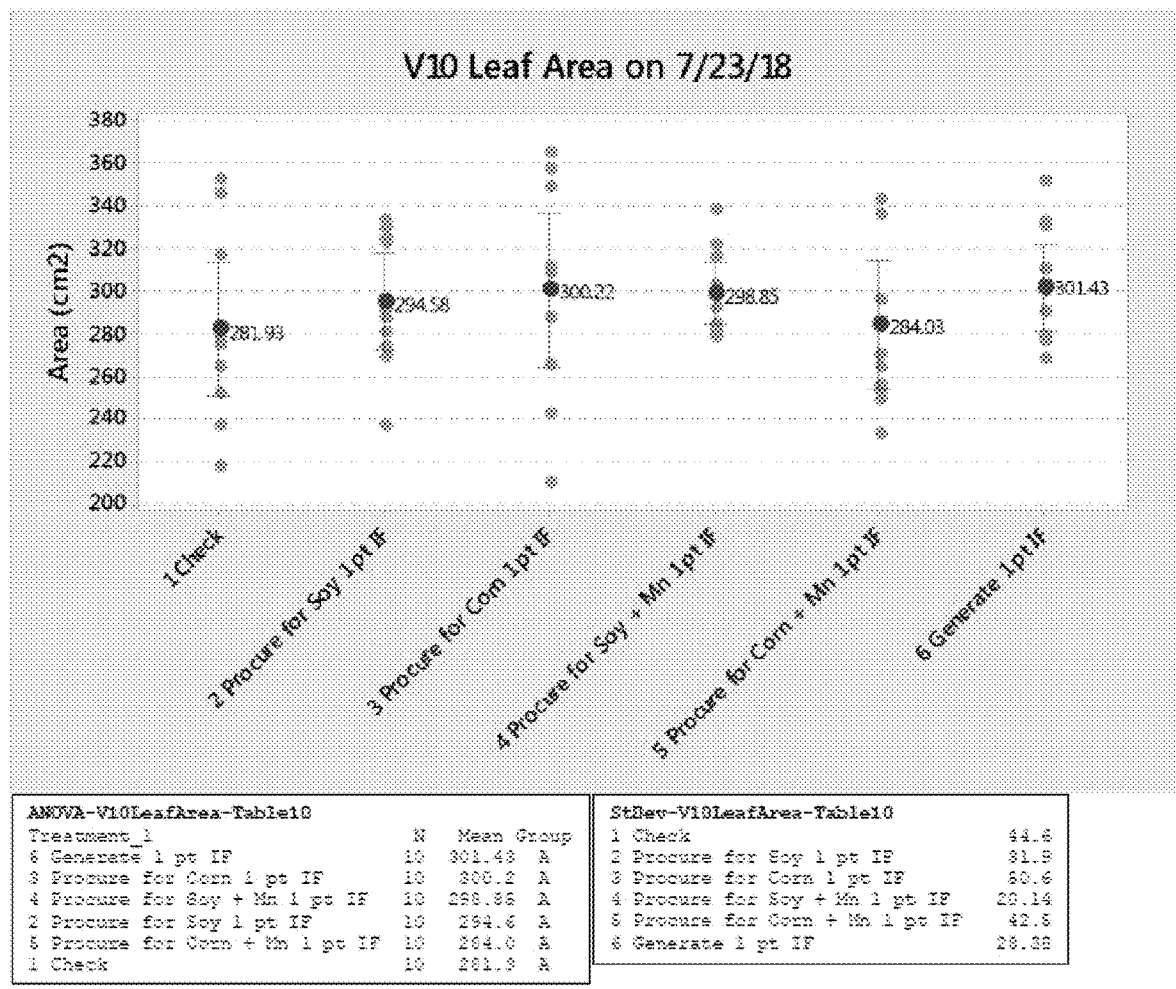
FIG. 55 is a graphical view of leaf area, according to one or more embodiments of the present disclosure.
Figure 56:
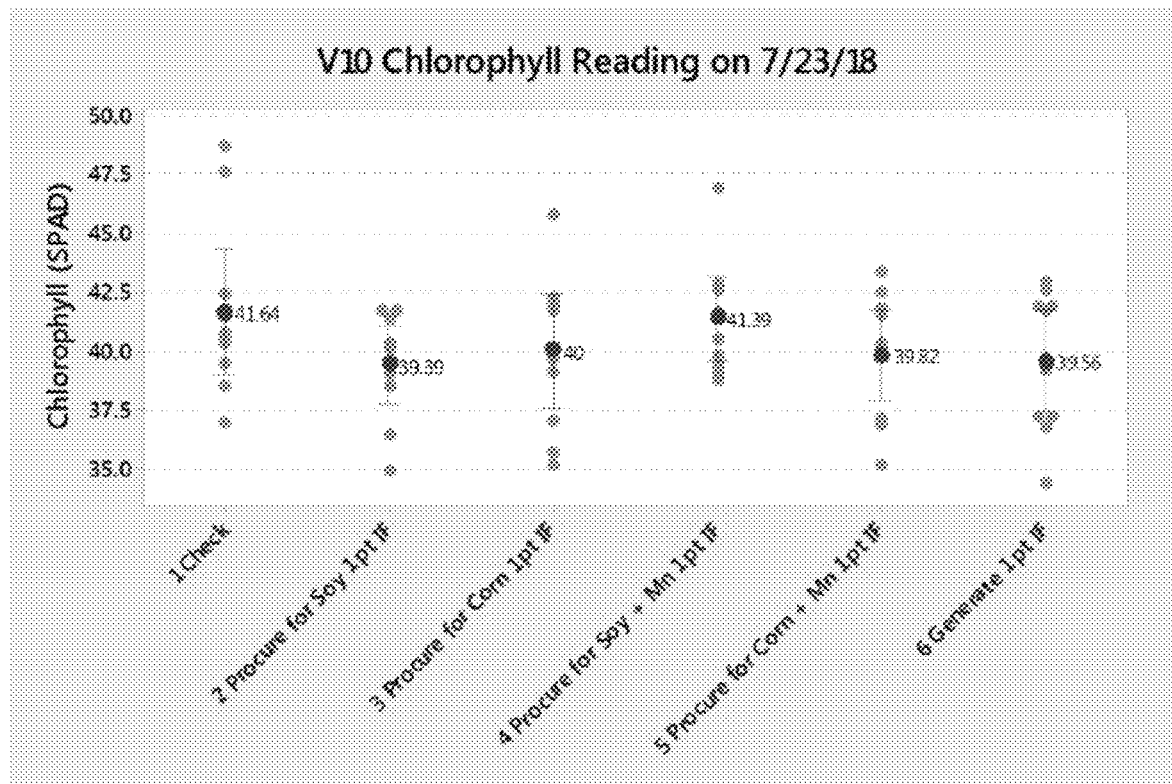
FIG. 56 is a graphical view of chlorophyll levels, according to one or more embodiments of the present disclosure.
Figure 57:
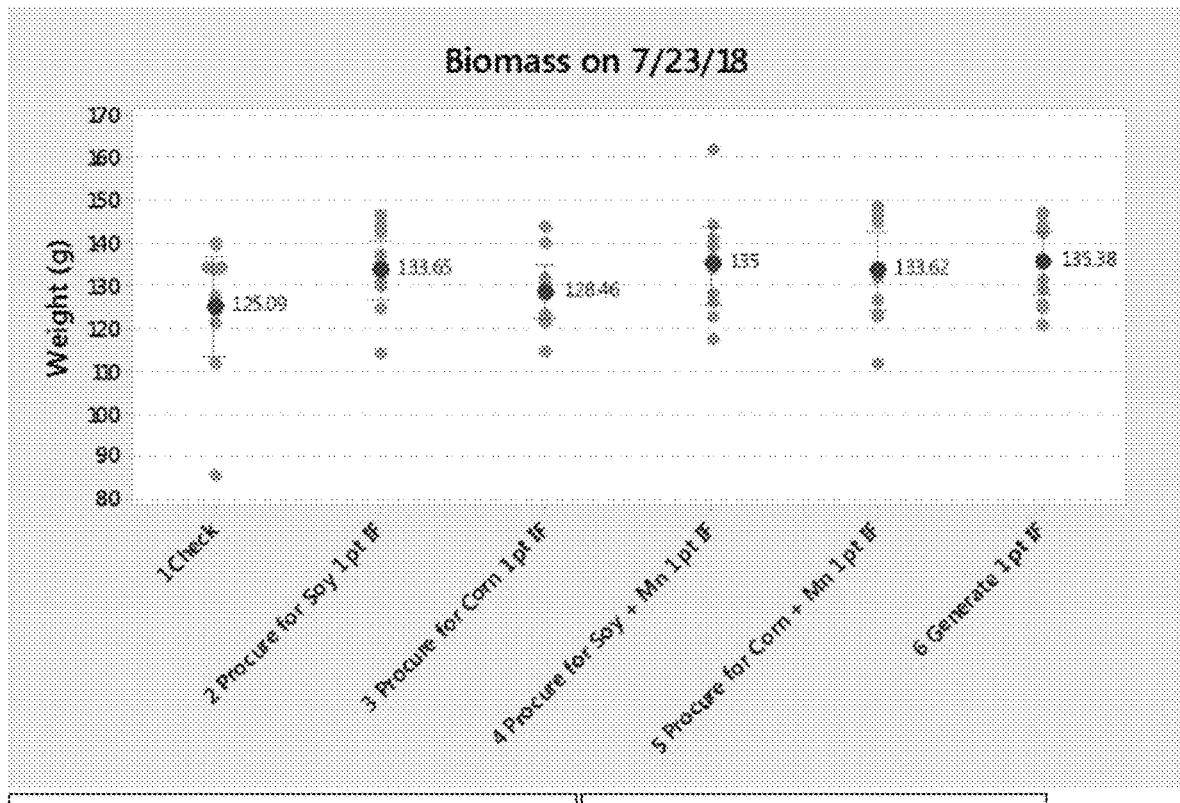
FIG. 57 is a graphical view of biomass, according to one or more embodiments of the present disclosure.
Figure 58:
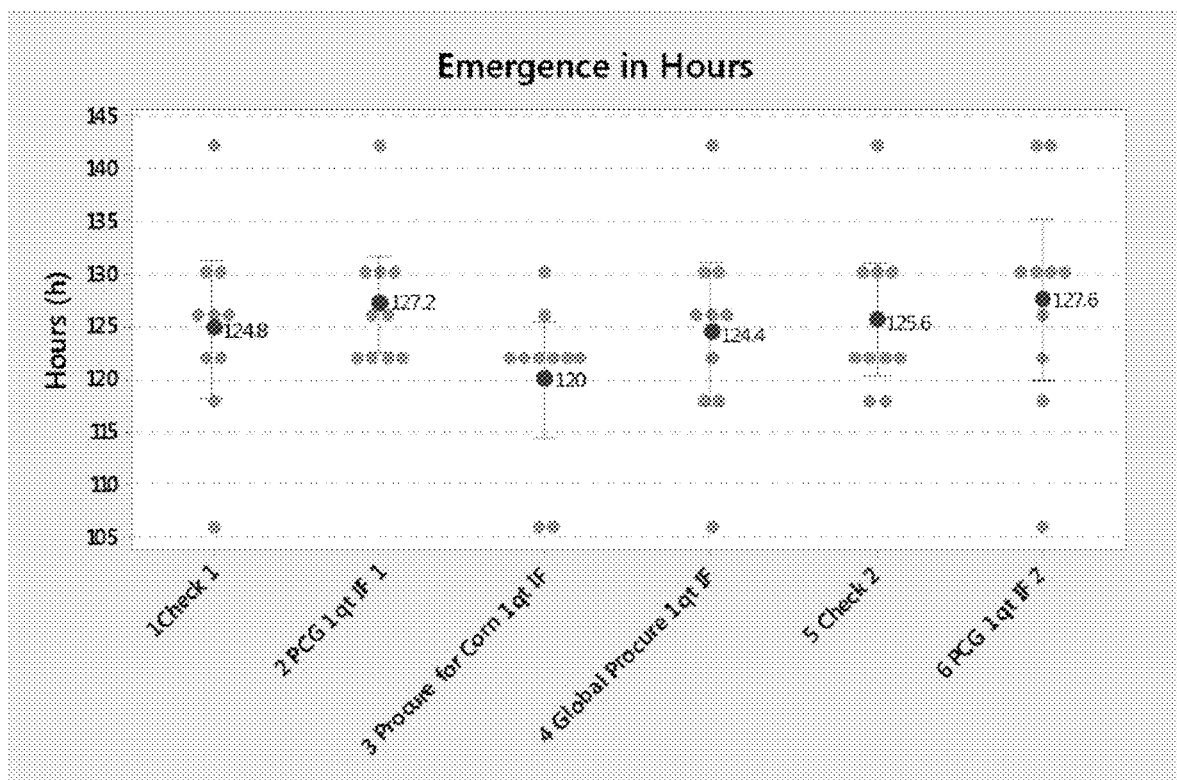
FIG. 58 is a graphical view plant emergence, according to one or more embodiments of the present disclosure.
Figure 59:
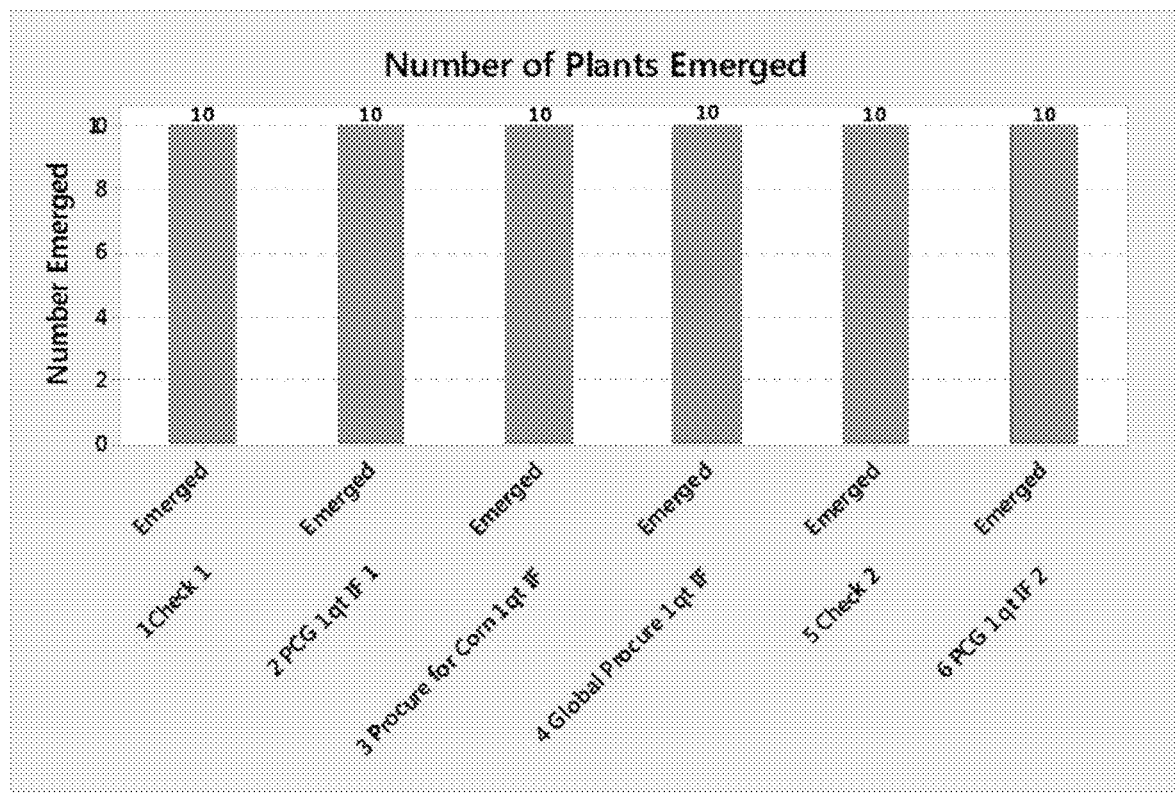
FIG. 59 is a graphical view of the number of plants emerged, according to one or more embodiments of the present disclosure.
Figure 60:
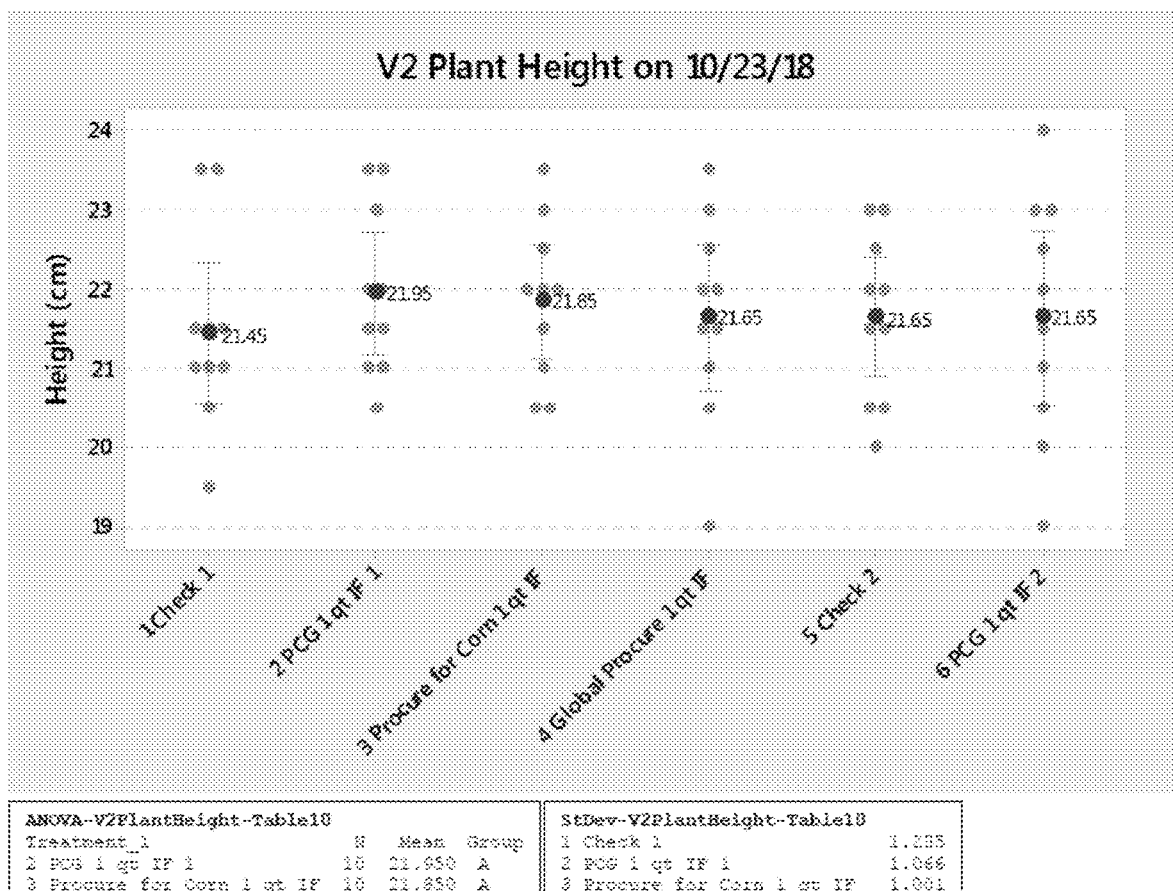
FIG. 60 is a graphical view of plant height, according to one or more embodiments of the present disclosure.
Figure 61:
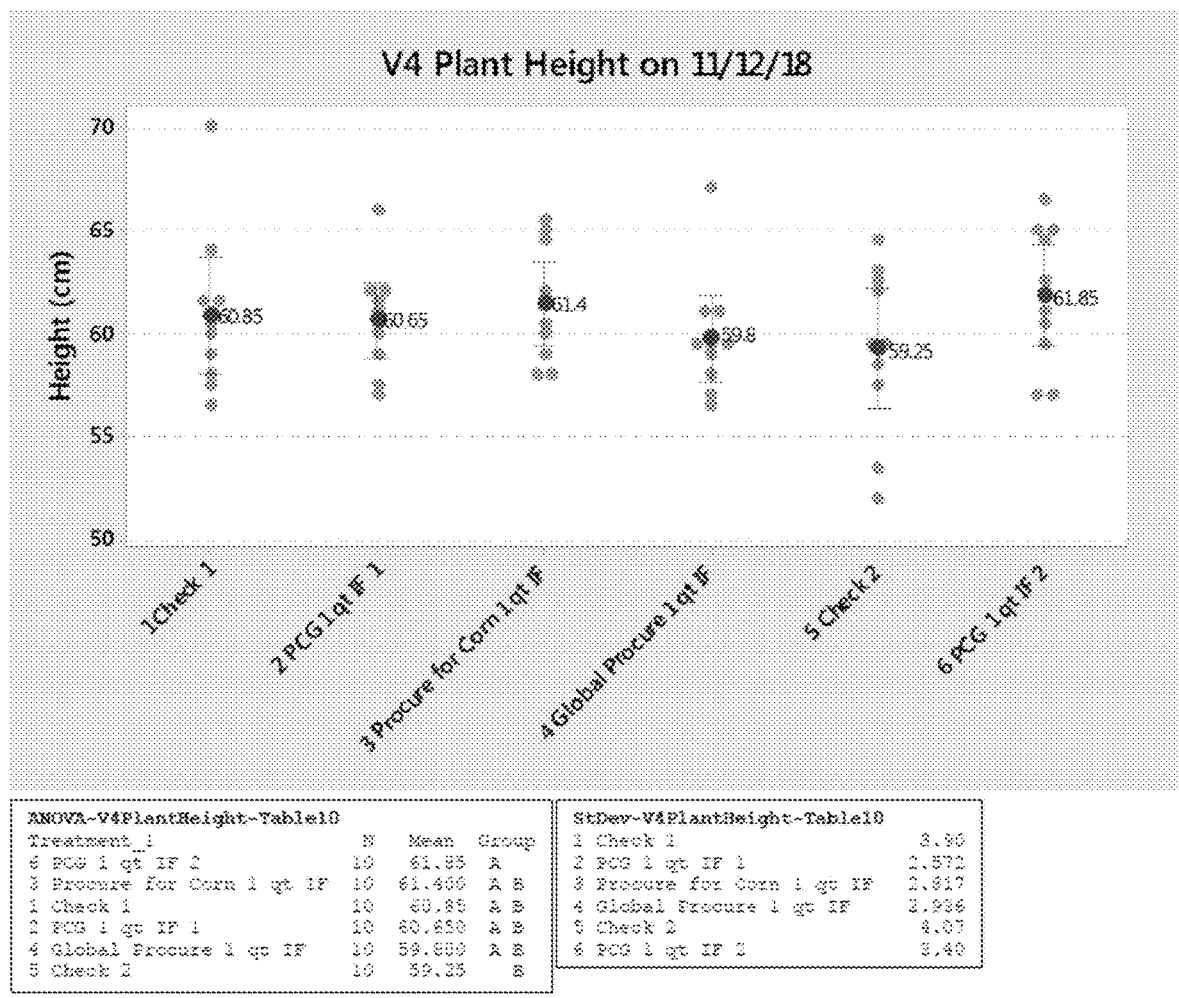
FIG. 61 is a graphical view of plant height, according to one or more embodiments of the present disclosure.
Figure 62:
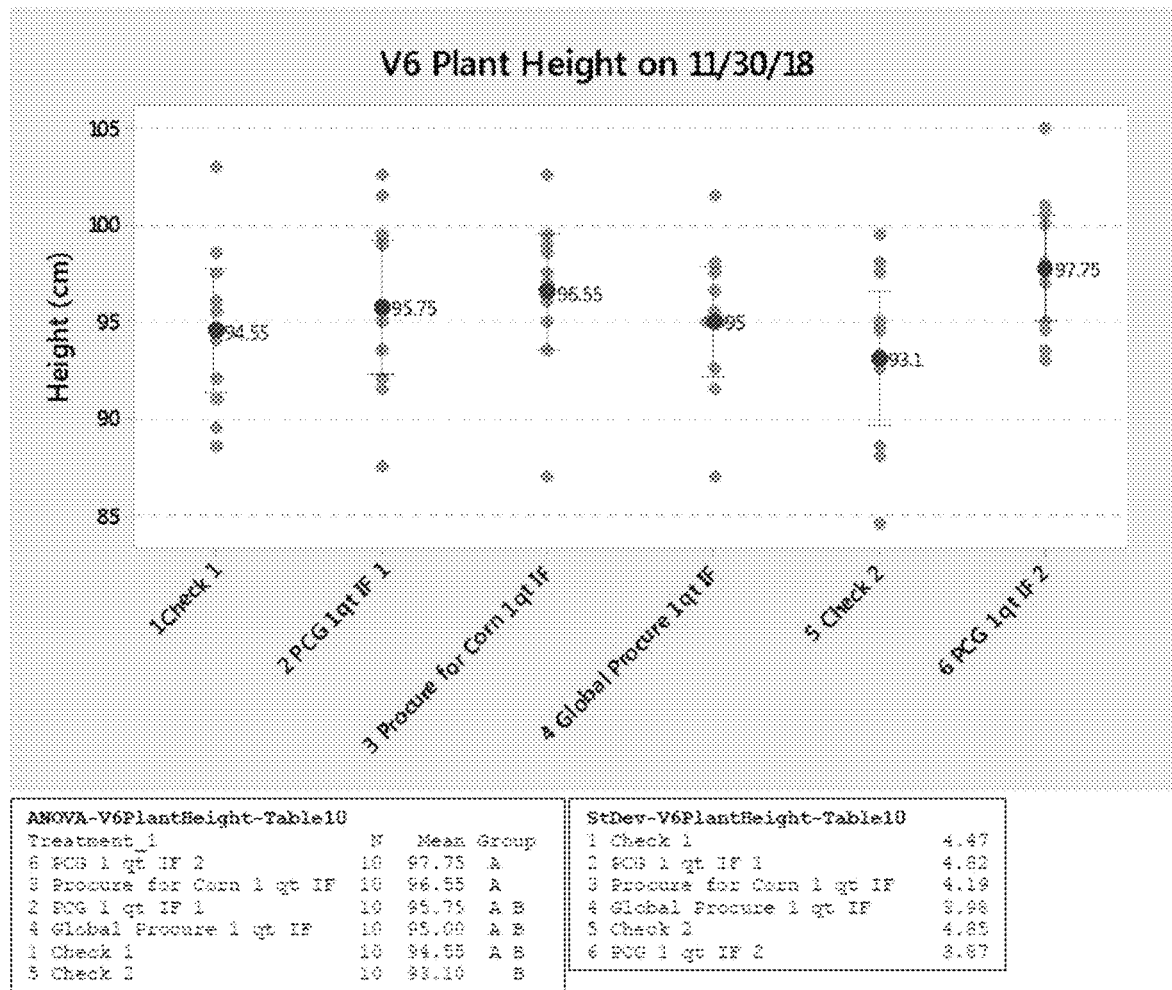
FIG. 62 is a graphical view of plant height, according to one or more embodiments of the present disclosure.
Figure 63:
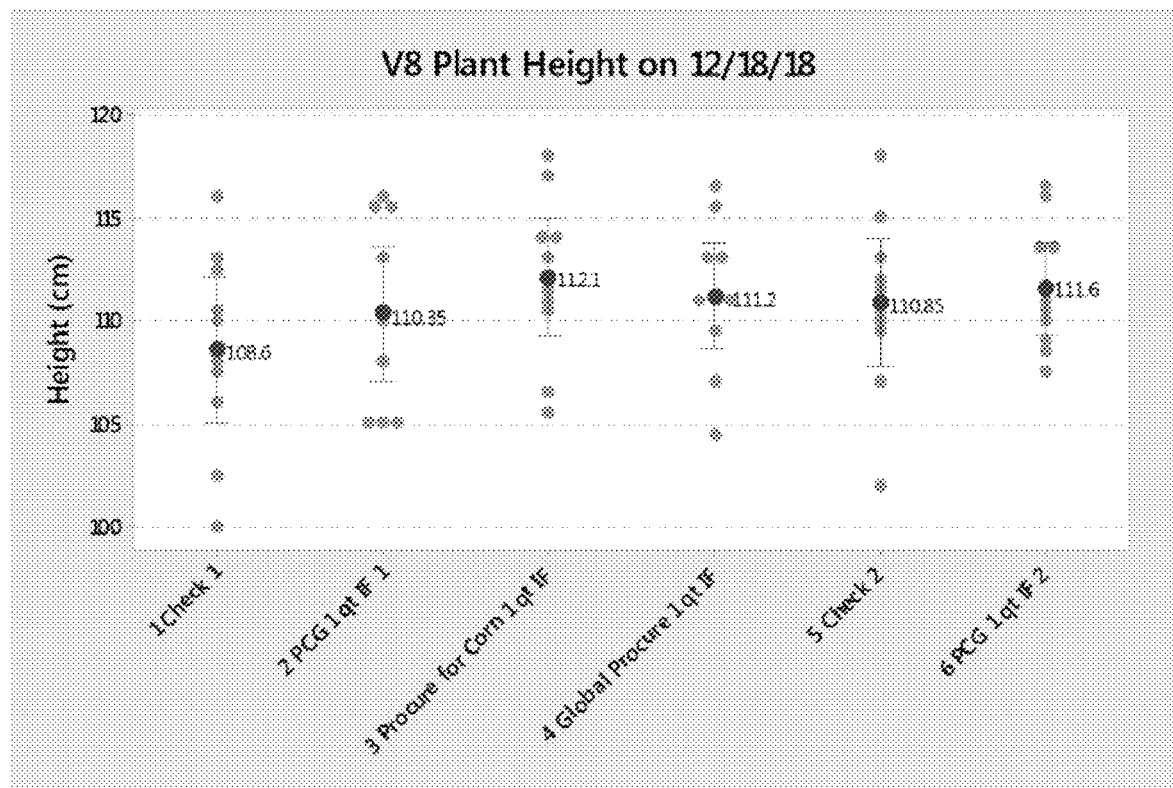
FIG. 63 is a graphical view of plant height, according to one or more embodiments of the present disclosure.
Figure 64:
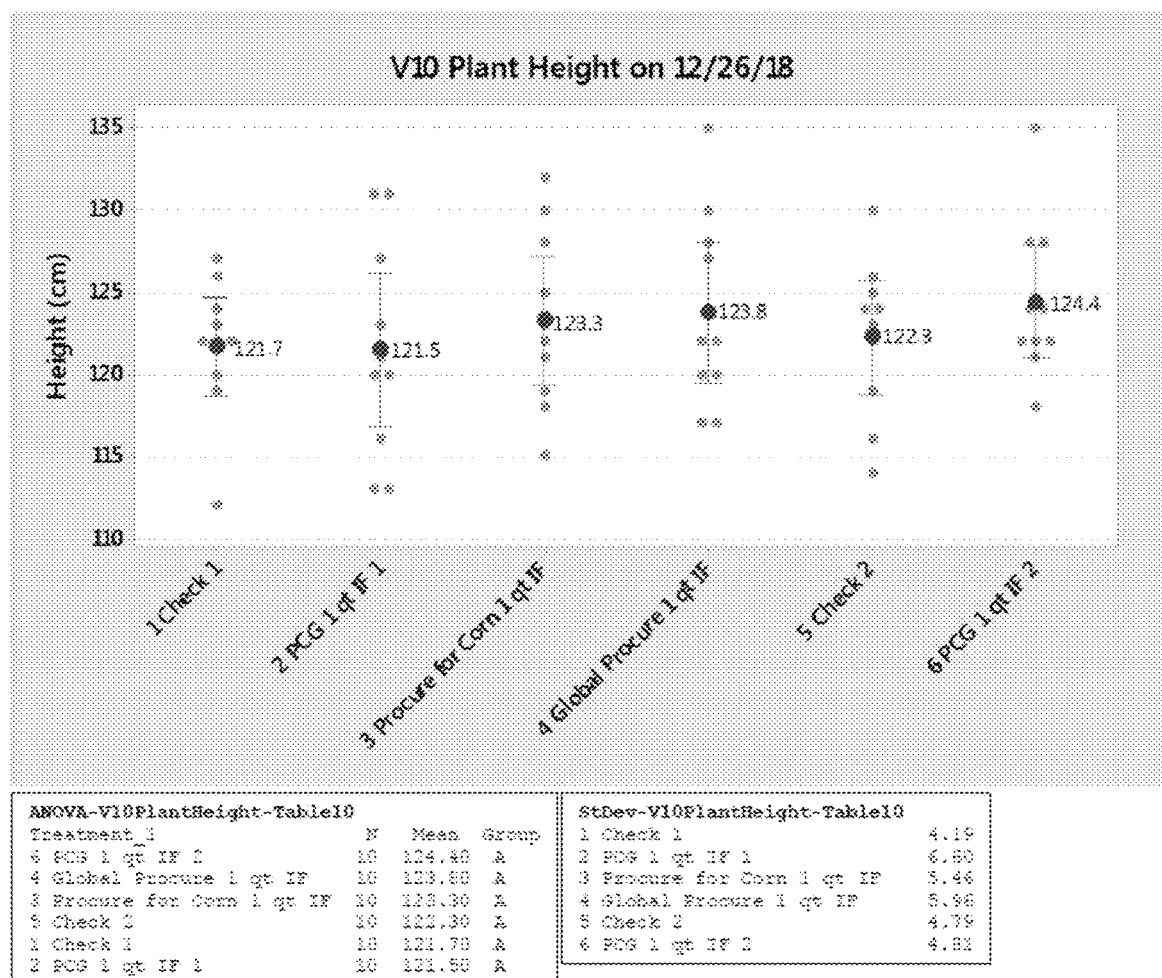
FIG. 64 is a graphical view of plant height, according to one or more embodiments of the present disclosure.
Figure 65:
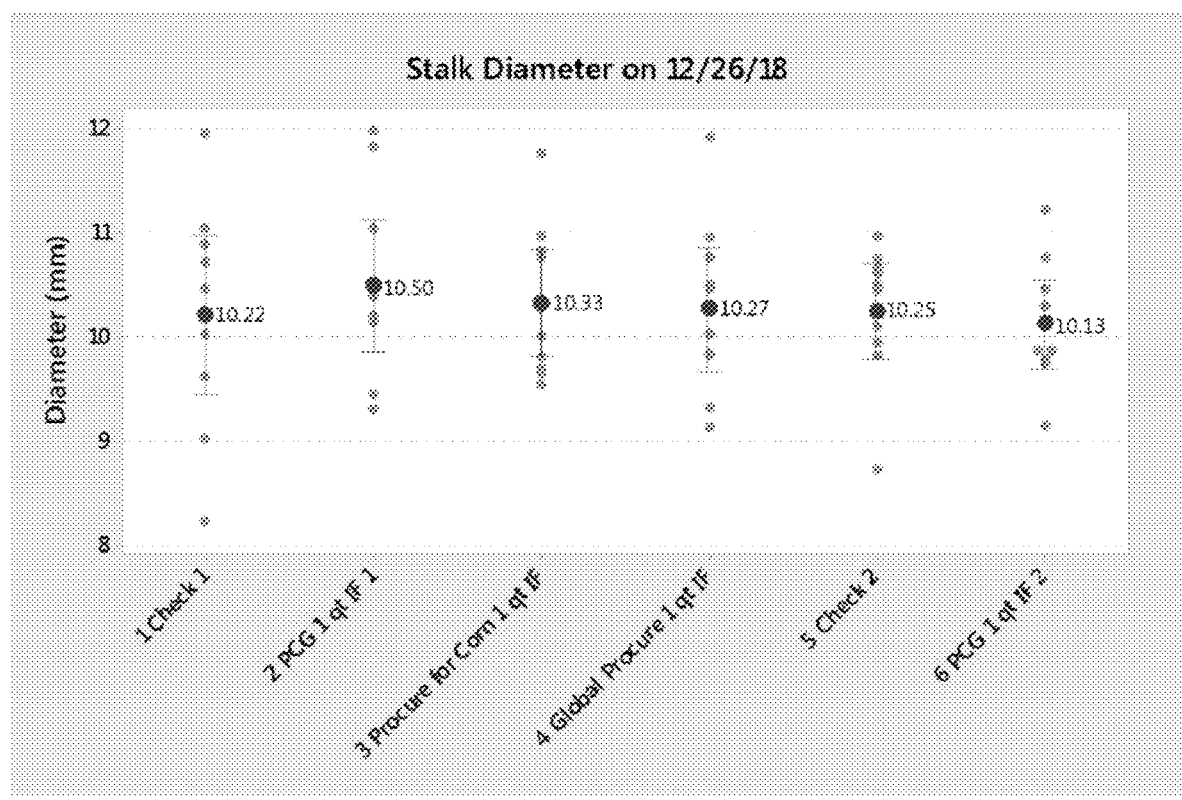
FIG. 65 is a graphical view of stalk diameter, according to one or more embodiments of the present disclosure.
Figure 66:
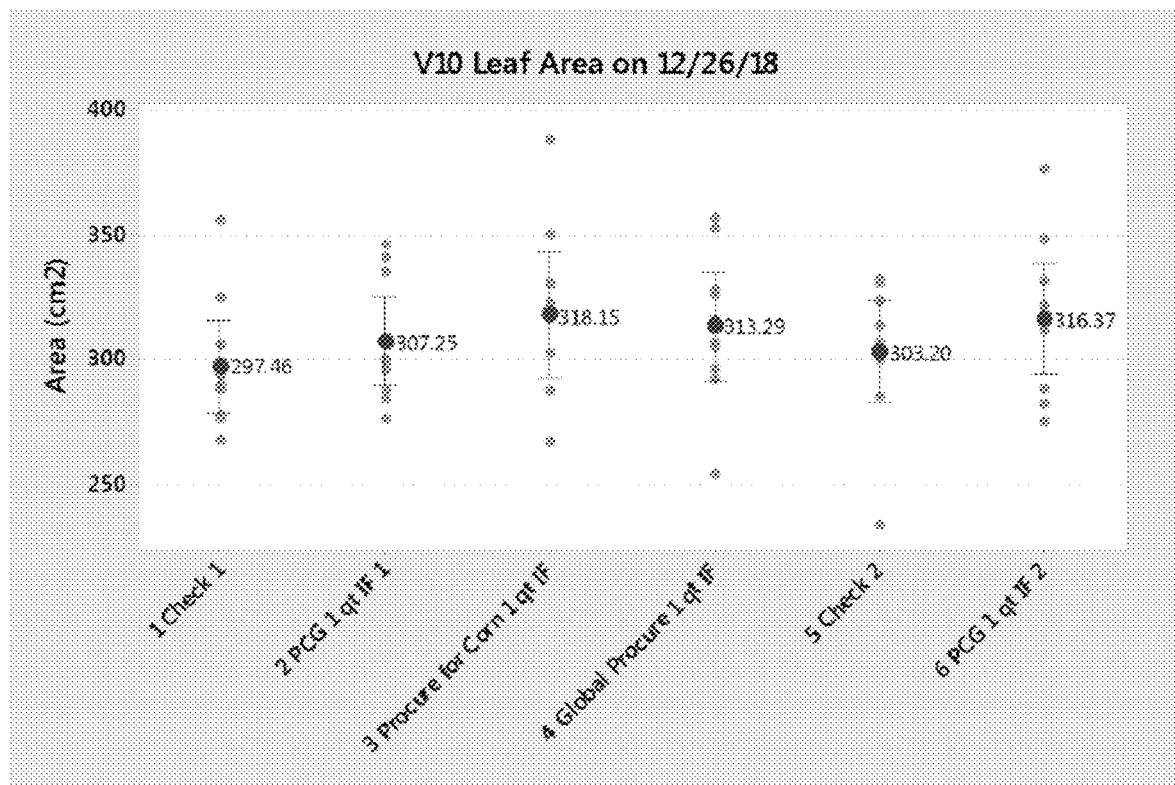
FIG. 66 is a graphical view of leaf area, according to one or more embodiments of the present disclosure.
Figure 67:
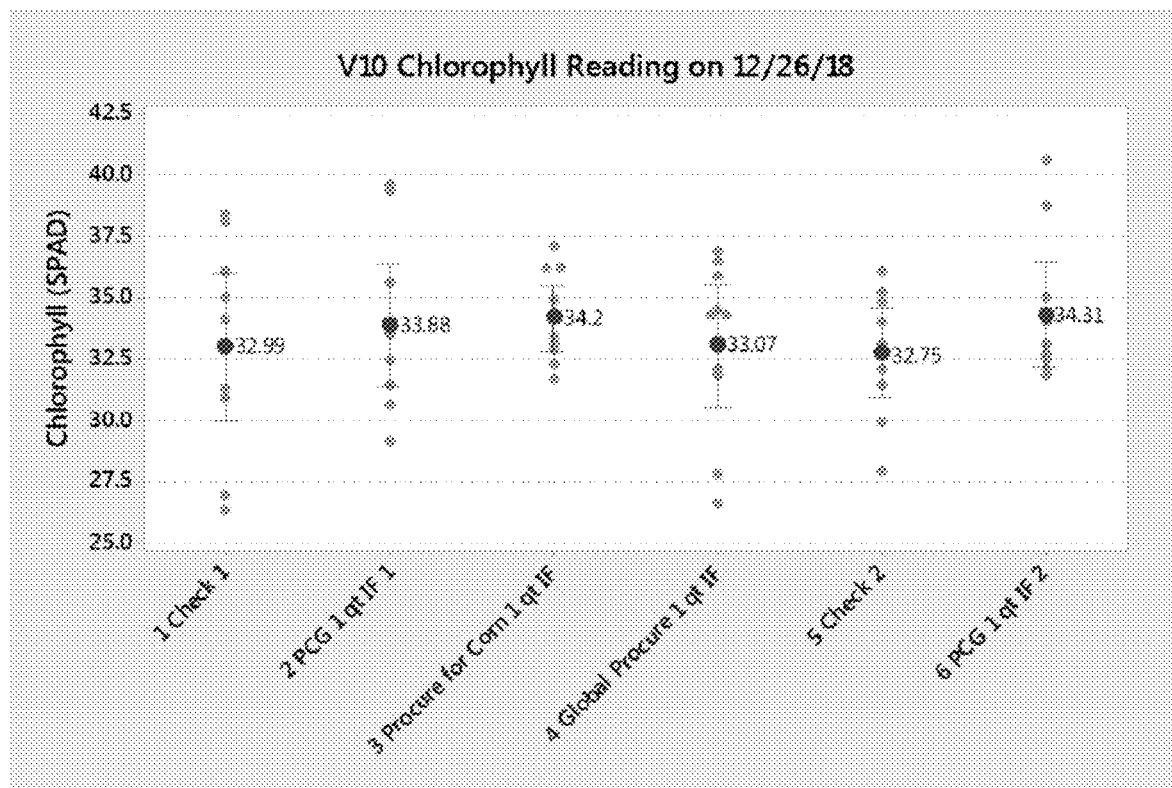
FIG. 67 is a graphical view of chlorophyll levels, according to one or more embodiments of the present disclosure.
Figure 68:
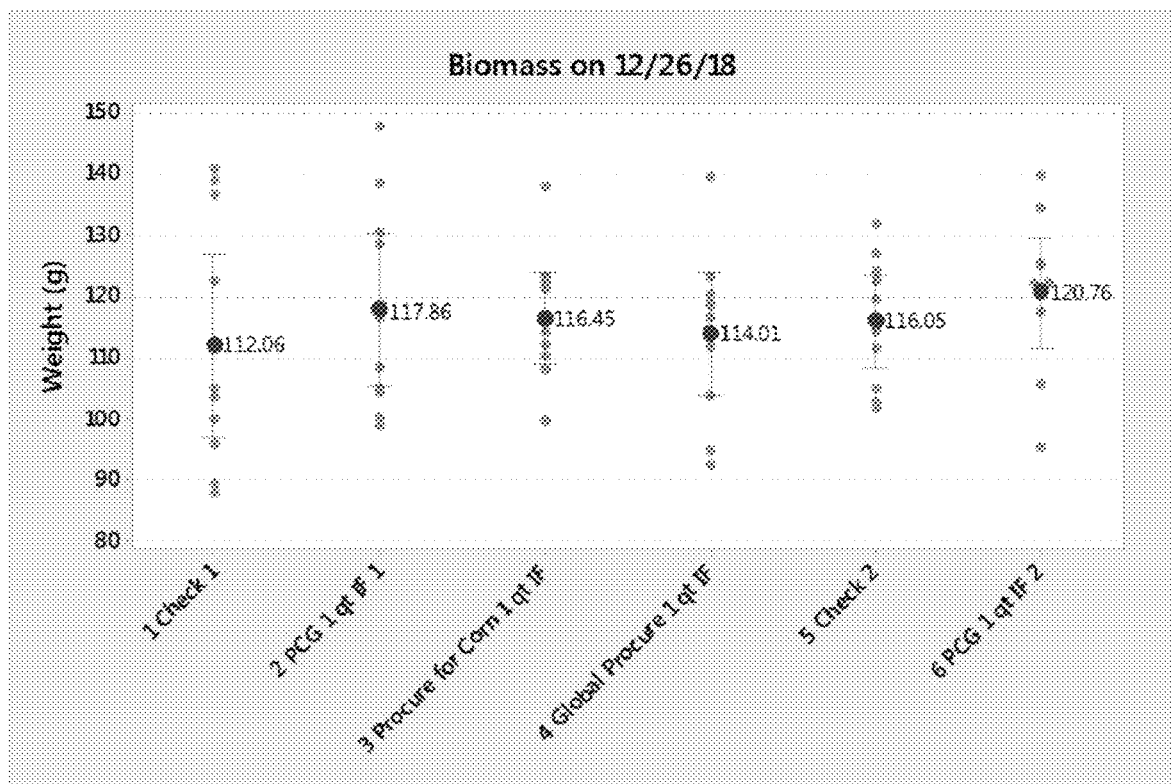
FIG. 68 is a graphical view of biomass, according to one or more embodiments of the present disclosure.
Figure 69:
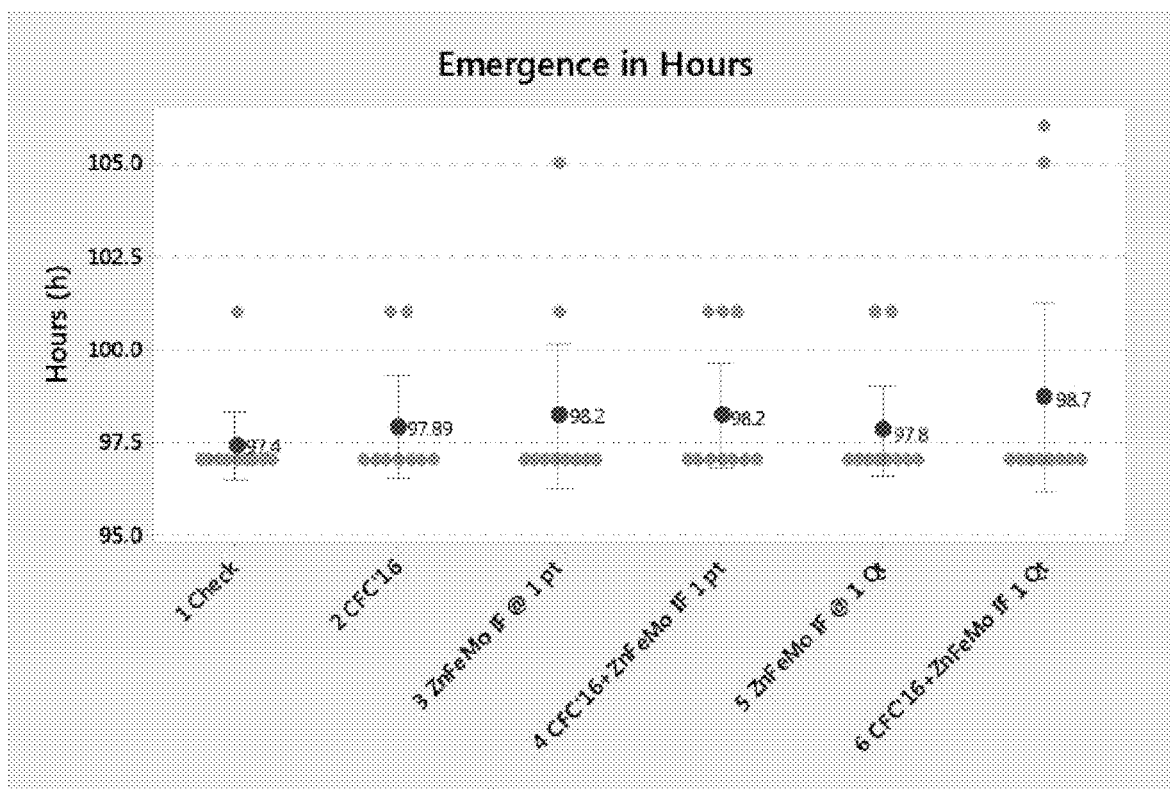
FIG. 69 is a graphical view plant emergence, according to one or more embodiments of the present disclosure.
Figure 70:
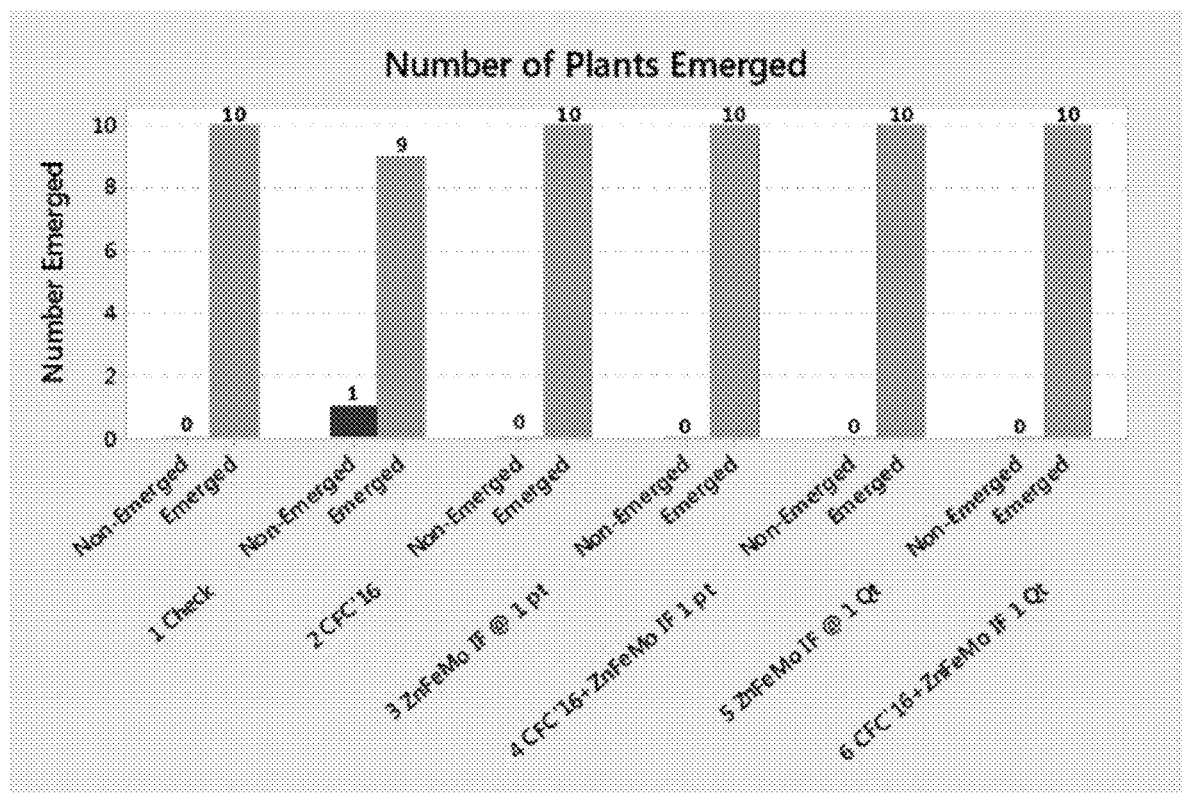
FIG. 70 is a graphical view of the number of plants emerged, according to one or more embodiments of the present disclosure.
Figure 71:
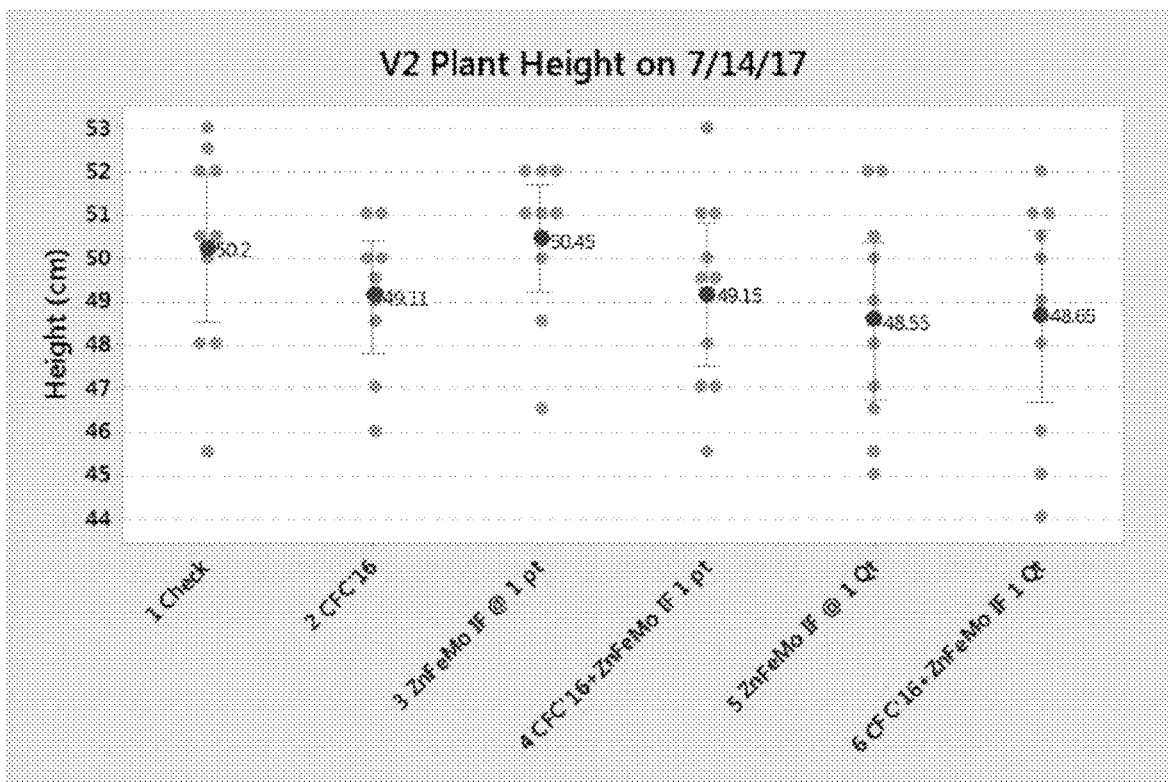
FIG. 71 is a graphical view of plant height, according to one or more embodiments of the present disclosure.
Figure 72:
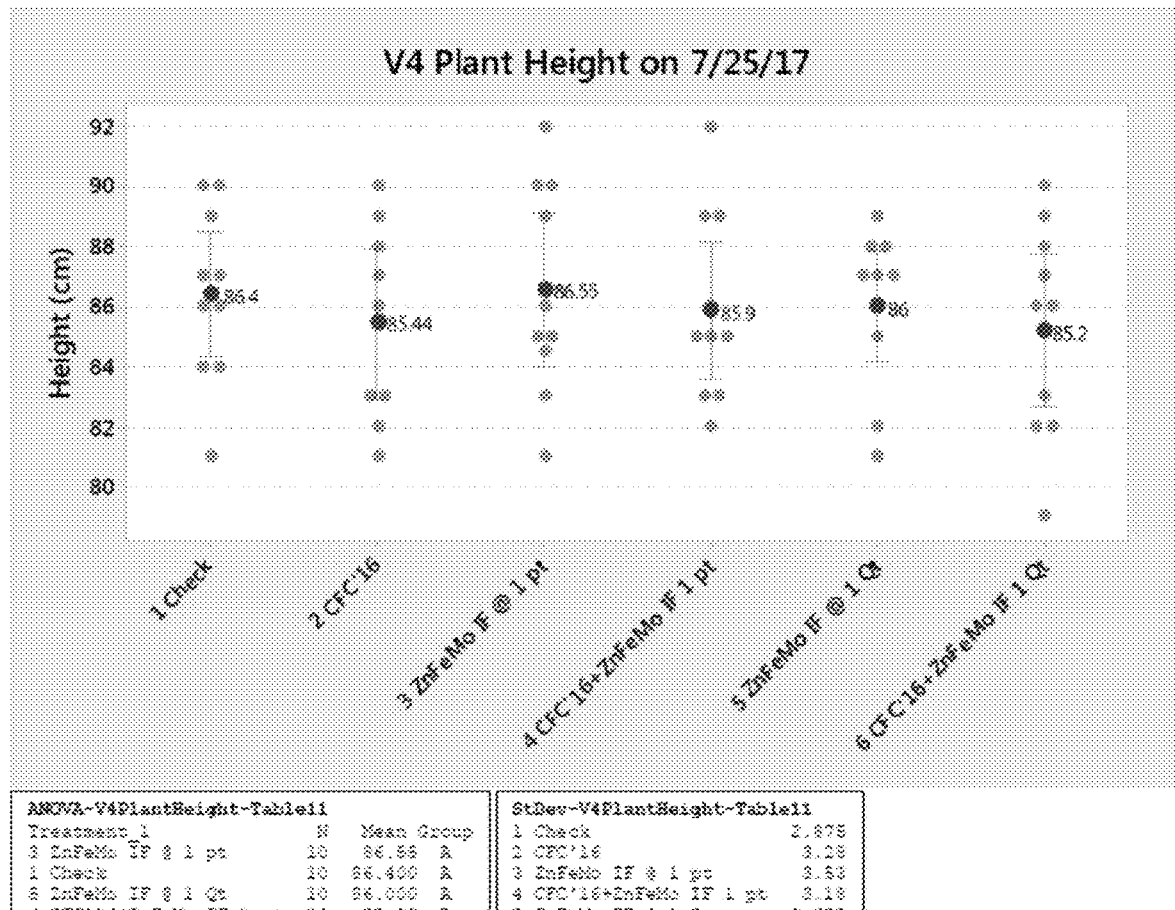
FIG. 72 is a graphical view of plant height, according to one or more embodiments of the present disclosure.
Figure 73:
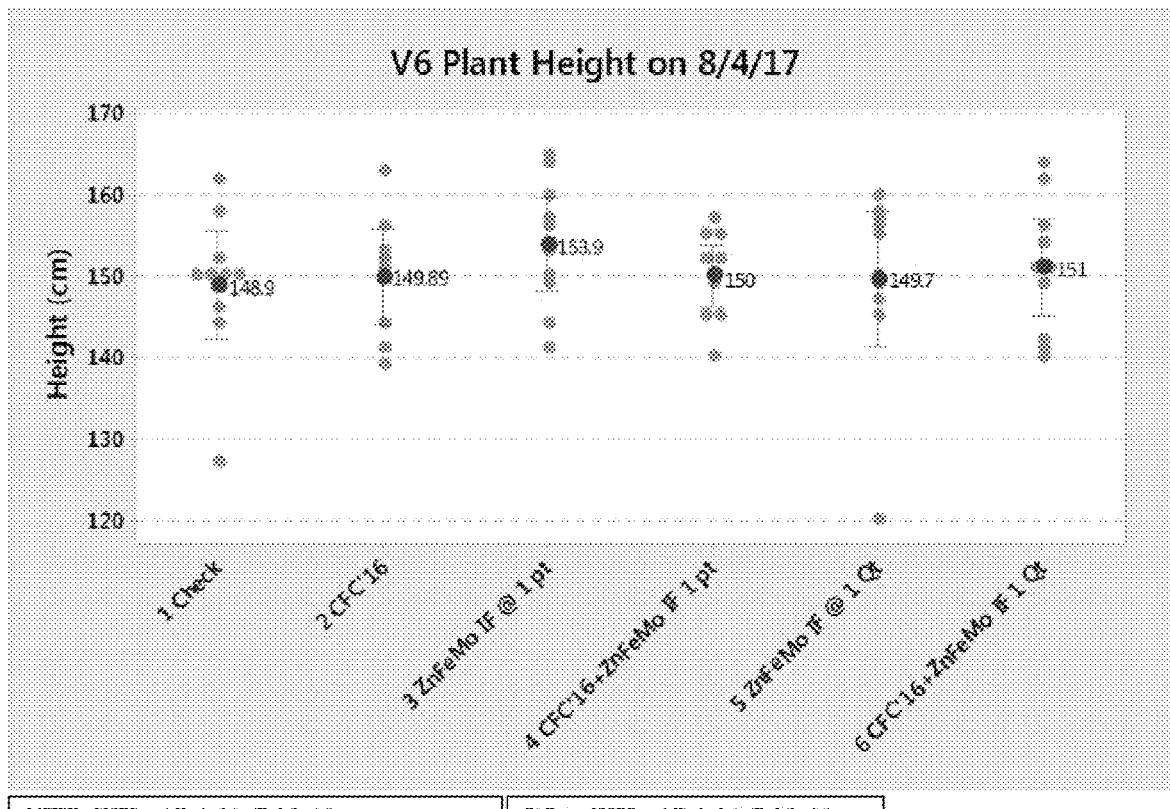
FIG. 73 is a graphical view of plant height, according to one or more embodiments of the present disclosure.
Figure 74:
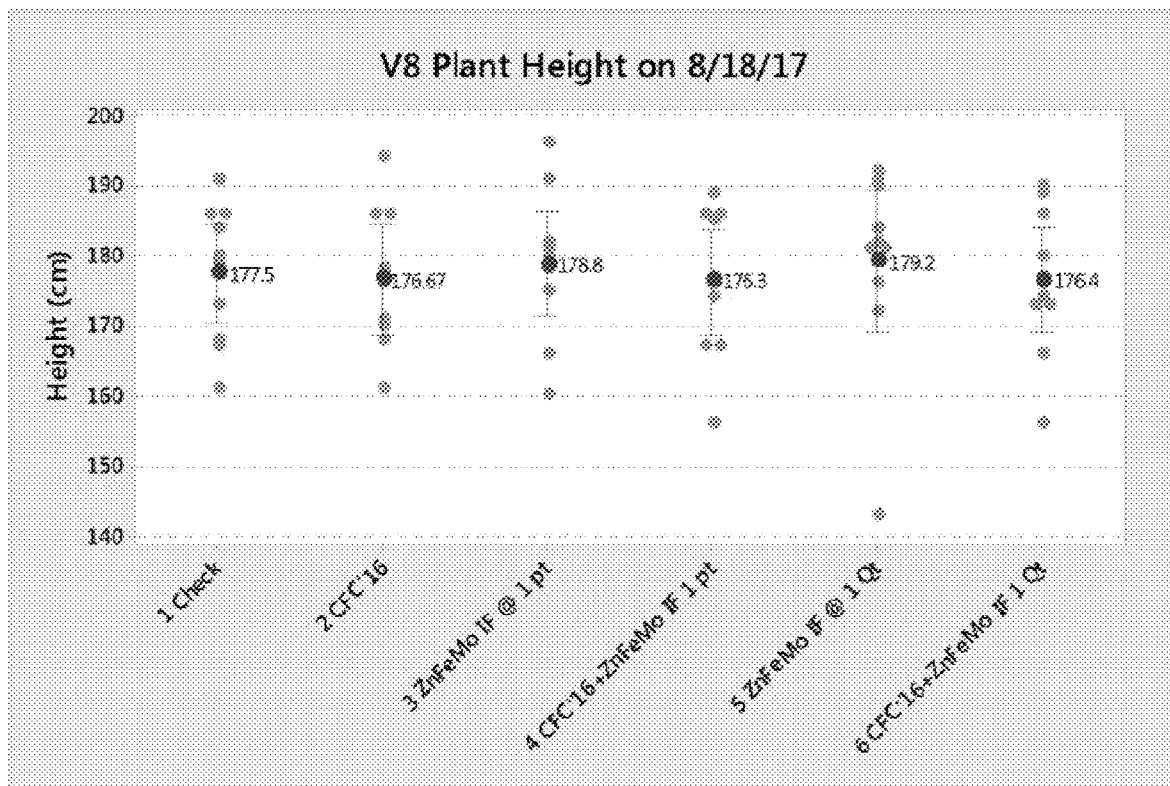
FIG. 74 is a graphical view of plant height, according to one or more embodiments of the present disclosure.
Figure 75:
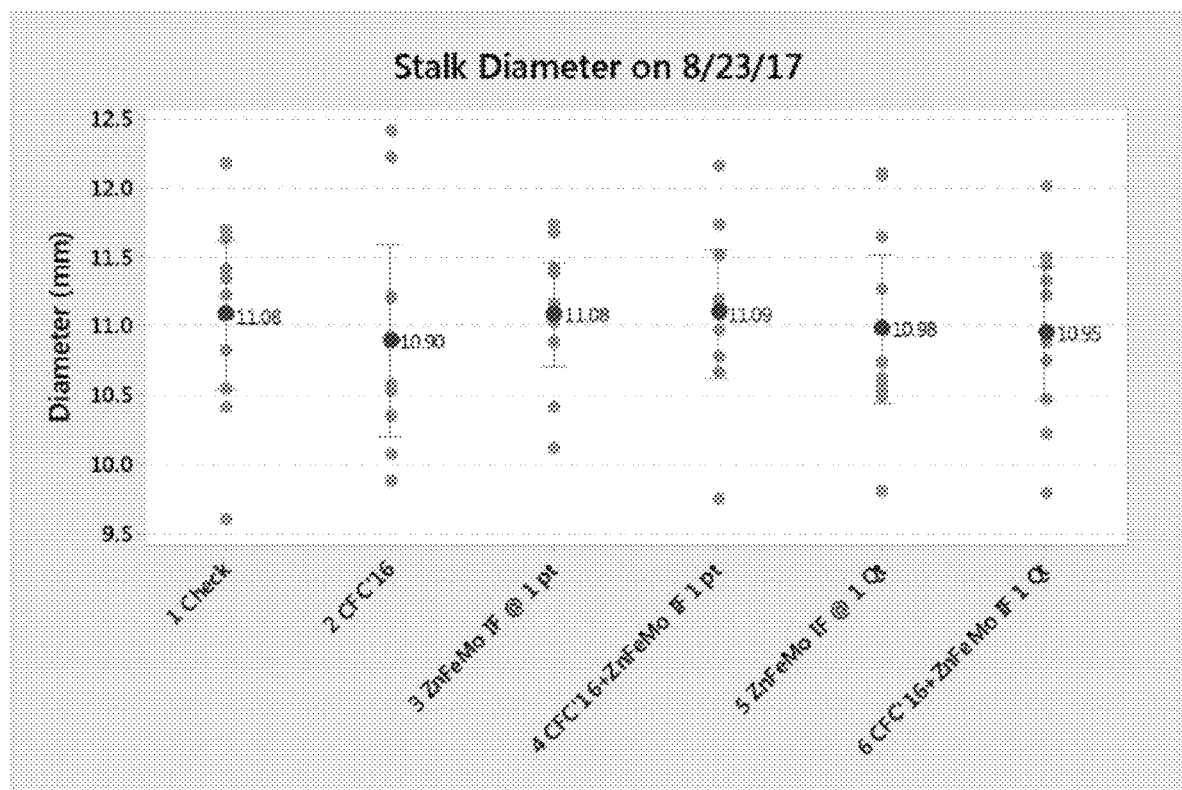
FIG. 75 is a graphical view of stalk diameter, according to one or more embodiments of the present disclosure.
Figure 76:
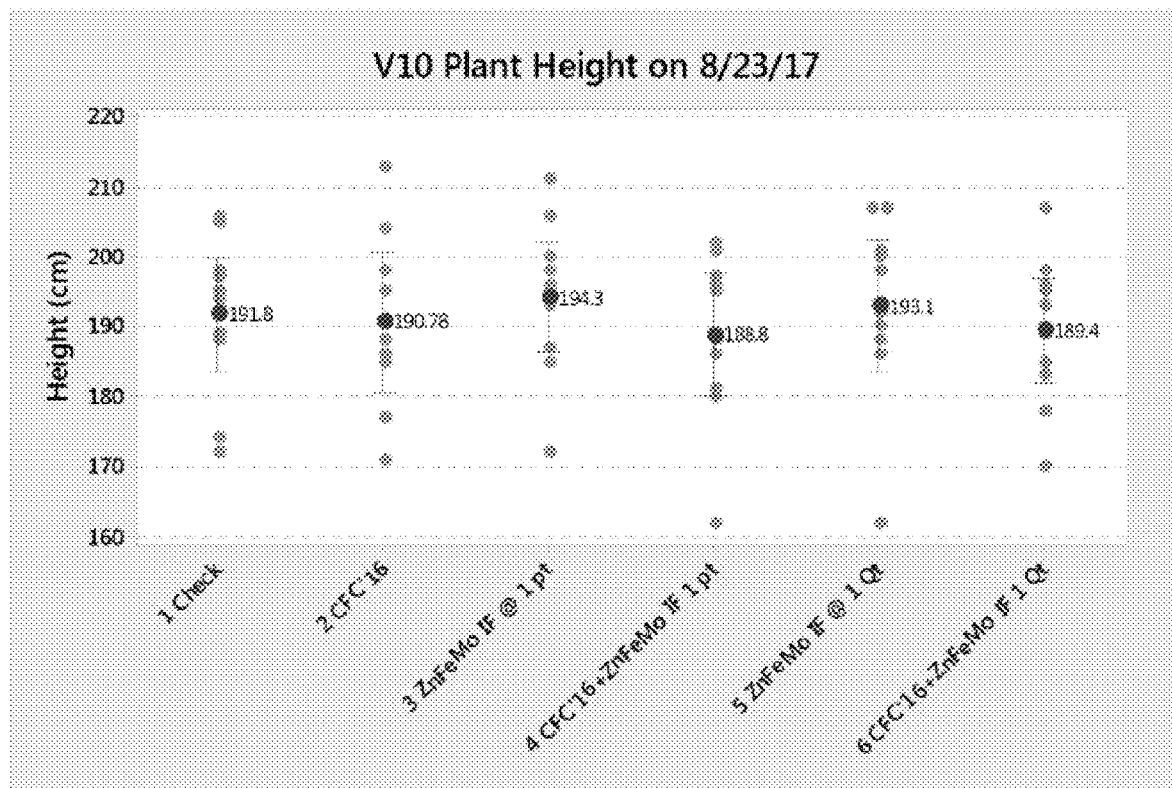
FIG. 76 is a graphical view of plant height, according to one or more embodiments of the present disclosure.
Figure 77:
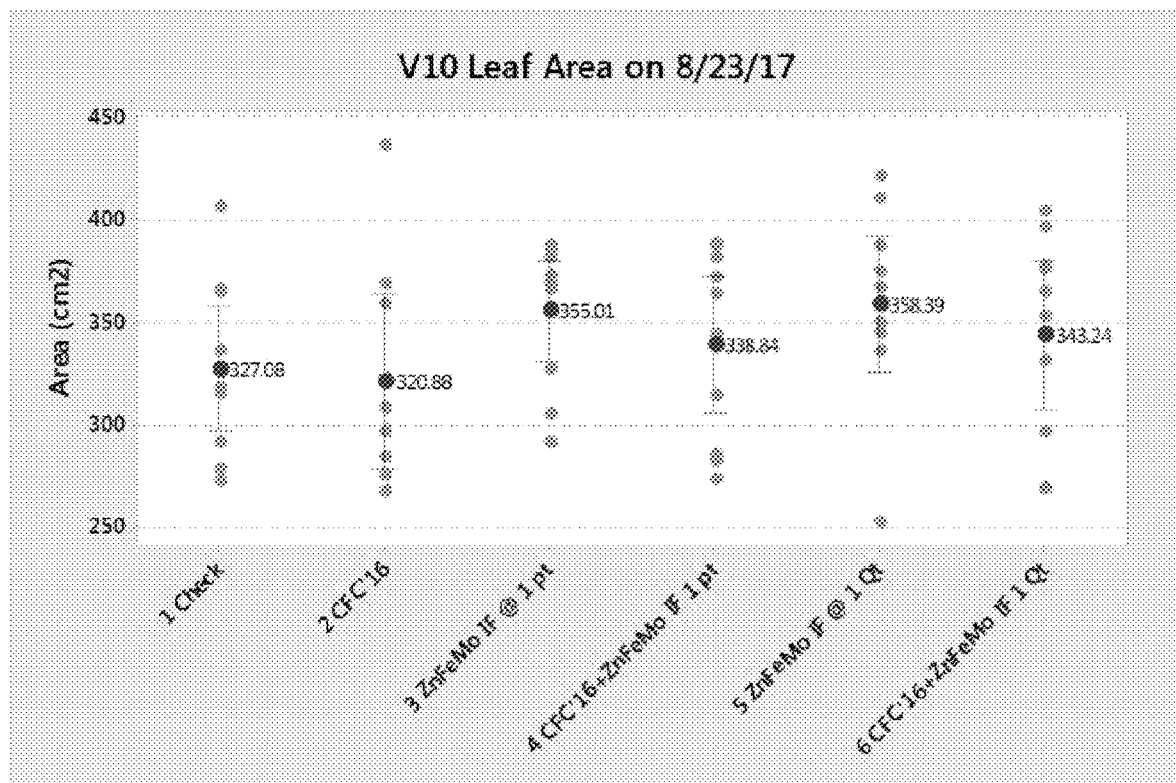
FIG. 77 is a graphical view of leaf area, according to one or more embodiments of the present disclosure.
Figure 78:
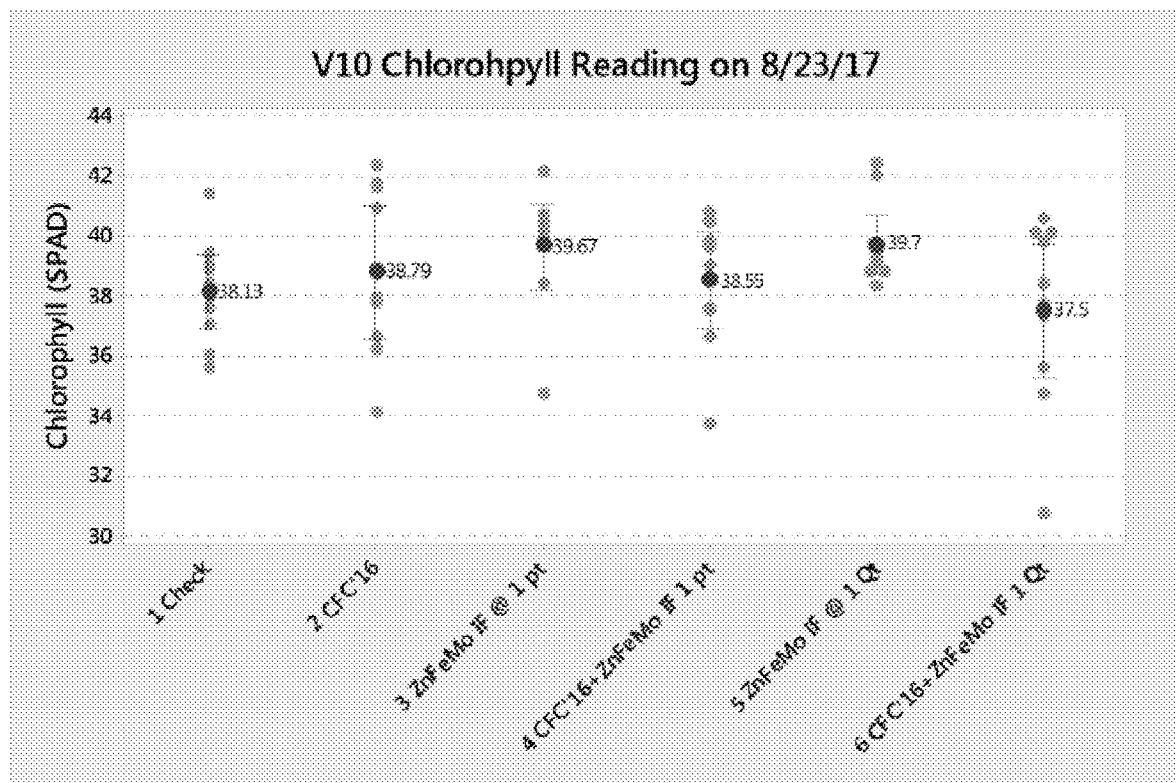
FIG. 78 is a graphical view of chlorophyll levels, according to one or more embodiments of the present disclosure.
Figure 79:
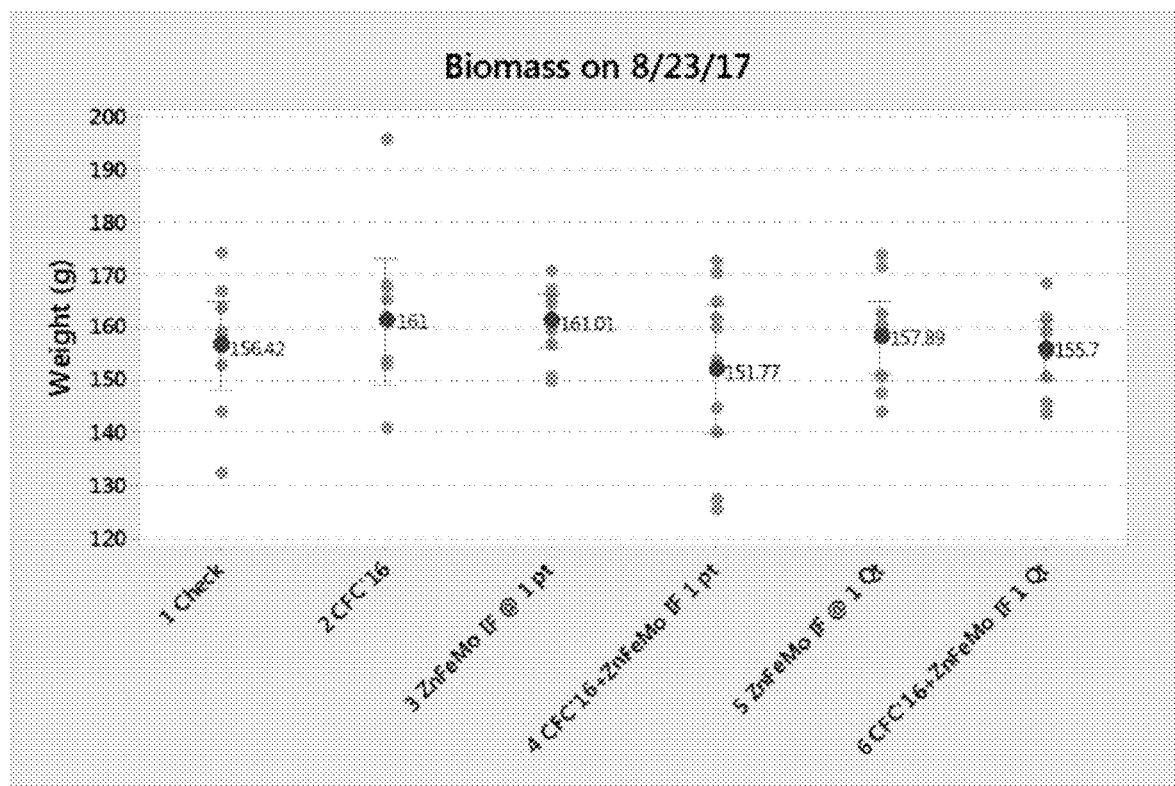
FIG. 79 is a graphical view of biomass, according to one or more embodiments of the present disclosure.
Figure 80:
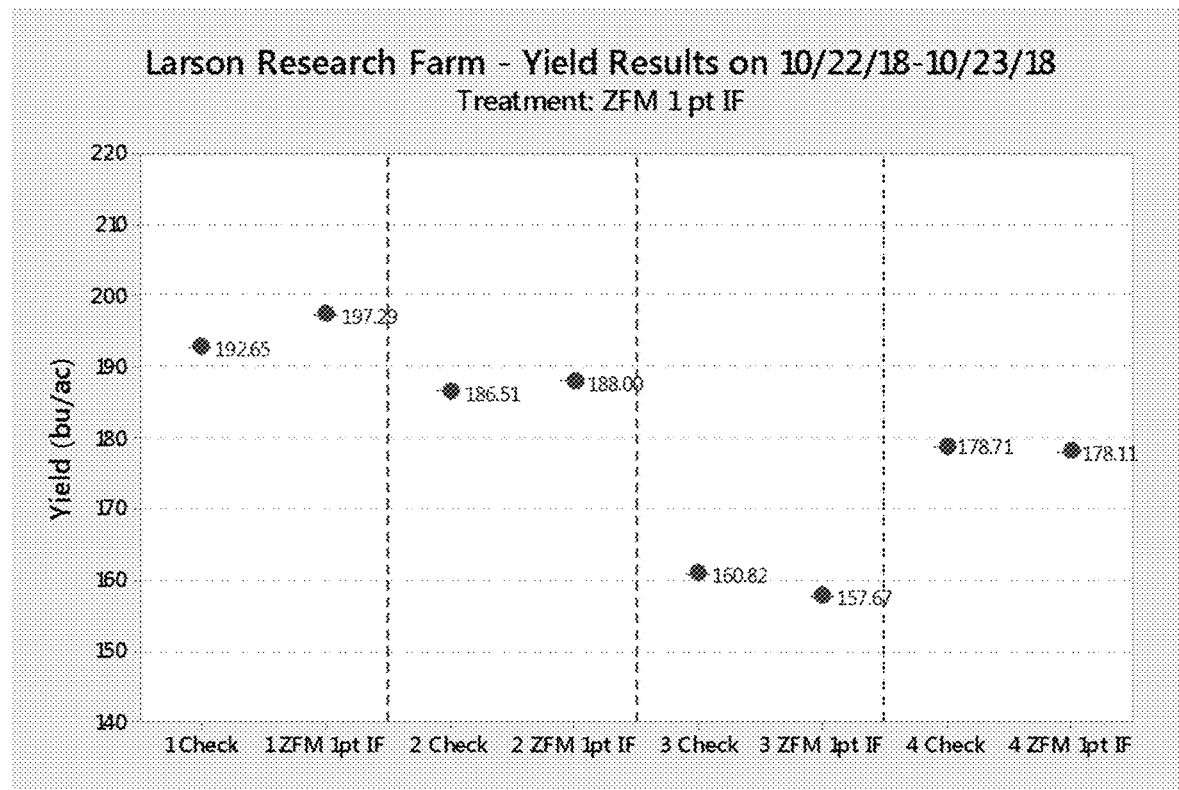
FIG. 80 is a graphical view of yield results, according to one or more embodiments of the present disclosure.
Figure 81:
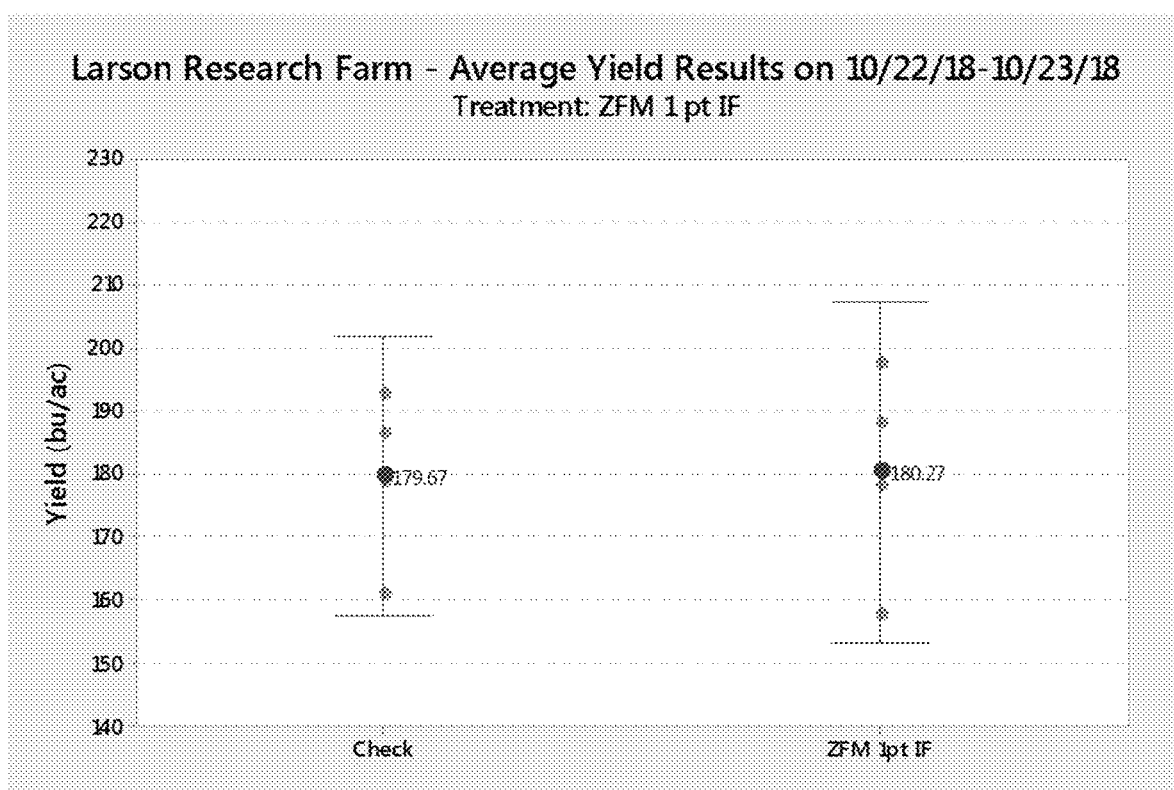
FIG. 81 is a graphical view of average yield results, according to one or more embodiments of the present disclosure.
Figure 82:
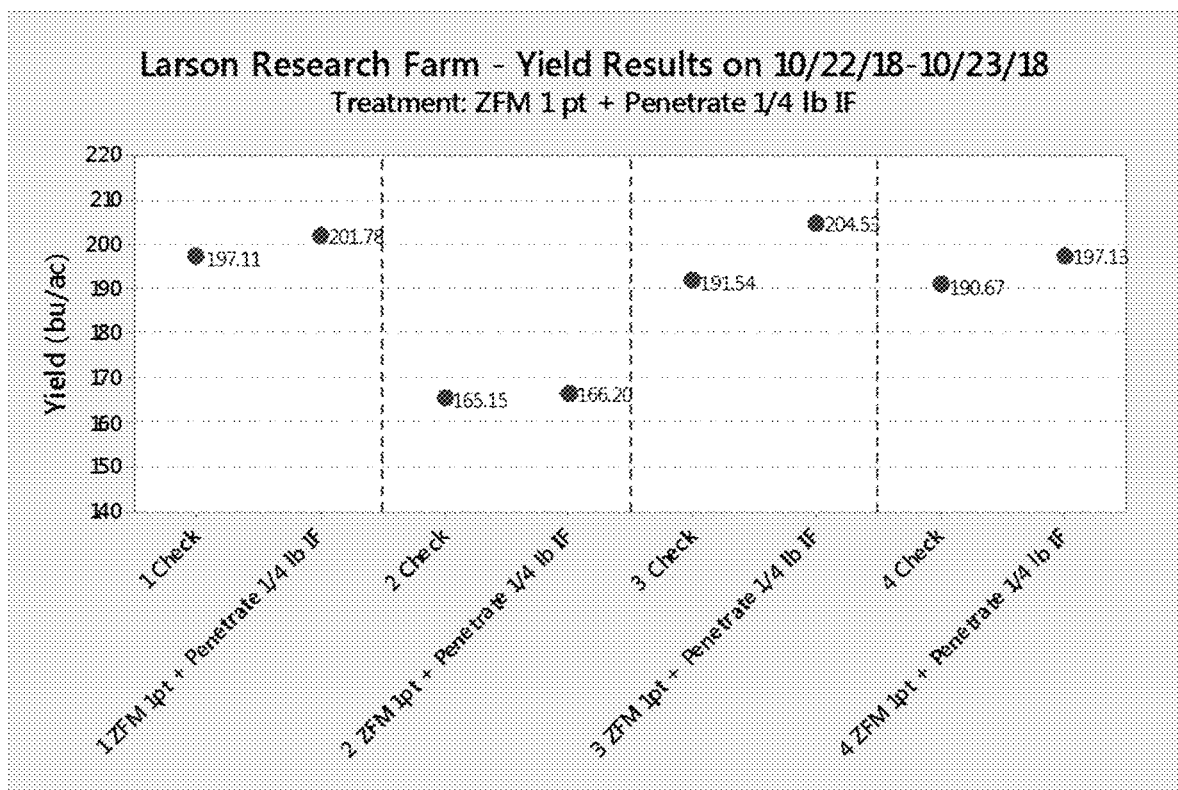
FIG. 82 is a graphical view of yield results, according to one or more embodiments of the present disclosure.
Figure 83:
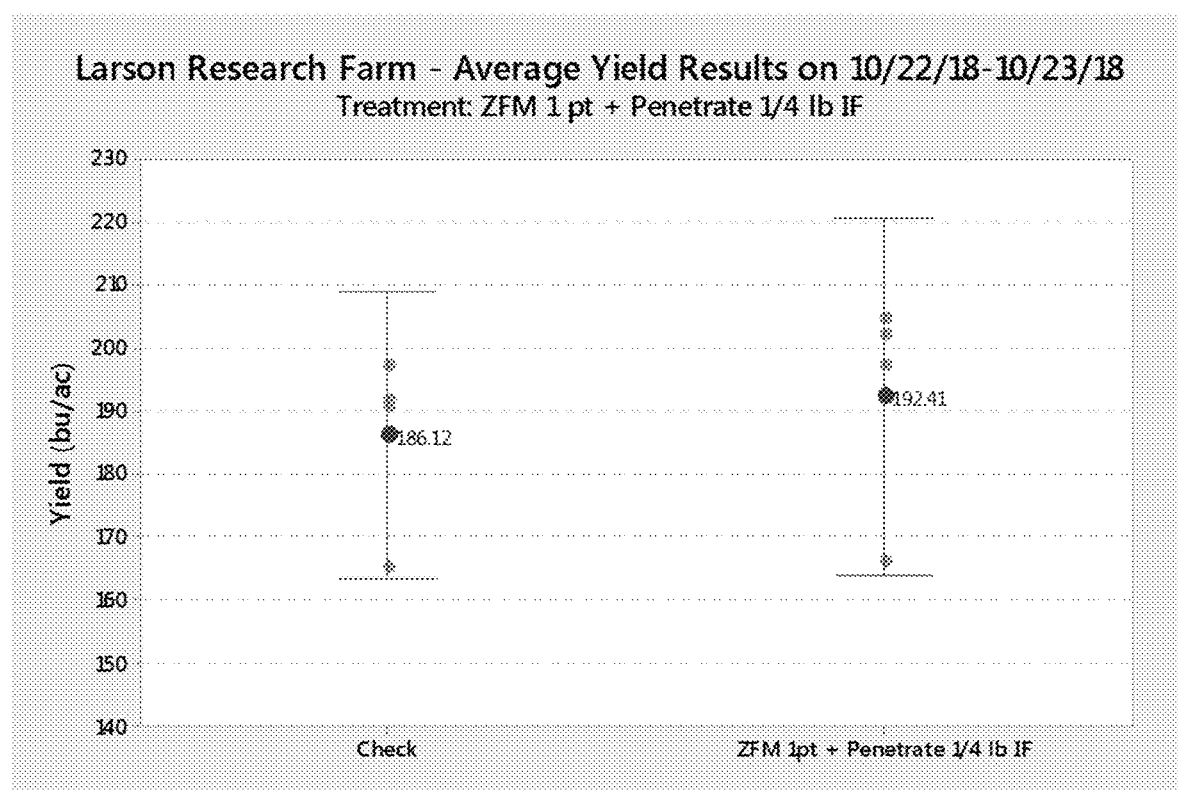
FIG. 83 is a graphical view of average yield results, according to one or more embodiments of the present disclosure.
Figure 84:
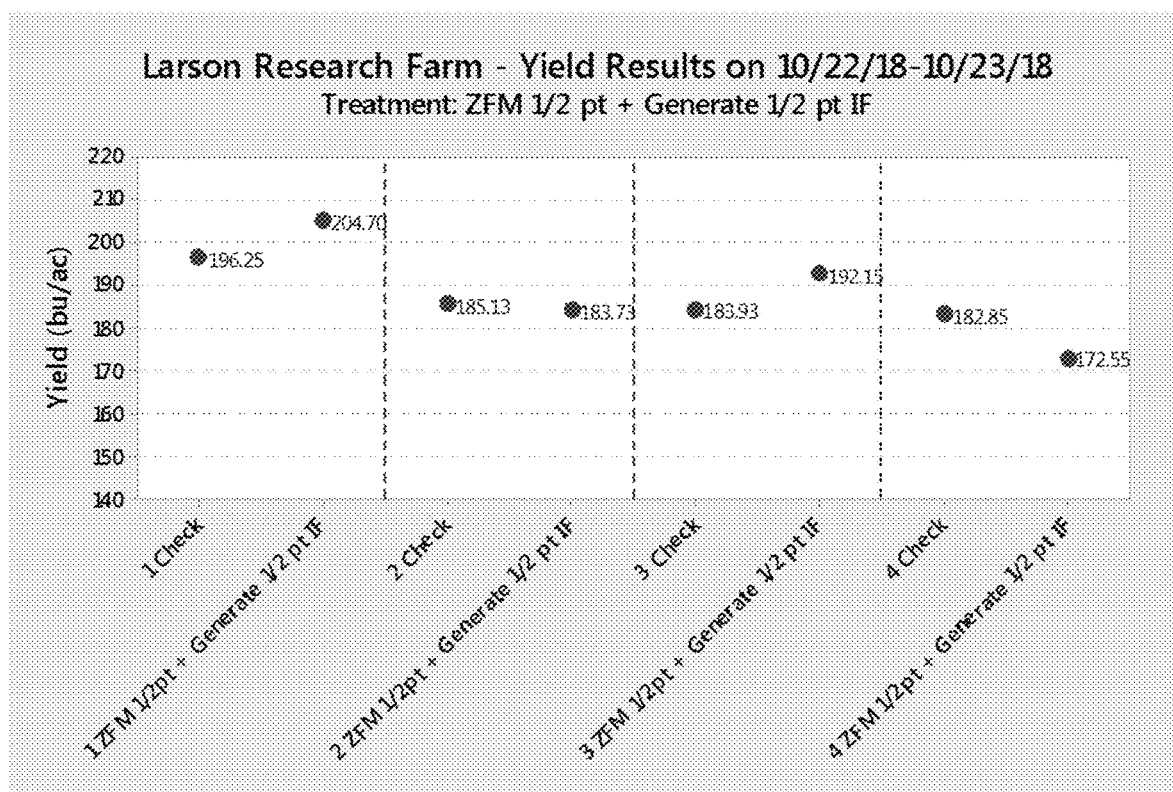
FIG. 84 is a graphical view of yield results, according to one or more embodiments of the present disclosure.
Figure 85:
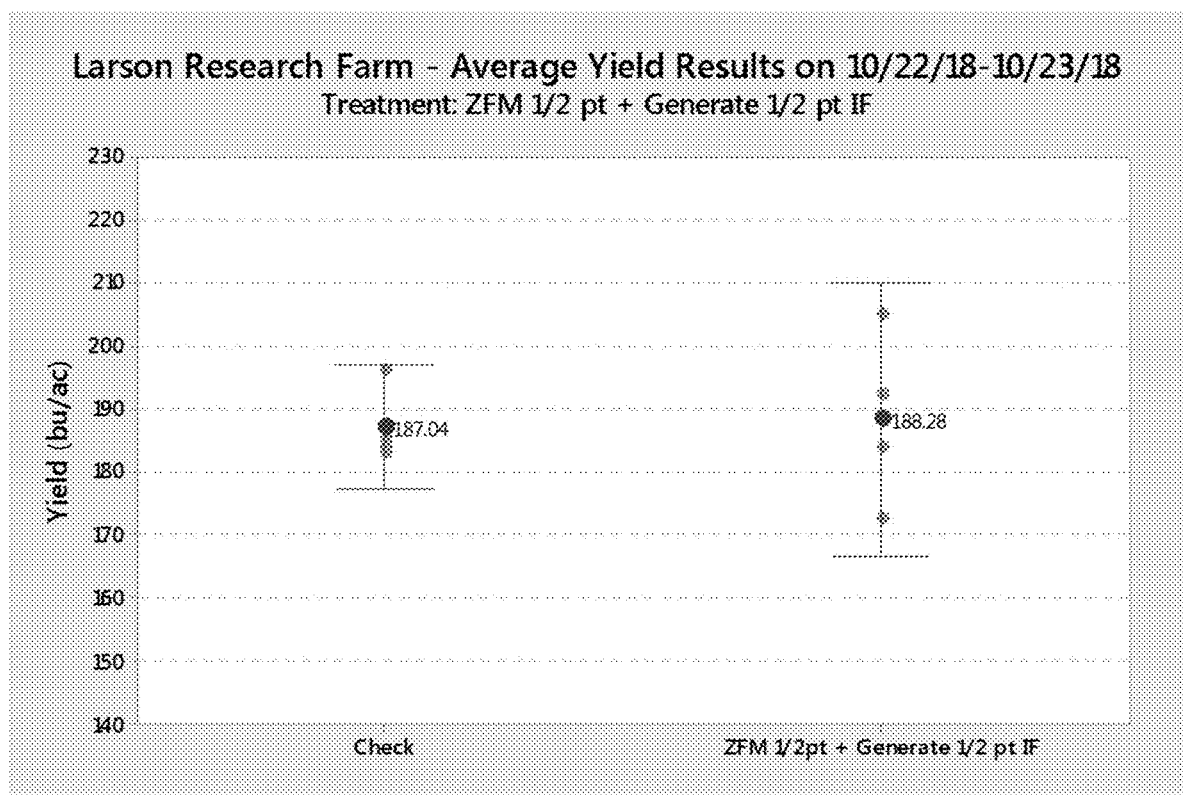
FIG. 85 is a graphical view of average yield results, according to one or more embodiments of the present disclosure.
Figure 86:
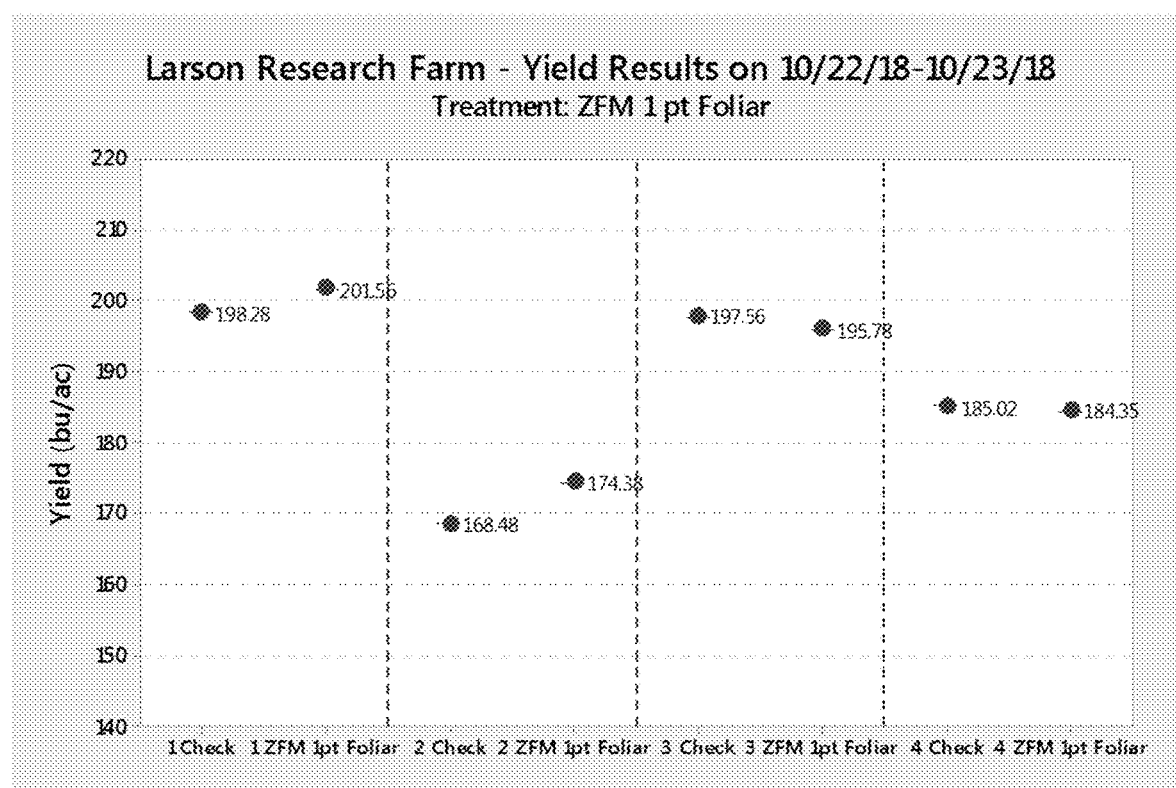
FIG. 86 is a graphical view of yield results, according to one or more embodiments of the present disclosure.
Figure 87:
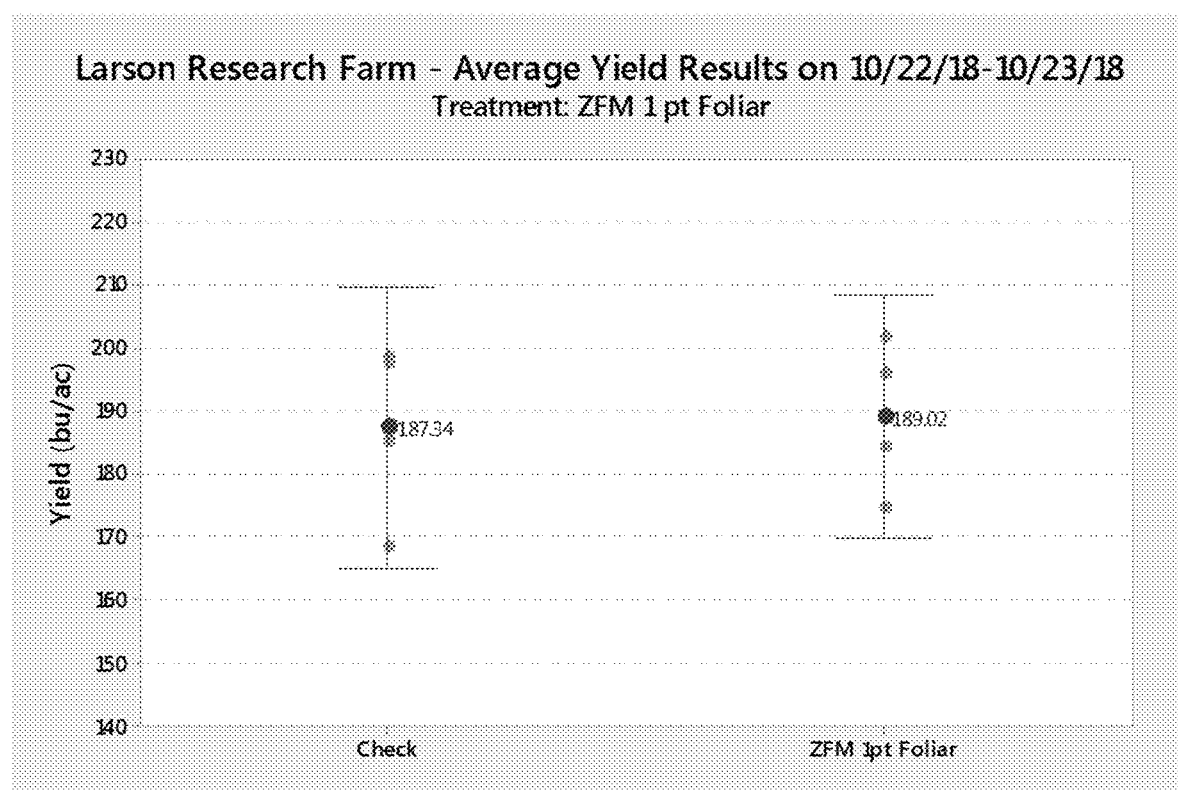
FIG. 87 is a graphical view of average yield results, according to one or more embodiments of the present disclosure.
Figure 88:
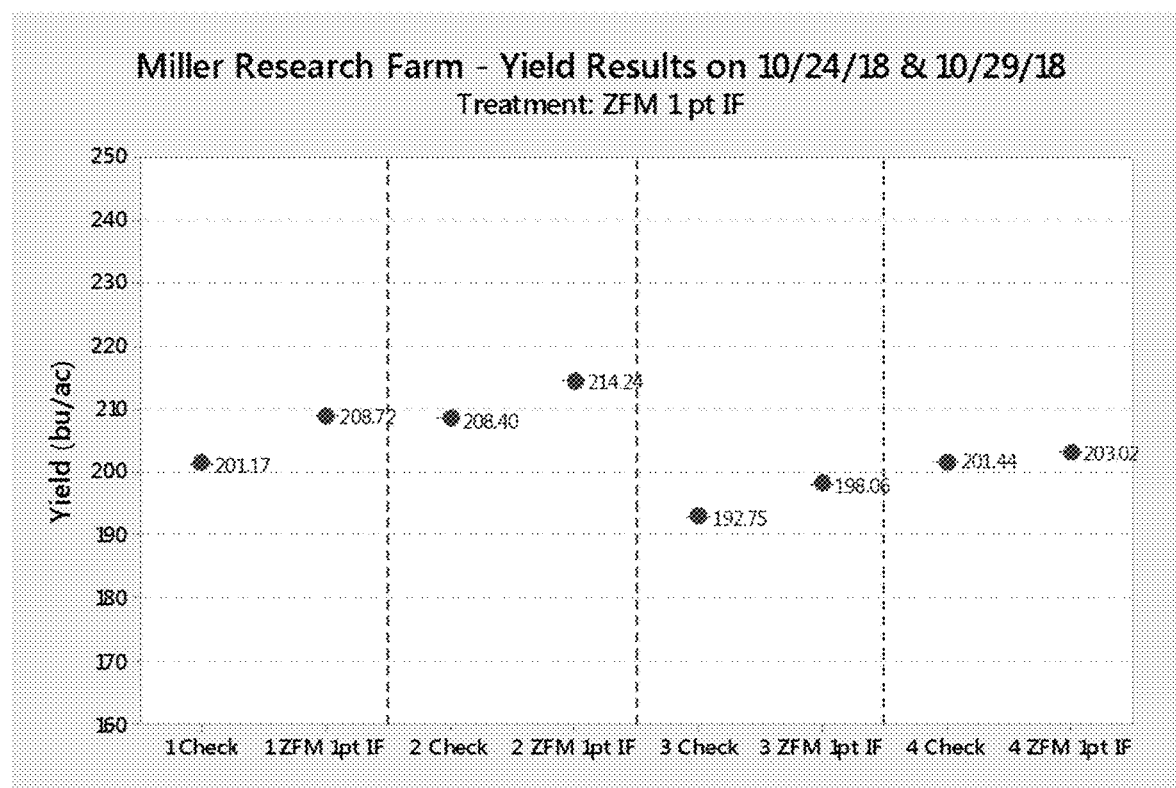
FIG. 88 is a graphical view of yield results, according to one or more embodiments of the present disclosure.
Figure 89:
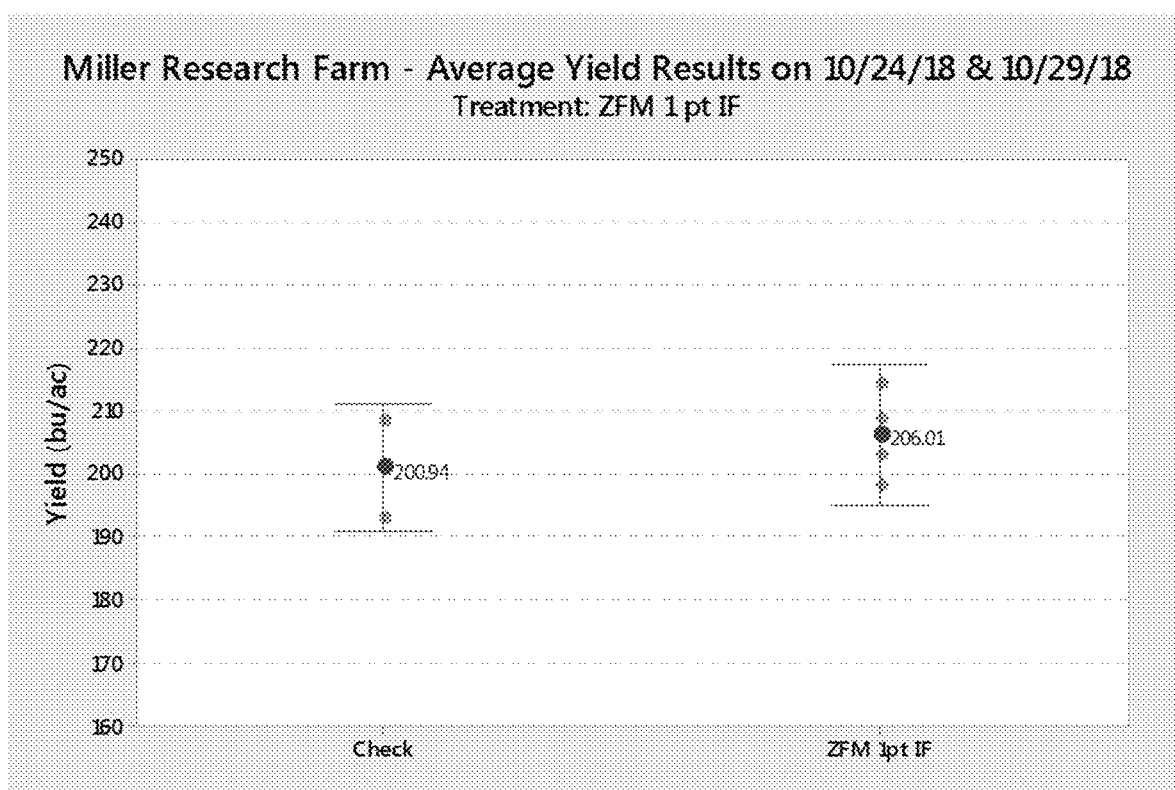
FIG. 89 is a graphical view of average yield results, according to one or more embodiments of the present disclosure.
Figure 90:
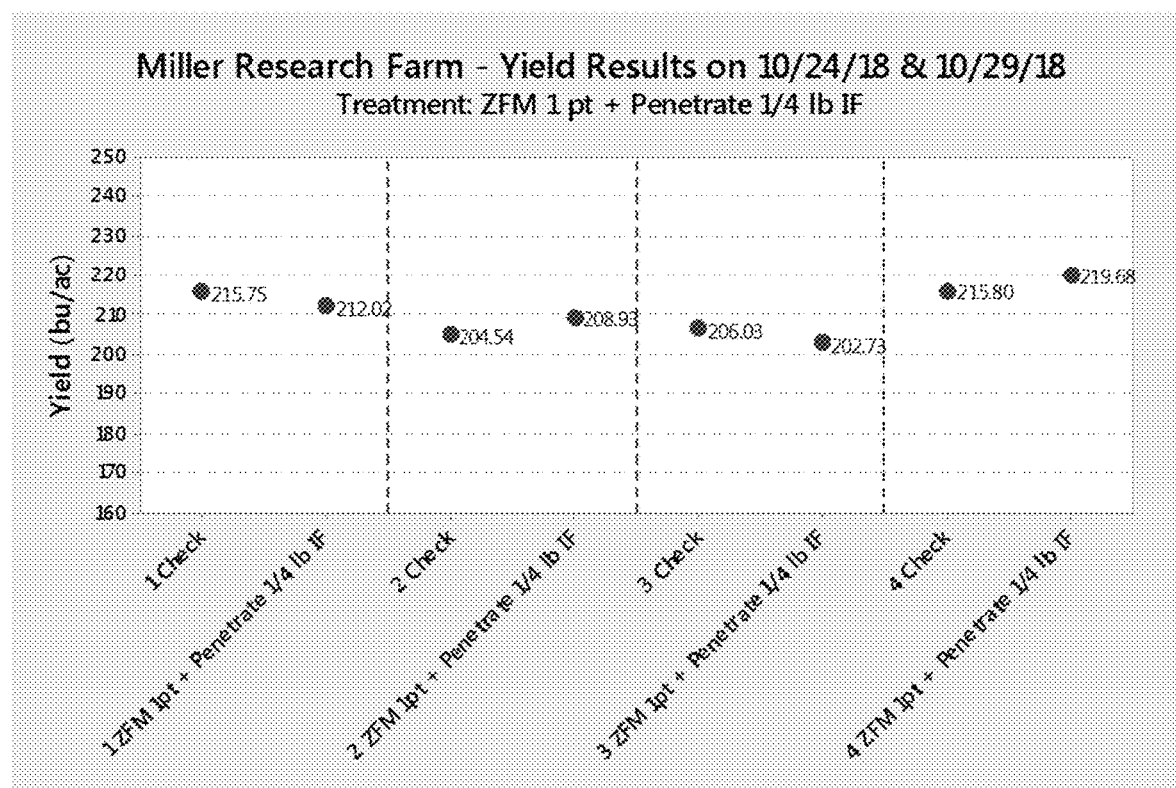
FIG. 90 is a graphical view of yield results, according to one or more embodiments of the present disclosure.
Figure 91:
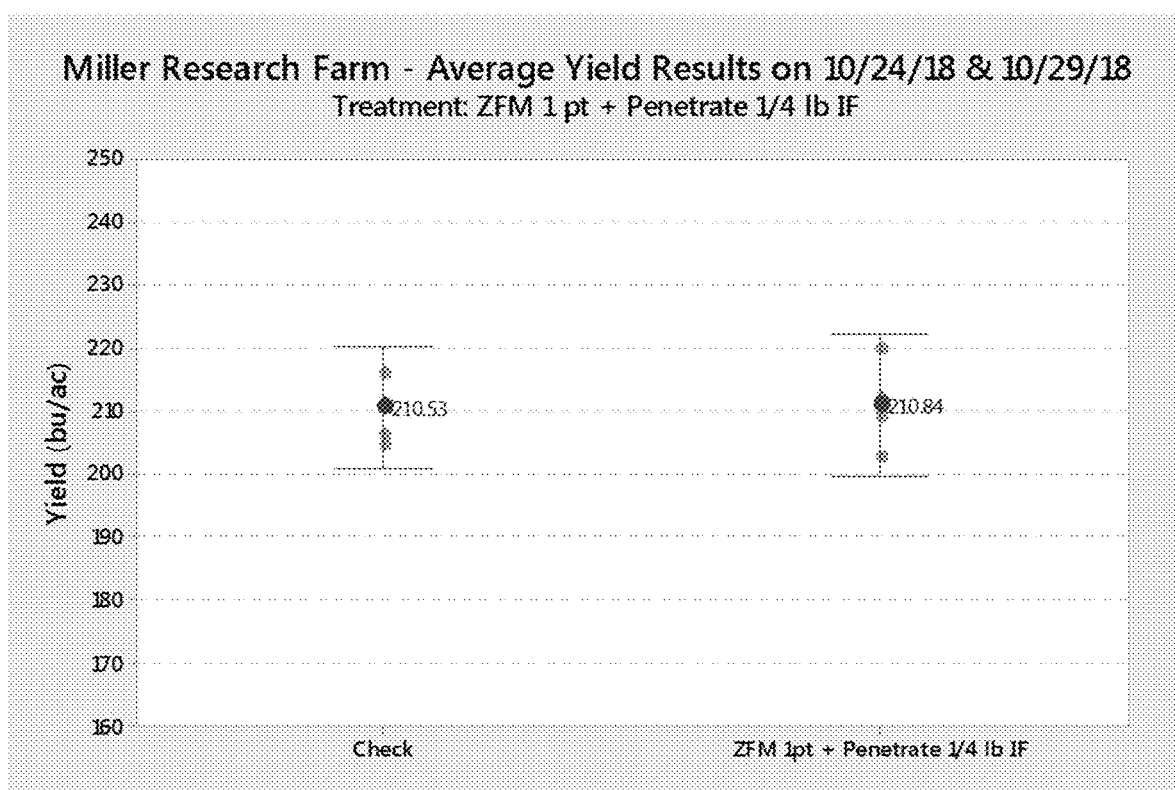
FIG. 91 is a graphical view of average yield results, according to one or more embodiments of the present disclosure.
Figure 92:
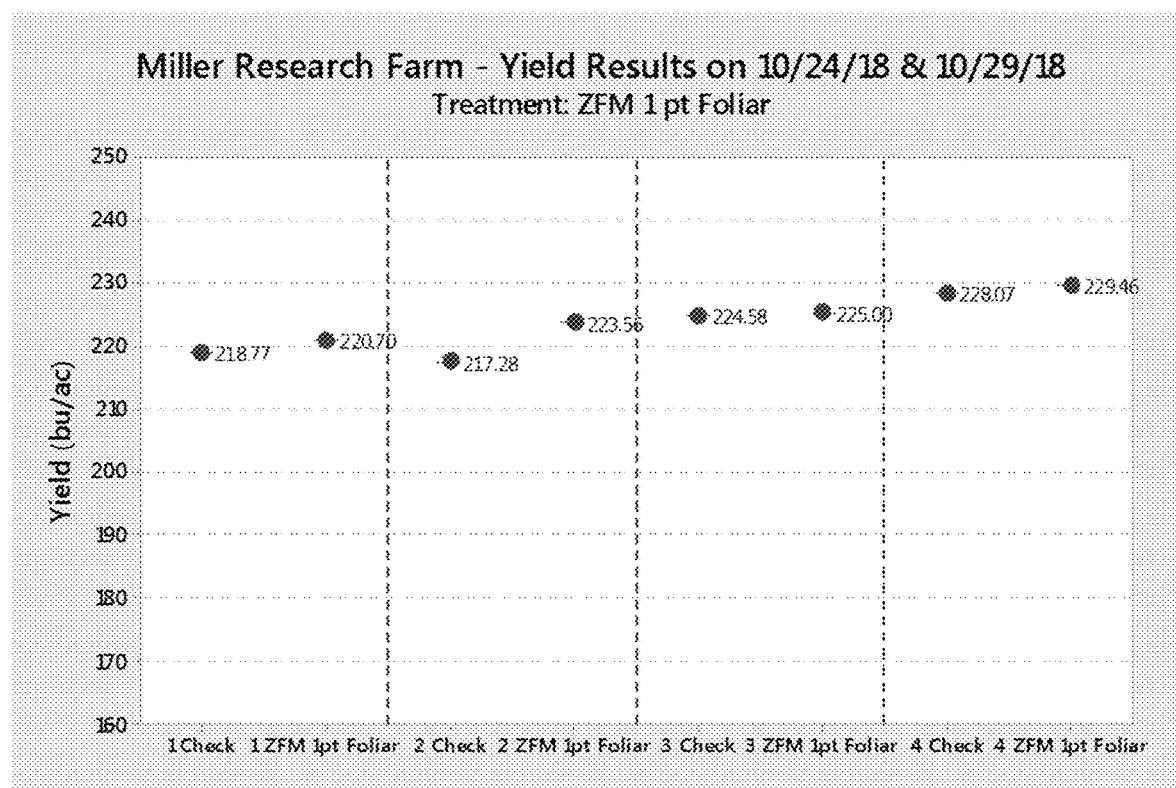
FIG. 92 is a graphical view of yield results, according to one or more embodiments of the present disclosure.
Figure 93:
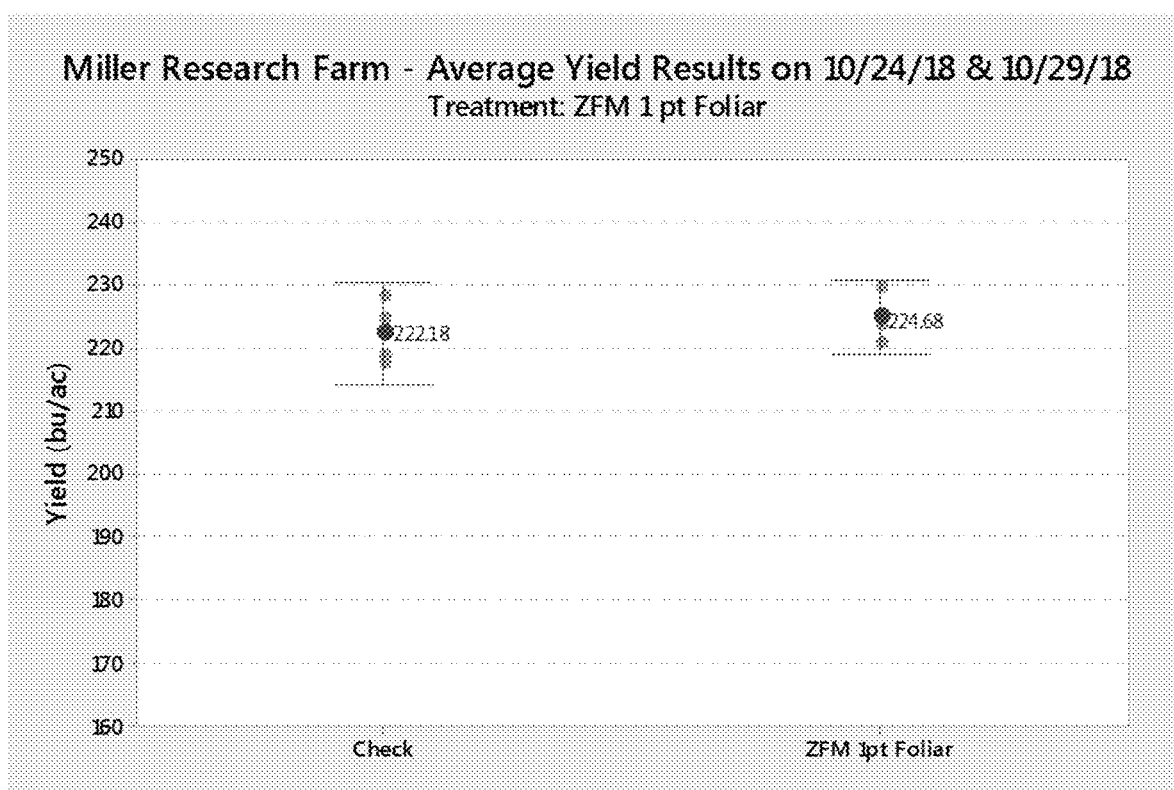
FIG. 93 is a graphical view of average yield results, according to one or more embodiments of the present disclosure.
Figure 94:
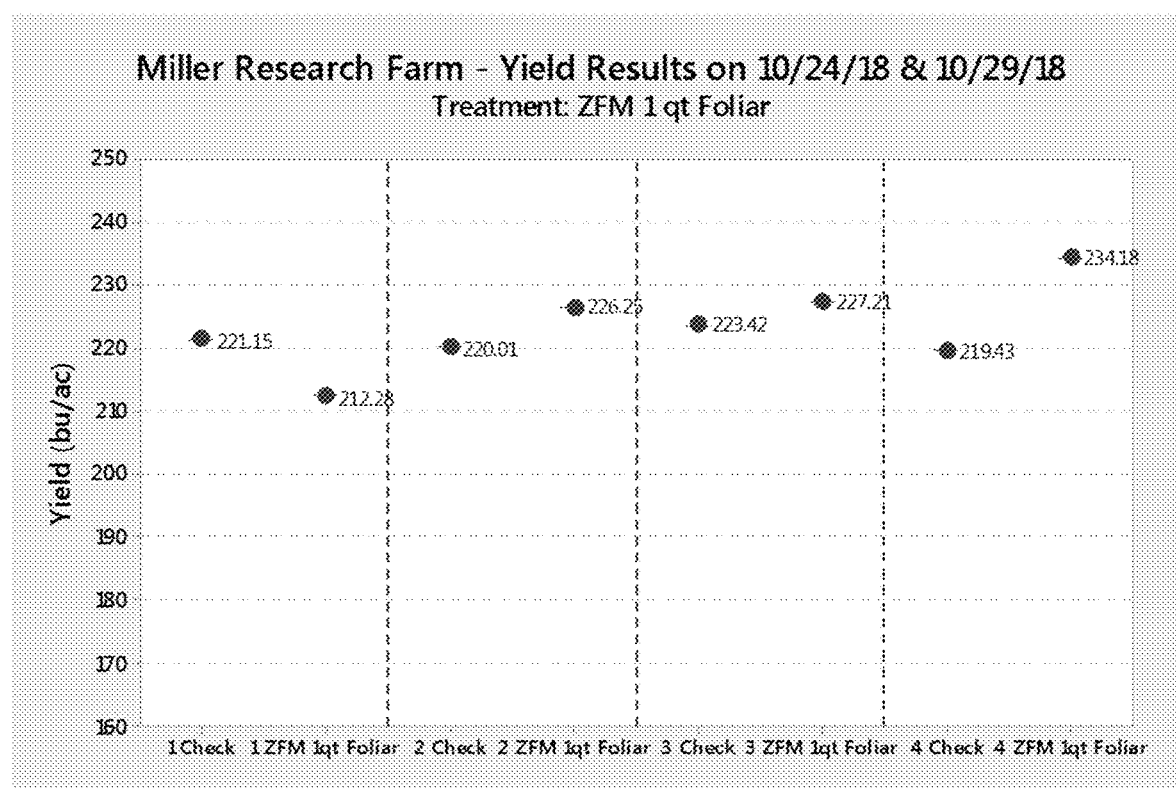
FIG. 94 is a graphical view of yield results, according to one or more embodiments of the present disclosure.
Figure 95:
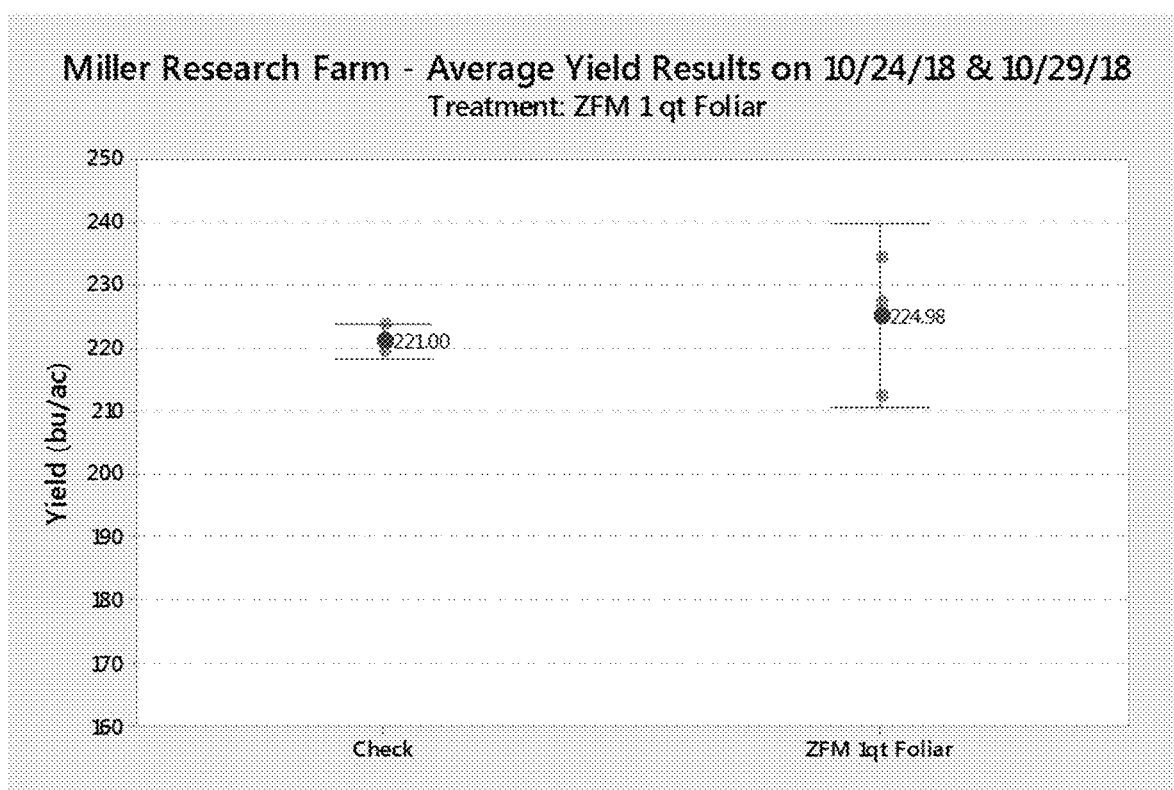
FIG. 95 is a graphical view of average yield results, according to one or more embodiments of the present disclosure.

FIG. 13 is a flowchart of a method 1300 of using a zinc-iron-molybdenum treatment composition and biological fertilizer, according to one or more embodiments of the present disclosure. The zinc-iron-molybdenum treatment composition 302 can be contacted 604 or mixed with one or more biological fertilizers 1202, sufficient to form a mixture 1302. The mixture 1302 can be used in an agricultural application 608. In some embodiments, the treatment composition 302 includes a biostimulant or a biostimulant composition.

In some embodiments, a treatment method includes applying treatment compositions during multiple steps in a seed planting process. The treatment compositions can be applied to one or more seeds (e.g., a bag of seeds). The seeds are planted, and then the treatment compositions can optionally be re-applied in-furrow.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Examples of formulations used in the following examples include Table 1.

TABLE 1

| Ingredient | %/wt | g | kilos | lbs |
| --- | --- | --- | --- | --- |
| R.O. Water | 55.807 | 558.070 | 0.5581 | 1.230 |
| Zinc Lactate, Dihydrate (23.395% Zn) | 1.069 | 10.690 | 0.0107 | 0.024 |
| Zinc Sulfate, Monohydrate (36.442% Zn) | 0.686 | 6.860 | 0.0069 | 0.015 |
| Ferric Ammonium Citrate (22.0% Fe) | 30.300 | 303.000 | 0.3030 | 0.668 |
| Ammonium Molybdate(VI), Tetrahydrate (54.341% Mo) | 0.552 | 5.520 | 0.0055 | 0.012 |
| Potassium Benzoate | 0.250 | 2.500 | 0.0025 | 0.006 |
| Penetrate | 11.336 | 113.360 | 0.1134 | 0.250 |
| Total | 100.000 | 1000.000 | 1.0000 | 2.205 |

Example 1

Treatment Compositions In-Furrow in Field

In one trial, six treatments were applied in-furrow to corn. The six treatments are summarized below:
1. Check (no treatment)
2. Commence for Corn (CFC)
3. Zn—Fe—Mo treatment composition in-furrow (IF) at 1 pint (pt)
4. CFC+Zn—Fe—Mo treatment composition IF at 1 pt
5. Zn—Fe—Mo treatment composition IF at 1 quart (qt)
6. CFC+Zn—Fe—Mo treatment composition IF at 1 qt The time of planting to harvesting spanned a period of about 2 months. FIGS. 14-24 show the results from the trial, according to one or more embodiments of the present disclosure. Table 2 shows the formulation used for the Zn—Fe—Mo treatment compositions.

TABLE 2

Zn—Fe—Mo Treatment Composition

| Ingredient | Percent |
| --- | --- |
| RO water | 66.67 |
| Ferric Ammonium Citrate | 30.3 |
| Zinc Ammonium Citrate | 2.481 |
| Ammonium Molybdate Tetrahydrate | 0.552 |

Example 2

In another trial, six treatments were applied in-furrow to corn The six treatments are summarized below:
1. Check 1 (no treatment)
2. Zn—Fe—Mo treatment composition at 1 pt IF 1
3. Zn—Fe—Mo treatment composition+Mn at 1 pt IF 1
4. Check 2 (no treatment)
5. Zn—Fe—Mo treatment composition at 1 pt IF 2
6. Zn—Fe—Mo treatment composition+Mn at 1 pt IF 2

The time of planting to harvesting spanned a period of about 2 months. FIGS. 25-35 show the results from the trial, according to one or more embodiments of the present disclosure. Tables 3 and 4 shown the formulations for the Zn—Fe—Mo treatment composition and for the Zn—Fe—Mo treatment composition plus Mn, respectively.

TABLE 3

Zn—Fe—Mo Treatment Composition

| Ingredient | Percent |
| --- | --- |
| RO water | 66.67 |
| Ferric Ammonium Citrate | 30.3 |
| Zinc Ammonium Citrate | 2.481 |
| Ammonium Molybdate Tetrahydrate | 0.552 |

TABLE 4

Zn—Fe—Mo Treatment Composition + Mn

| Ingredient | Percent |
| --- | --- |
| RO water | 65.271 |
| Ferric Ammonium Citrate | 30.3 |
| Zinc Ammonium Citrate | 2.481 |
| Ammonium Molybdate Tetrahydrate | 0.552 |
| Manganese Lactate | 1.396 |

Example 3

In another trial, six treatments were applied in-furrow to corn. The six treatments are summarized below:
1. Check (no treatment)
2. Generate IF
3. Penetrate IF
4. Zn—Fe—Mo treatment composition at 1 qt IF
5. Zn—Fe—Mo treatment composition+Penetrate IF
6. ½ Zn—Fe—Mo treatment composition+½ Penetrate IF The time of planting to harvesting spanned a period of about 2 months. FIGS. 36-46 show the results from the trial, according to one or more embodiments of the present disclosure. Tables 5 and 6 shown the formulations for the Zn—Fe—Mo treatment composition and for Penetrate. The formulations shown in Tables 5 and 6 were halved for treatment no. 6.

TABLE 5

Zn—Fe—Mo Treatment Composition

| Ingredient | Percent |
| --- | --- |
| RO water | 66.67 |
| Ferric Ammonium Citrate | 30.3 |
| Zinc Ammonium Citrate | 2.481 |
| Ammonium Molybdate Tetrahydrate | 0.552 |

TABLE 6

Penetrate

| Ingredient | Percent |
| --- | --- |
| Penetrate (weighs 10 lb/gal) | 0.5 lb/ac |

Example 4

In another trial, six treatments were applied in-furrow to soy and corn. The six treatments are summarized below:
1. Check (no treatment)
2. Ni—Fe—Mo treatment composition for soy at 1 pt IF
3. Zn—Fe—Mo treatment composition for corn at 1 pt IF
4. Ni—Fe—Mo treatment composition for soy+Mn at 1 pt IF
5. Zn—Fe—Mo treatment composition for corn+Mn at 1 pt IF
6. Generate at 1 pt IF The time of planting to harvesting spanned a period of about 2 months. FIGS. 47-57 show the results from the trial, according to one or more embodiments of the present disclosure. Tables 7 and 8 show the formulations for the Zn—Fe—Mo treatment composition for corn and for the Zn—Fe—Mo treatment composition for corn plus Mn, respectively.

TABLE 7

Zn—Fe—Mo Treatment Composition

| Ingredient | Percent |
|---|---|
| RO water | 66.67 |
| Ferric Ammonium Citrate | 30.3 |
| Zinc Ammonium Citrate | 2.481 |
| Ammonium Molybdate Tetrahydrate | 0.552 |

TABLE 8

Zn—Fe—Mo Treatment Composition + Mn

| Ingredient | Percent |
|---|---|
| RO water | 65.271 |
| Ferric Ammonium Citrate | 30.3 |
| Zinc Ammonium Citrate | 2.481 |
| Ammonium Molybdate Tetrahydrate | 0.552 |
| Manganese Lactate | 1.396 |

Example 5

In another trial, six treatments were applied in-furrow to soy and corn. The six treatments are summarized below:
1. Check (no treatment)
2. Zn—Fe—Mo treatment composition+Generate at 1 qt IF 1
3. Zn—Fe—Mo treatment composition at 1 qt IF
4. Zn—Fe—Mo treatment composition+Ni at 1 qt IF
5. Check 2
6. Zn—Fe—Mo treatment composition+Generate at 1 qt IF 2

The time of planting to harvesting spanned a period of about 2.5 months. FIGS. 58-68 show the results from the trial, according to one or more embodiments of the present disclosure. Tables 9 and 10 show the formulations for Zn—Fe—Mo Treatment Composition and for Zn—Fe—Mo Treatment Composition plus Ni, respectively.

TABLE 9

Zn—Fe—Mo Treatment Composition

| Ingredient | Percent |
|---|---|
| RO water | 67.143 |
| Ferric Ammonium Citrate | 30.3 |
| Zinc Sulfate Monohydrate | 0.686 |
| Zinc Lactate Dihydrate | 1.069 |
| Ammonium Molybdate Tetrahydrate | 0.552 |
| Potassium Benzoate | 0.25 |

TABLE 10

Zn—Fe—Mo Treatment Composition + Ni

| Ingredient | Percent |
|---|---|
| RO water | 64.376 |
| Nickel Lactate Tetrahydrate | 1.495 |
| ChemSol Nickel Sulfate Crystal | 1.272 |
| Ferric Ammonium Citrate | 30.3 |
| Zinc Sulfate Monohydrate | 0.686 |
| Zinc Lactate Dihydrate | 1.069 |
| Ammonium Molybdate Tetrahydrate | 0.552 |
| Potassium Benzoate | 0.25 |

Example 6

In another trial, six treatments were applied in-furrow to corn. The six treatments are summarized below:
1. Check (no treatment)
2. Commence for Corn (CFC)
3. Zn—Fe—Mo treatment composition in-furrow (IF) at 1 pint (pt)
4. CFC+Zn—Fe—Mo treatment composition IF at 1 pt
5. Zn—Fe—Mo treatment composition IF at 1 quart (qt)
6. CFC+Zn—Fe—Mo treatment composition IF at 1 qt The time of planting to harvesting spanned a period of about 2 months. FIGS. 69-79 show the results from the trial, according to one or more embodiments of the present disclosure. Table 11 shows the formulation for the Zn—Fe—Mo treatment composition.

TABLE 11

Zn—Fe—Mo Treatment Composition

| Ingredient | Percent |
|---|---|
| RO water | 66.67 |
| Ferric Ammonium Citrate | 30.3 |
| Zinc Ammonium Citrate | 2.481 |
| Ammonium Molybdate Tetrahydrate | 0.552 |

Example 7

Trials were also conducted on research farms. FIGS. 80-87 show results from a trial on a research farm, according to one or more embodiments of the present disclosure. FIGS. 88-95 show results from a trial on a different research farm, according to one or more embodiments of the present disclosure. Tables 12 and 13 shown the formulations for the Zn—Fe—Mo treatment composition and for Penetrate, respectively.

TABLE 12

Zn—Fe—Mo Treatment Composition

| Ingredient | Percent |
|---|---|
| RO water | 66.67 |
| Ferric Ammonium Citrate | 30.3 |
| Zinc Ammonium Citrate | 2.481 |
| Ammonium Molybdate Tetrahydrate | 0.552 |

TABLE 13

Penetrate

| Ingredient | Percent |
|---|---|
| Penetrate (weighs 10 lb/gal) | 0.5 lb/ac |

Example 8

Trials were conducted on corn at a research farm. All treatment compositions were applied in-furrow with replicated strip trials, bracketed with checks, and ten replications for each treatment. The trials utilized Dekalb DKC-42-04RIB (92 day, 95% germ, 1516 sds/lbs), pre-emergence, with harvesting about 5 months after planting. The results demonstrated significant improvements in yield (bushels/ acre) in 7 out of 10 replications with respect to controls. The trials also demonstrated improvements in biomass by about 3 grams and improvements in emergence by about 6 hours, both with respect to controls.

Example 9

The treatment compositions disclosed herein, as biostimulants, were evaluated on corn, Zea mays, in field conditions. Trials were conducted in an area having soil corresponding to Eutric Brunosols with a loamy clay loam texture. For chemical fallow, 3 liters per hectare of glyphosate and 1 liter of 2.4D were utilized. Direct sowing was carried out in a field having soybeans as a predecessor crop using a pneumatic planter with a density of about 4 plants per meter. The corn hybrid utilized was Delkab 7020. Before sowing, the soil was analyzed and the results were as follows: pH=about 5.3; organic material=about 5.3%; sulfur=about 9 ppm SO4; calcium=about 13.54 meq/100 g; potassium=about 0.44 meq/100 g; phosphorus=about 7 ppm; magnesium=about 2.13 meq/100 g; and CIC=about 16.24 meq/100 g. At seeding, fertilizer was applied at a rate of about 120 kg per hectare of ammonium phosphate, 18-46-0. Nitrate analysis was performed in the soil when the corn was in its phenological state V4 which indicated it had about 25.17 ppm, it was re-fertilized with sulfur urea at a rate of about 100 kg per hectare about 1 month after planting. In addition, about 1 month after planning, the treatment composition was applied at an application volume of about 141.08 liters per hectare, sprayed at a rate of about 1 liter per hectare. Two phytotoxicity readings were performed 7 and 15 days after application showing no signs. About 1.5 months after planting, leaves were extracted from each treatment to perform nutrient analysis. Nutrients analyzed included total nitrogen, sulfur, potassium, phosphorus, and zinc.

The experimental design used was random blocks, each treatment had six repetitions. The plot had edges around it. Statistical analysis of each application of treatment composition was performed for each repetition and each treatment. Application of the treatment composition (e.g., as a biostimulant) caused an increase in yield compared to the control (e.g., the average yield in kilos per hectare was about 13,150 for the treatment composition in comparison to about 12,750 for the control). The application of the treatment composition improved performance in corn, with a difference of about 400 kilos per hectare with respect to the control. By analyzing the number of ears per plant, an improvement of about 4.69% was observed in the treatments involving application of the treatment composition compared to the control. Another performance component where an improvement was observed was the weight of a thousand grains. In the treatments involving application of the treatment composition, the improvement in the weight of a thousand grains with respect to the control was about 6.35%. When analyzing the number of grains per spike, the treatments applied differed from the control. For this performance component, the control exceeded the treatment composition, although it should be taken into account that the control had a lower number of ears per plant.

Foliar analysis results included, for total nitrogen, about 2.80% for check versus 2.80% for treatment composition; for sulfur, about 0.14% for check versus about 0.14% for treatment composition; for potassium, about 0.99% for check versus about 1.04% for treatment composition; for phosphorus, about 0.29% for check versus about 0.30% for treatment composition; and, for zinc, about 22.4 ppm for check versus about 27.6 ppm for treatment composition. The table 14 below shows the number of plants, number of ears per plant, yield per treatment in kilos per hectare, hectolitric weight, weight of a thousand grains, grains per spike, and grains per plant, where 'testigo' represents the control and where 'procure' represents the treatment composition.

TABLE 14

| Treatments | Number of Plants | Number of ears/plant | Yield Kg/ha at 14.5% | Hectoliter weight | Thousand grain weight | Grains per spike | Grains/plant |
| --- | --- | --- | --- | --- | --- | --- | --- |
| Testigo | 3.86 | 1.25 | 13.021 | 75.10 | 310 | 452 | 566 |
| Testigo | 3.50 | 1.40 | 11.789 | 73.34 | 290 | 430 | 605 |
| Testigo | 3.36 | 1.64 | 12.998 | 75.37 | 279 | 440 | 721 |
| Testigo | 3.71 | 1.44 | 12.456 | 75.22 | 287 | 423 | 608 |
| Testigo | 3.07 | 1.60 | 12.704 | 75.16 | 315 | 426 | 683 |
| Testigo | 3.57 | 1.63 | 13.532 | 74.73 | 314 | 384 | 627 |
| Procure | 3.50 | 1.45 | 12.111 | 71.98 | 307 | 403 | 586 |
| Procure | 3.71 | 1.53 | 14.098 | 73.68 | 373 | 345 | 528 |
| Procure | 3.71 | 1.44 | 12.752 | 74.12 | 306 | 406 | 584 |
| Procure | 3.64 | 1.50 | 12.135 | 74.85 | 298 | 388 | 582 |
| Procure | 3.57 | 1.68 | 14.413 | 71.79 | 316 | 396 | 664 |
| Procure | 3.07 | 1.77 | 13.381 | 74.51 | 309 | 415 | 733 |

Example 10

The performance response of the treatment compositions was evaluated on corn, Zea mays, in field conditions. The soil in which the corn was planted corresponded to Ocric Dystric Planosols with a Franco-Sandy texture. Glyphosate, 1.5 liters of 2.4 D and 0.25 liters of Dicamba were used for the chemical fallow. No till sowing was carried out in the field in which the predecessor crop was sorghum. The sowing equipment utilized included a pneumatic planter with a planting density of about 3.2 plants per meter. The core hybrid was Syngenta 875 VIP 3. Before sowing, the soil was analyzed and the results were as follows: pH=about 6; organic matter=about 5%; calcium=about 17.23 meq/100 g; potassium=about 0.47/100 g; phosphorus=about 9 ppm; and sodium=about 0.16 meq/100 g. At sowing, the soil was fertilized with about 150 kg per hectare of ammonium phosphate, 18-46-0. Nitrate analysis was carried out in the soil when the core was in its phenological state V4, which indicated that it had about 18 ppm, it was re-fertilized with sulfur urea at a rate of about 170 kg per hectare, a few days after planting. The treatment composition was applied with an application volume of about 135.10 liters per hectare. Two phytotoxicity readings were performed 7 and 15 days post-application, showing no signs. About 2 weeks after planting, leaves were extracted from each treatment to perform nutrient analysis. Nutrients analyzed included total nitrogen, sulfur, potassium, phosphorus, and zinc.

The experimental design used was random blocks, each treatment had 6 repetitions and each treatment had 6 rows of corn 6 meters long, wherein two of the rows were not used and thus served as a protection barrier to avoid contamination between treatments. A first treatment including a control was utilized. The control did not receive a treatment composition application. A second treatment received an application of the treatment composition. For the second treatment, the treatment composition was applied at a rate of about 1 liter per hectare. Statistical application of each application of the treatment composition was performed for each repetition and each treatment. The harvest was carried out about 3 months after planting.

The application of the treatment compositions in corn cultivation caused an increase in yield with respect to the control (e.g., about 14,198 kilos per hectare for the treatment composition versus 12,221 kilos per hectare for the control). The application of the treatment composition improved performance in corn. For example, the difference was about 1,977 kilos per hectare with respect to the control. The application of the treatment composition improved the number of spikes per plant with respect to the control. A performance component where an improvement was observed was the weight of a thousand grains. The improvement of the treatment composition with respect to the control was about 7.25%.

In terms of the results, the use of biostimulants in corn cultivation caused an increase in yield with respect to the control. These increases were statistically significant. The application of the treatment composition improved performance in corn. More specifically, a different of about 1,977 kilos per hectare with respect to the control was observed. An improvement in the number of spikes per plant was also observed in plants receiving treatment applications versus the control. The increase was about 3.75% over the control. An improvement was observed in the weight of a thousand grains of about 7.25% over the control. For the foliar tissue analysis of each treatment, the total nitrogen was about 3.20% for the check versus about 3.60% for the treatment composition; the sulfur was about 0.14% for the check versus about 0.13% for the treatment composition; the potassium as about 1.29% for the check versus about 0.90% for the treatment composition; the phosphorus was about 0.36% for the check versus about 0.26% for the treatment composition; and zinc was about 18.2 ppm for the check versus about 20 ppm for the treatment composition.

The results of the foliar tissue analysis of each treatment included, for total nitrogen, about 3.20% for the check versus about 3.60% for the treatment composition; for sulfur, about 0.14% for the check versus about 0.13% for the treatment composition; for potassium, about 1.29% for the check versus about 0.90% for the treatment composition; for phosphorus, about 0.36% for the check versus about 0.26% for the treatment composition; and for zinc, about 18.2 ppm for the check versus about 20 ppm for the treatment composition. The table 15 below presents, for the control "1" and for the treatment composition "2," the number of plants, number of ears per plant, yield per treatment in kilos per hectare, hectolitric weight, weight of a thousand grains, grains per spike, and grains per plant:

TABLE 15

| Treatments | Number of plants/meter | Number of ears/plant | Yield Kg/ha at 14.5% | Hectoliter weight | Thousand grain weight | Grains per spike | Grains/ plant |
|---|---|---|---|---|---|---|---|
| 1 | 2.33 | 1.53 | 11.132 | 69.54 | 296 | 548 | 838 |
| 1 | 2.67 | 1.66 | 12.583 | 69.22 | 291 | 515 | 853 |
| 1 | 3.00 | 1.61 | 12.861 | 70.89 | 336 | 473 | 762 |
| 1 | 2.92 | 1.43 | 11.697 | 71.08 | 290 | 532 | 750 |
| 1 | 3.08 | 1.78 | 12.625 | 73.21 | 310 | 456 | 813 |
| 1 | 3.08 | 1.57 | 12.232 | 69.54 | 295 | 595 | 933 |
| 2 | 3.00 | 1.40 | 13.943 | 71.13 | 313 | 552 | 771 |
| 2 | 2.92 | 1.66 | 13.778 | 71.85 | 357 | 452 | 750 |
| 2 | 2.92 | 1.71 | 13.937 | 68.39 | 336 | 451 | 774 |
| 2 | 2.83 | 1.59 | 14.188 | 70.89 | 307 | 501 | 347 |
| 2 | 3.17 | 1.77 | 14.050 | 70.48 | 319 | 409 | 725 |
| 2 | 3.17 | 1.74 | 15.294 | 70.10 | 319 | 477 | 830 |

Example 11

The performance response of sprays with the treatment compositions in corn, *Zea mays*, under field conditions was evaluated. Two 20-meter test strips were installed for each treatment, each of the two test strips at different locations. At one location ("the first location"), the soil where the test was implanted corresponded to Eutroic Brunosols with a loamy texture to a loamy claim loam. For chemical fallow, about 3 liters per hectare glyphosate and 1 liter of 2.4 D were used. The predecessor crop being soybeans, direct sowing was carried out using was pneumatic planter with a density of about 4 plants per meter. The corn hybrid was Delkab 7020. Before sowing, the soil was analyzed and the results were as follows: pH=about 5.3; organic material=about 5.3%; sulfur=about 9 ppm SO4; calcium=about 13.54 meq/100 g; potassium=about 0.44 meq/100 g; phosphorus=about 7 ppm; magnesium=2.13 meq/100 g; and CIC=about 16.24 meq/100 g. The seed was fertilized with about 120 kg per hectare of ammonium phosphate, 18-46-0. Nitrate analysis was carried out in the soil when the corn was in its phenological state V4 which indicated that it had about 25.17 ppm, it was re-fertilized with sulfur urea at a rate of 100 kg per hectare. The application of the treatment composition was carried out using an application volume of about 141.08 liters per hectare.

At the other location ("the second location"), the soil in which the test was carried out corresponded to Ocric Dystric Planosols with a Franco-Sandyt texture. Glyphosate at 1.5 liters of 2.4 D and 0.25 liters of Dicamba were used for the chemical fallow. The predecessor crop was sorghum. Direct sowing was carried out using a pneumatic planter with a planter density of 3.2 plants per meter. The corn hybrid was Syngenta 875 VIP 3. Before sowing, the soil was analyzed and the results were as follows: pH=about 6; organic material=about 5%; calcium=17.23 meq/100 g; phosphorus=about 9 ppm; sodium=0.16 meq/100 g. At sowing, it was fertilized with 150 kg per hectare of ammonium phosphate, 18-46-0. Nitrate analysis was carried out in the soil when the corn was in its phenological state V4, which indicated that it had about 18 ppm, it was re-fertilized with sulfur urea at a rate of about 170 kg per hectare.

The use of the treatment compositions as biostimulants in corn crops caused an increase in yield compared to the control in both locations. At the first location, application of the treatment composition improved the yield in corn by about 1939 kilos per hectare with respect to the control, with an increase of about 26.79% in the number of ears per plant and an increase of about 7.3% in the number of grains per plant. At the second location, the increase compared to the check was about 474 kilos per hectare, with an increase of about 11.47% of grains per ear and an increase in the number of grains per plant of about 1.58%. The hectolitric weight had an improvement of about 1.6% with respect to the control at the second location as well. In addition, an increase in yield compared to the control was about 763 kilos per hectare, which is explained by a 2.5% improvement in the number of ears per plant. The hectoliter weight also improved with respect to the control. The table 16 below presents the results from the first location and the second location:

TABLE 16

| Location | Treatment | Yield Kg/ha at 14.5% | Number of plants/meter | Number of ears/plant | Hectoliter weight | Thousand grain weight | Grains per spike | Grains/plant |
| --- | --- | --- | --- | --- | --- | --- | --- | --- |
| First | Control | 13708 | 2.83 | 1.53 | 71.04 | 304 | 541 | 829 |
| First | Treatment | 15647 | 3.1 | 1.94 | 69.83 | 295 | 460 | 890 |
| Second | Control | 13163 | 3.3 | 1.57 | 73.3 | 330 | 401 | 629 |
| Second | Treatment | 13637 | 3.5 | 1.43 | 74.48 | 317 | 447 | 639 |

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method, comprising: applying a treatment composition in proximity to and/or in contact with one or more seeds in-furrow, wherein the treatment composition comprises about 0.1% to about 2.0% by weight of a zinc compound, about 25% to about 35% by weight of an iron compound, and about 0.1% to about 1.0% by weight of a molybdenum compound, wherein the molybdenum compound includes ammonium molybdate tetrahydrate, and wherein all percentages by weight are based on the total weight of the treatment composition.

2. The method of claim 1, wherein the zinc compound is selected from the group consisting of zinc lactate dihydrate, zinc sulfate monohydrate and combinations thereof.

3. The method of claim 1, wherein the iron is selected from the group consisting of iron ammonium sulfate, iron sulfate, iron diethylenetriamine pentaacetic acid, and ferric ammonium citrate.

4. The method of claim 1, further comprising a manganese compound.

5. A method, comprising: applying a treatment composition to foliage of a plant or crop, wherein the treatment composition comprises about 0.1% to about 2.0% by weight of a zinc compound, about 25% to about 35% by weight of an iron compound, and about 0.1% to about 1.0% by weight of a molybdenum compound, wherein the molybdenum compound includes ammonium molybdate tetrahydrate, and wherein all percentages by weight are based on the total weight of the treatment composition.

6. The method of claim 5, wherein the zinc compound is selected from the group consisting of zinc lactate dihydrate, zinc sulfate monohydrate and combinations thereof.

7. The method of claim 5, wherein the iron compound is selected from the group consisting of iron ammonium sulfate, iron sulfate, iron diethylenetriamine pentaacetic acid, and ferric ammonium citrate.

8. The method of claim 5, further comprising a manganese compound.

\* \* \* \* \*